(12) United States Patent
Hayakawa

(10) Patent No.: US 8,081,390 B2
(45) Date of Patent: Dec. 20, 2011

(54) VARIABLE MAGNIFICATION OPTICAL SYSTEM, OPTICAL APPARATUS PROVIDED WITH THE VARIABLE MAGNIFICATION OPTICAL SYSTEM AND METHOD FOR MANUFACTURING VARIABLE MAGNIFICATION OPTICAL SYSTEM

(75) Inventor: Satoshi Hayakawa, Ichikawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/811,375

(22) PCT Filed: Jan. 30, 2009

(86) PCT No.: PCT/JP2009/051600
§ 371 (c)(1),
(2), (4) Date: Jun. 30, 2010

(87) PCT Pub. No.: WO2009/096536
PCT Pub. Date: Aug. 6, 2009

(65) Prior Publication Data
US 2010/0284092 A1    Nov. 11, 2010

(30) Foreign Application Priority Data

Jan. 30, 2008 (JP) ................................. 2008-018404

(51) Int. Cl.
*G02B 15/14* (2006.01)
(52) U.S. Cl. ........................................ 359/676; 359/683
(58) Field of Classification Search .................. 359/676, 359/683–685; 396/72–88; 348/240.99–240.3, 348/335–369
See application file for complete search history.

(56) References Cited

U.S. PATENT DOCUMENTS

| 5,583,701 | A | * | 12/1996 | Yamanashi | 359/695 |
| 5,956,184 | A | | 9/1999 | Sato | |
| 6,141,156 | A | | 10/2000 | Aoki | |
| 7,830,612 | B2 | * | 11/2010 | Hagiwara | 359/676 |
| 2005/0168807 | A1 | | 8/2005 | Endo | |
| 2006/0285224 | A1 | | 12/2006 | Endo et al. | |
| 2008/0218875 | A1 | | 9/2008 | Kuroda et al. | |

FOREIGN PATENT DOCUMENTS

| JP | 08-062541 A | 3/1996 |
| JP | 10-133109 A | 5/1998 |
| JP | 11-174324 A | 7/1999 |
| JP | 11-174325 A | 7/1999 |
| JP | 11-223770 A | 8/1999 |
| JP | 11-258504 | 9/1999 |
| JP | 11-316342 A | 11/1999 |
| JP | 2000-047101 A | 2/2000 |
| JP | 2004-212612 | 7/2004 |
| JP | 2005-215389 A | 8/2005 |
| JP | 2006-171628 A | 6/2006 |

(Continued)

*Primary Examiner* — Darryl J Collins
(74) *Attorney, Agent, or Firm* — Miles & Stockbridge P.C.

(57) ABSTRACT

A variable magnification optical system ZL has, in order from the object side, a first lens unit G1 with a positive refractive power, a second lens unit G2 with a negative refractive power, a third lens unit G3 with a positive refractive power, a fourth lens unit G4, and a fifth lens unit G5 with a positive refractive power, and is configured to satisfy conditions of the following expressions:

$2.49 < |f4|/f5 < 4.69$; and $-0.05 \leq \beta 5w < 0.085$, where f4 is a focal length of the fourth lens unit, f5 is a focal length of the fifth lens unit, and $\beta 5w$ is a lateral magnification of the fifth lens unit in the wide-angle end state.

19 Claims, 35 Drawing Sheets

FOREIGN PATENT DOCUMENTS

| | | |
|---|---|---|
| JP | 2006-251462 | 9/2006 |
| JP | 2006-349947 A | 12/2006 |
| JP | 2007-003600 | 1/2007 |
| JP | 2007-192858 | 8/2007 |

\* cited by examiner

Fig.2
(a)
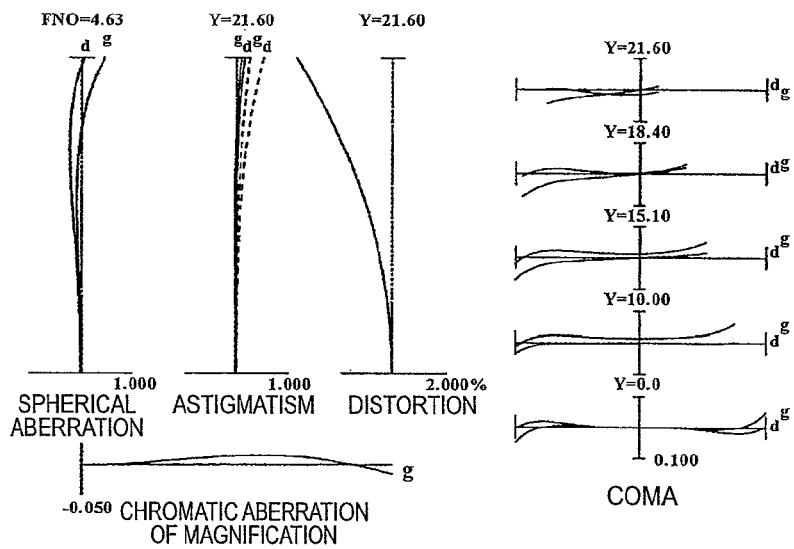
(b)
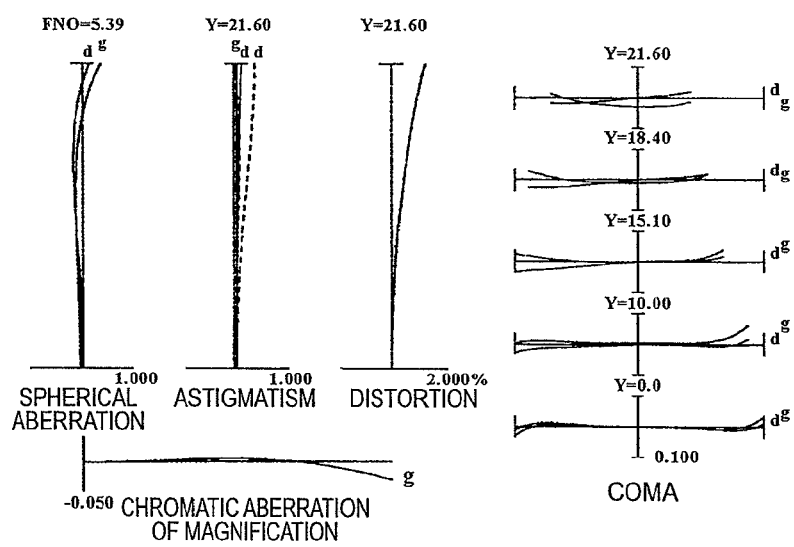
(c)
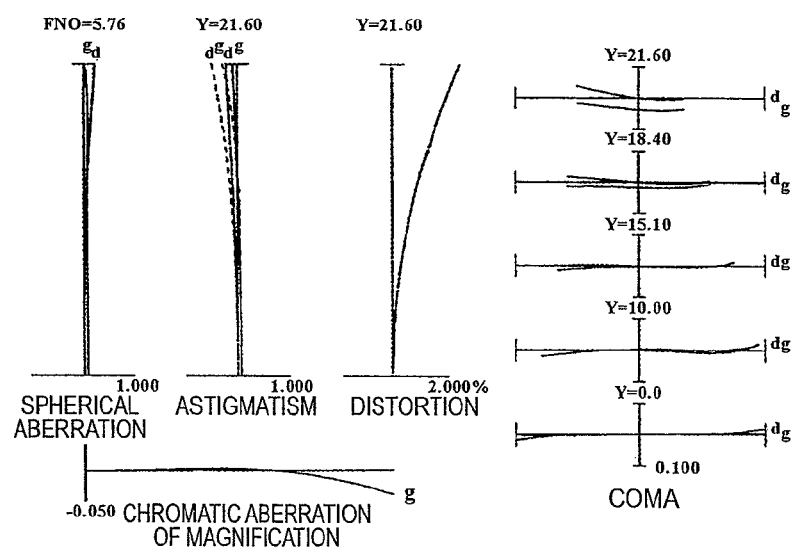

Fig.3
(a) 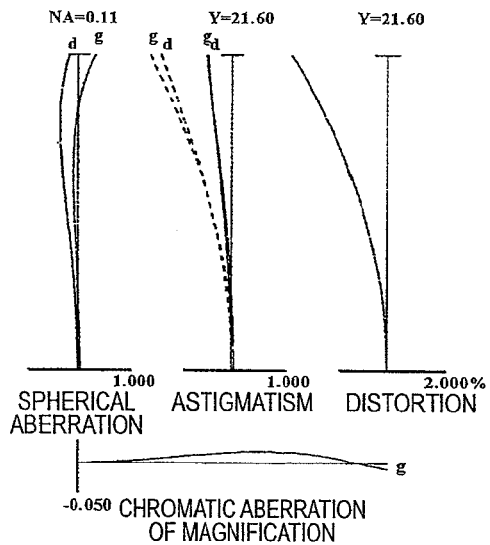 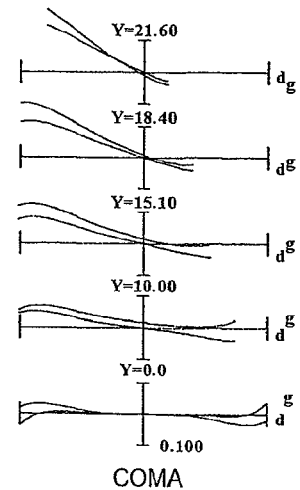
(b) 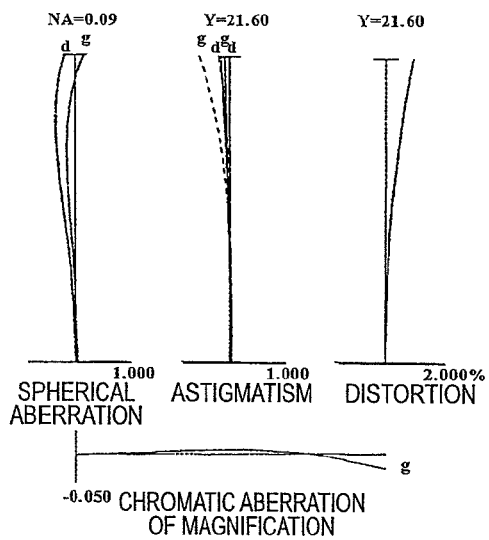 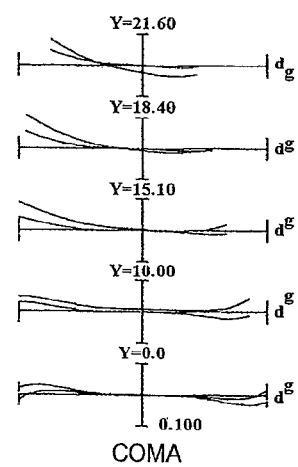
(c) 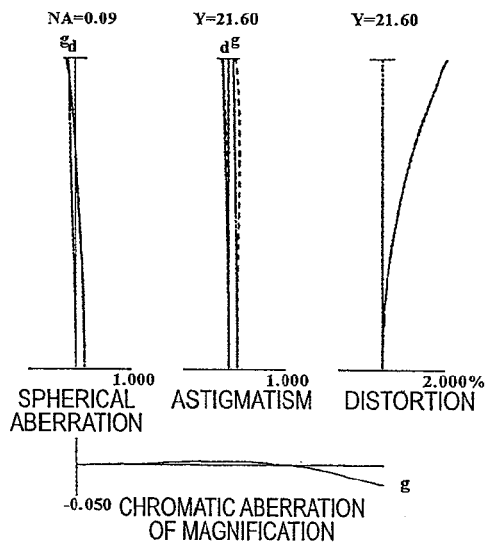 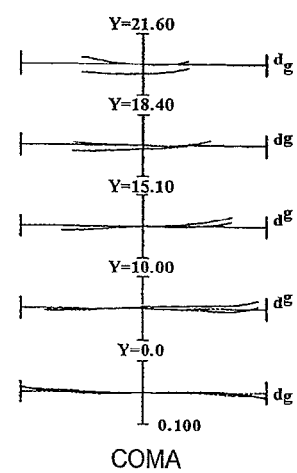

Fig.4
(a)
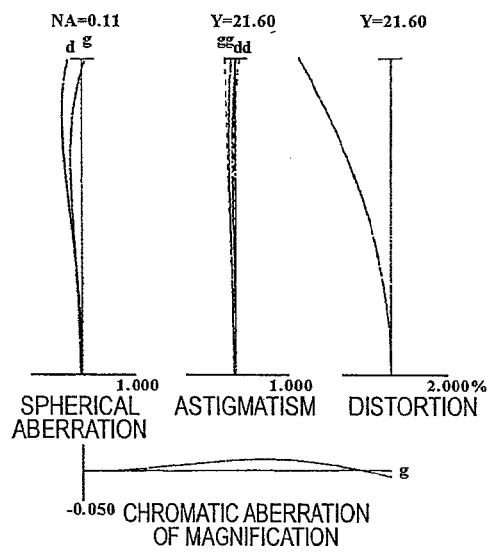
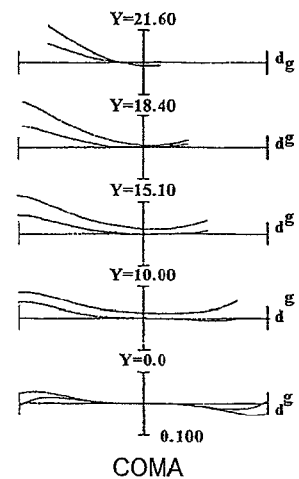
(b)
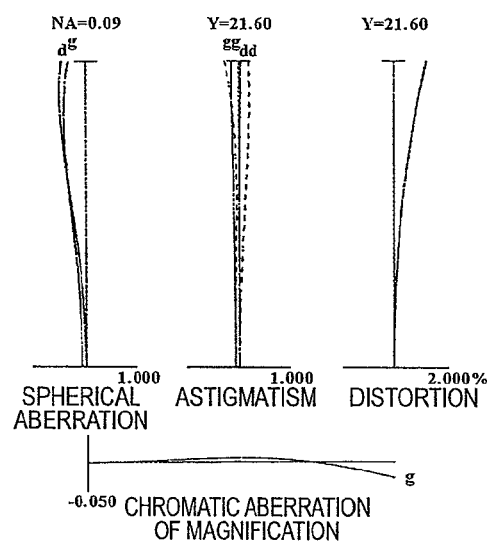
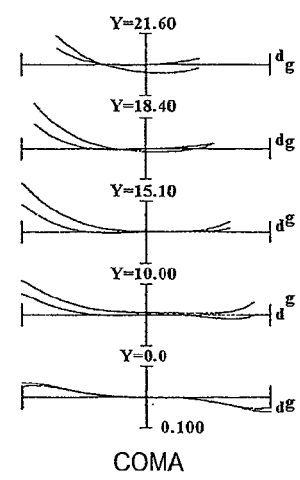
(c)
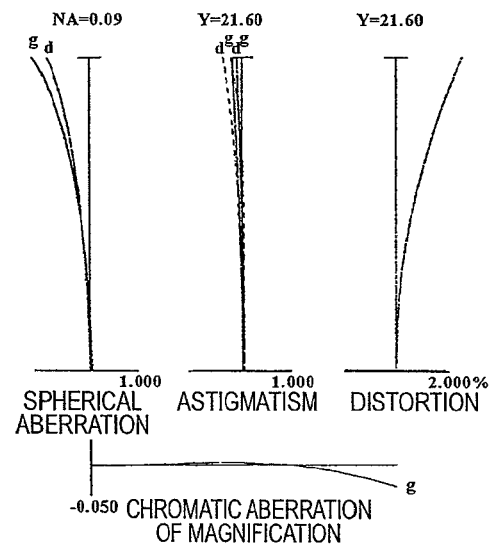
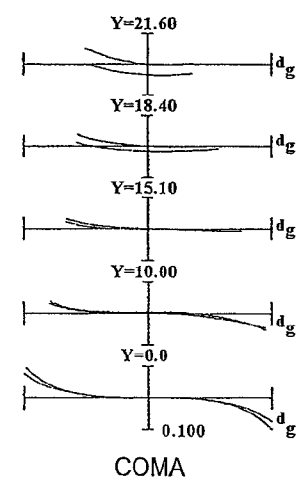

Fig.6
(a)
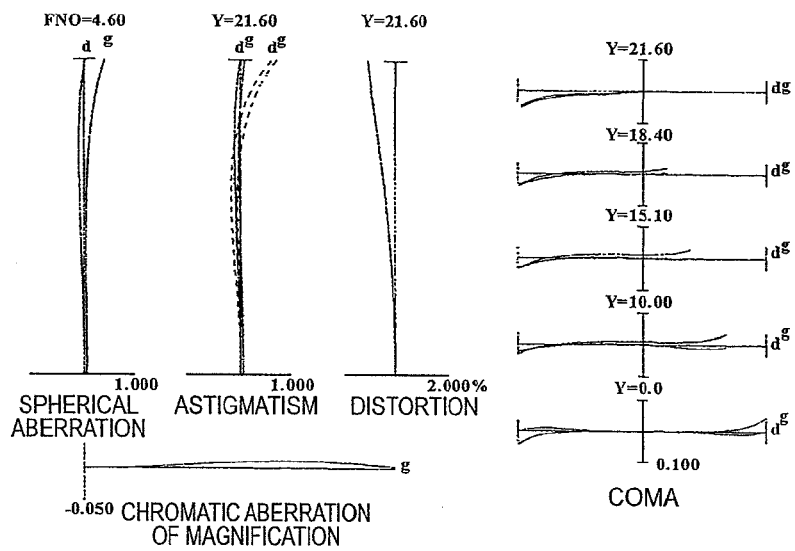
(b)
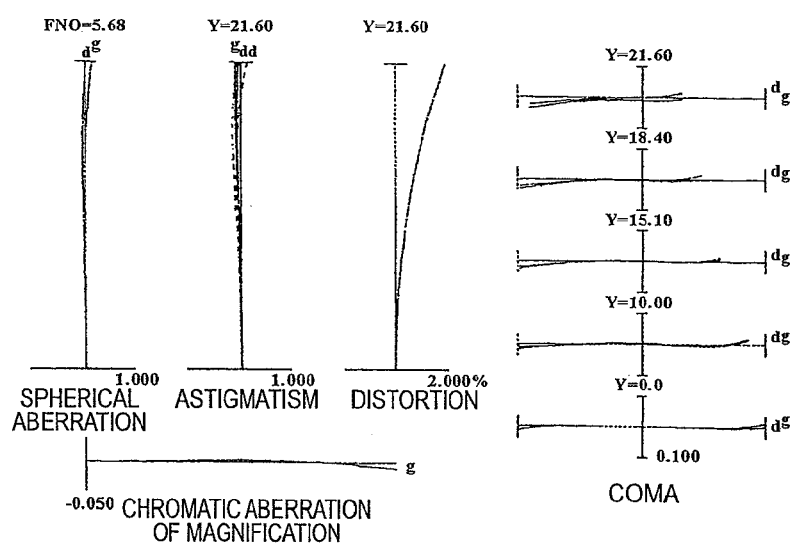
(c)
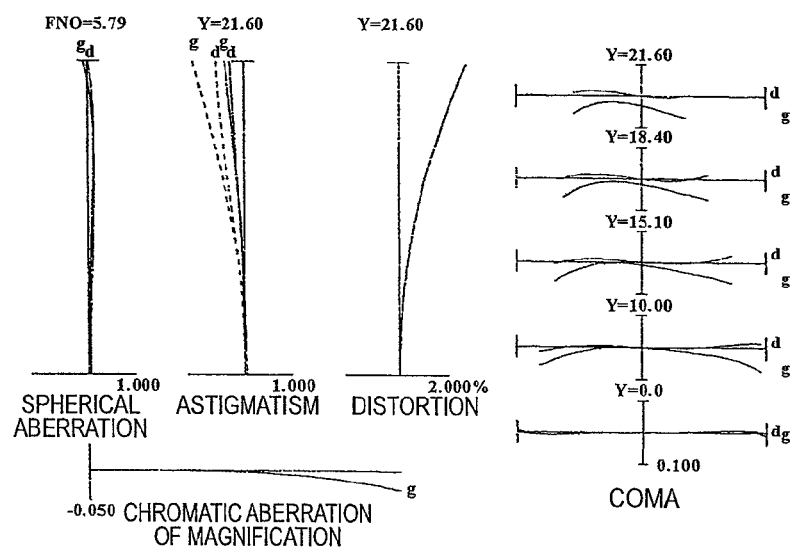

Fig.7
(a)
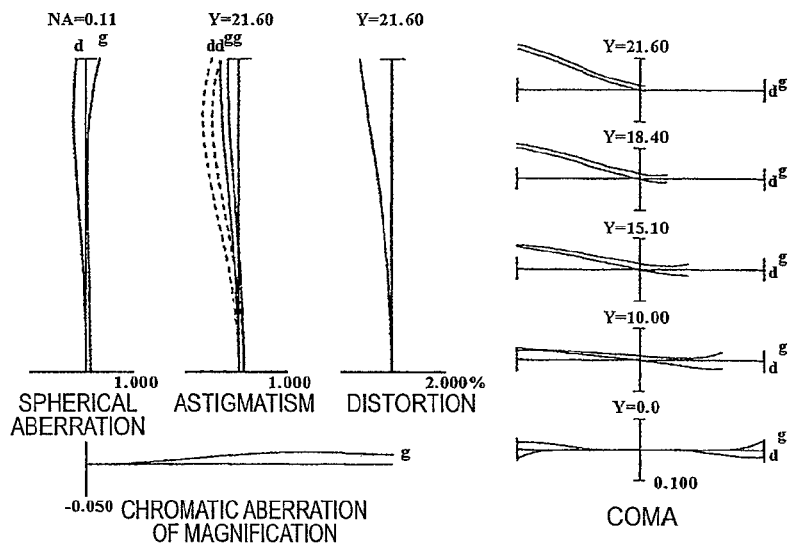
(b)
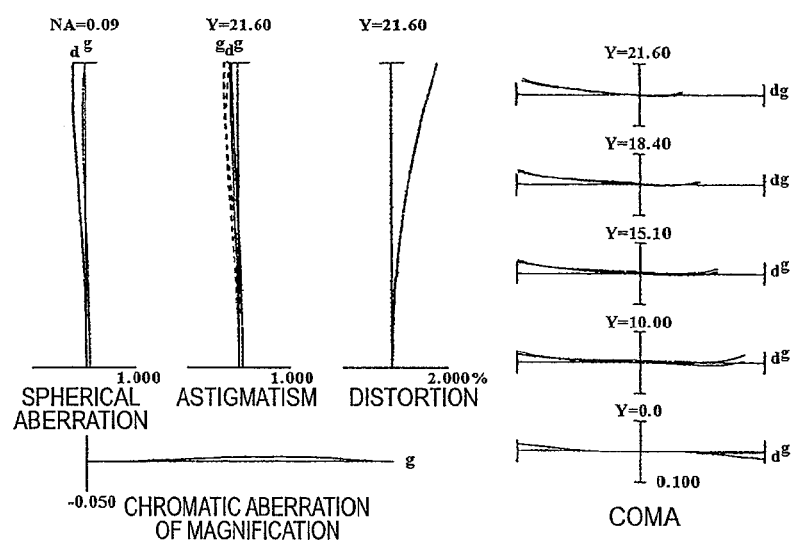
(c)
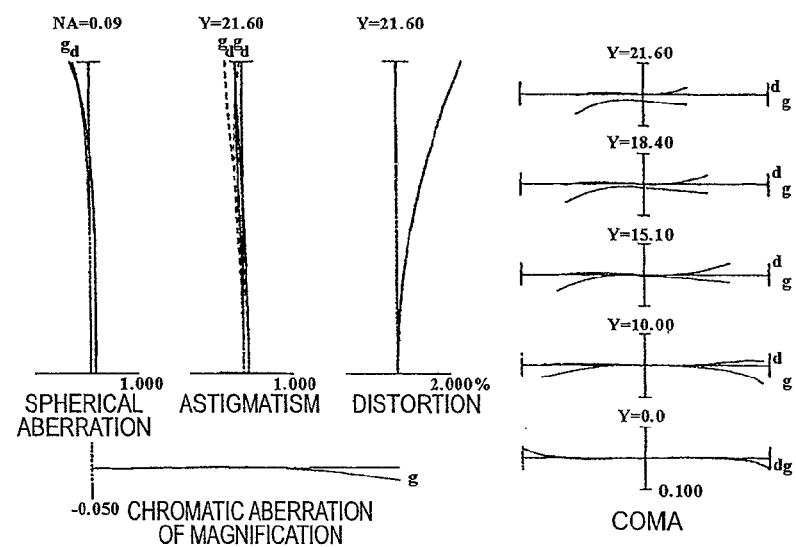

Fig.8
(a)
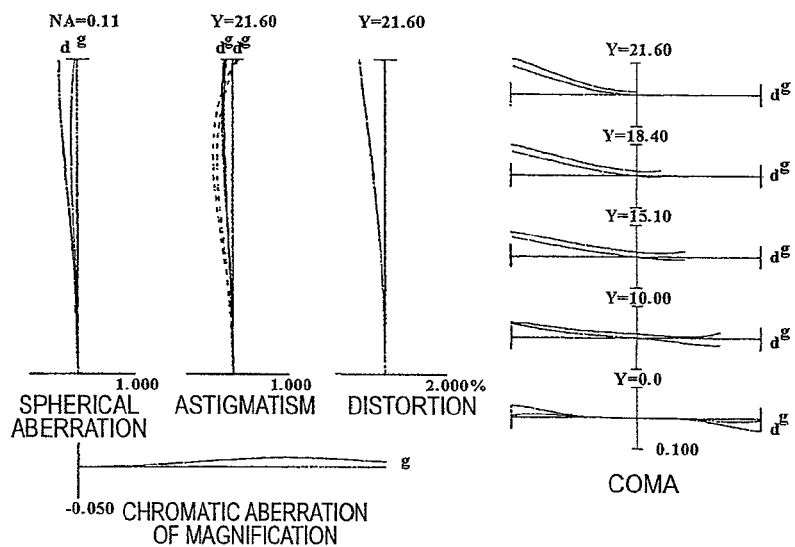
(b)
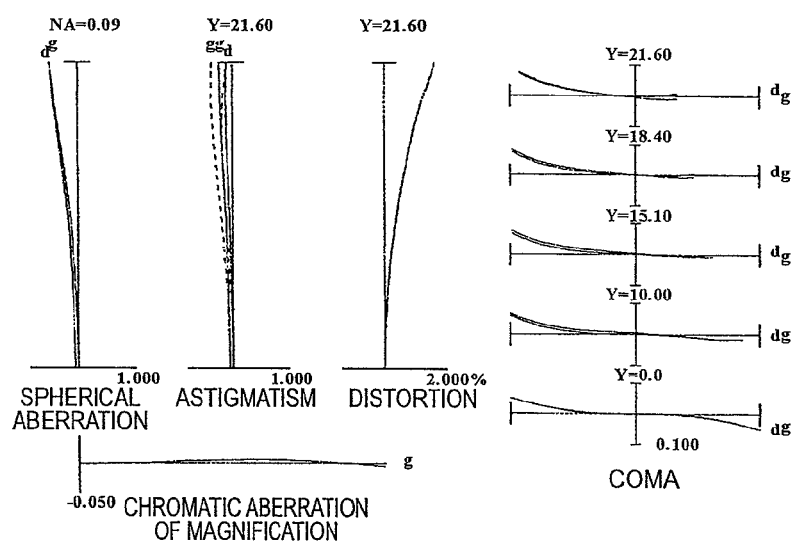
(c)
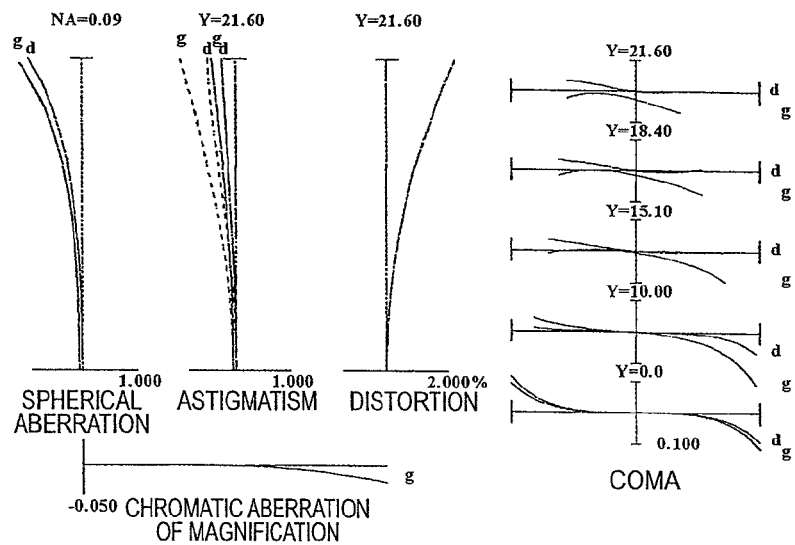

Fig.10
(a)
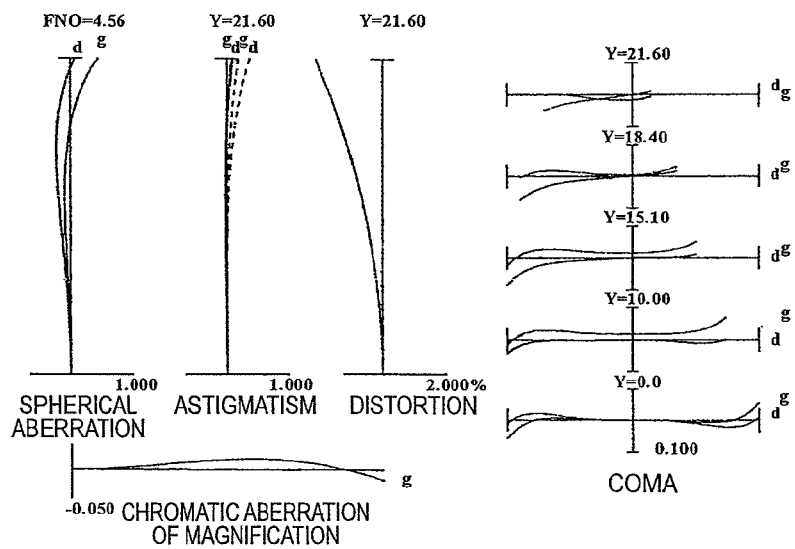
(b)
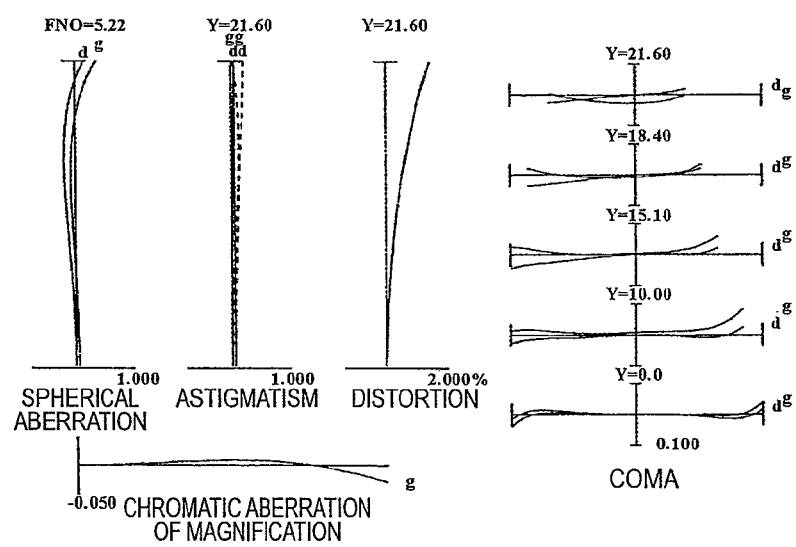
(c)
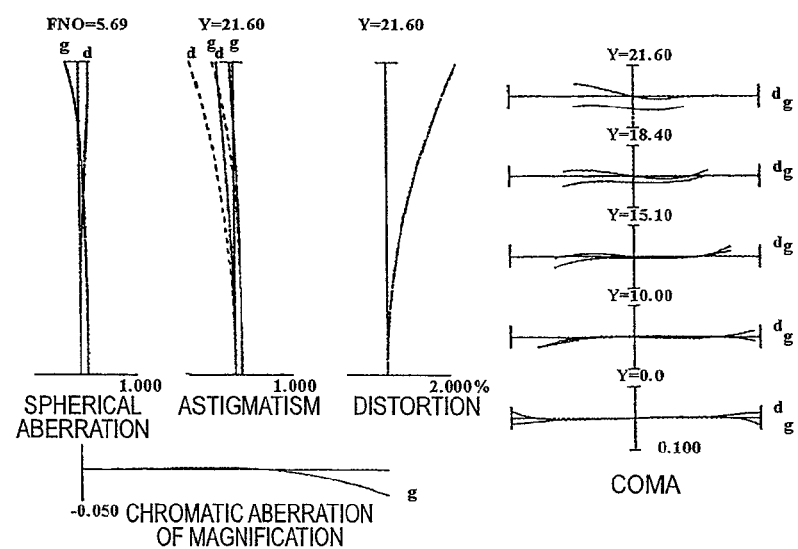

Fig.11
(a)
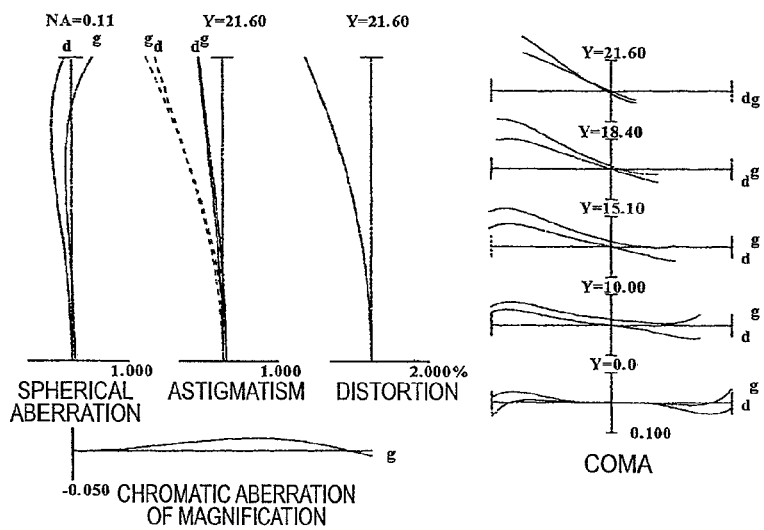
(b)
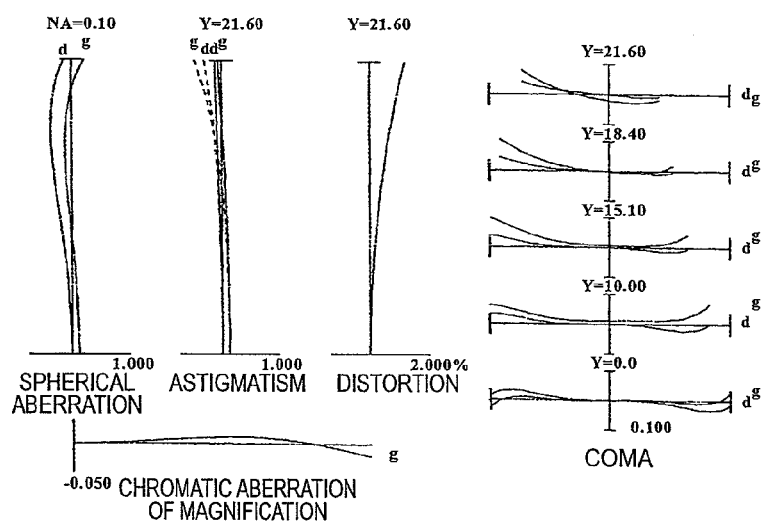
(c)
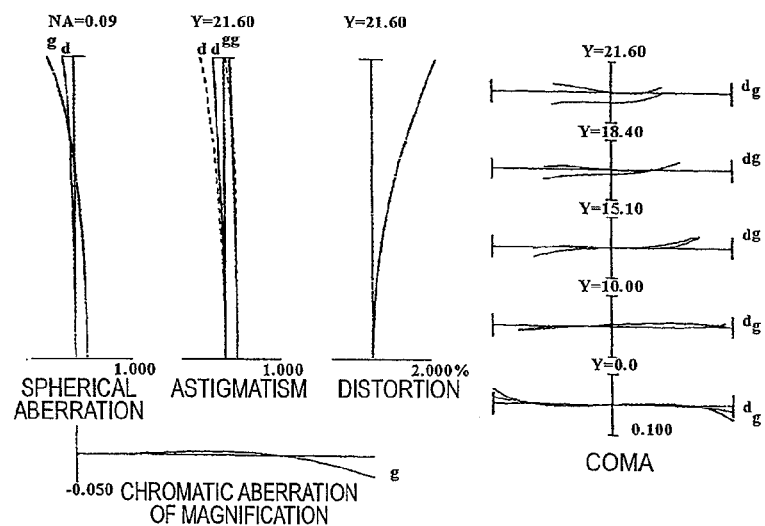

Fig.12
(a)
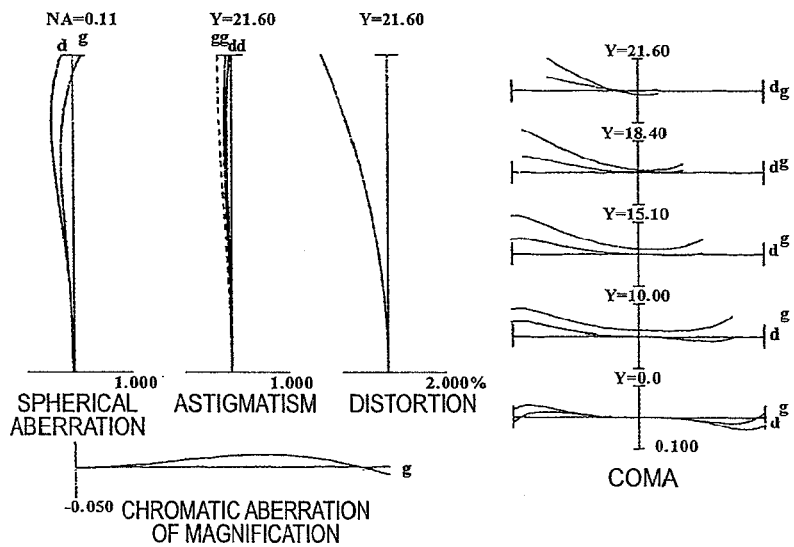
(b)
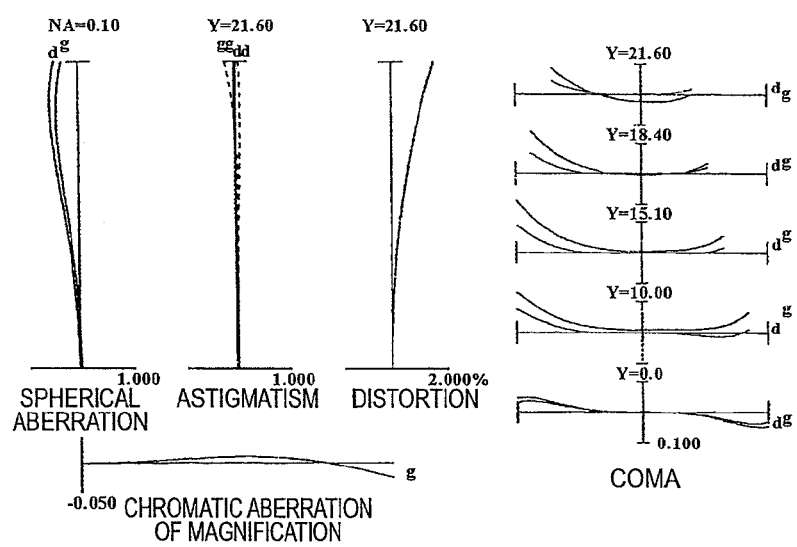
(c)
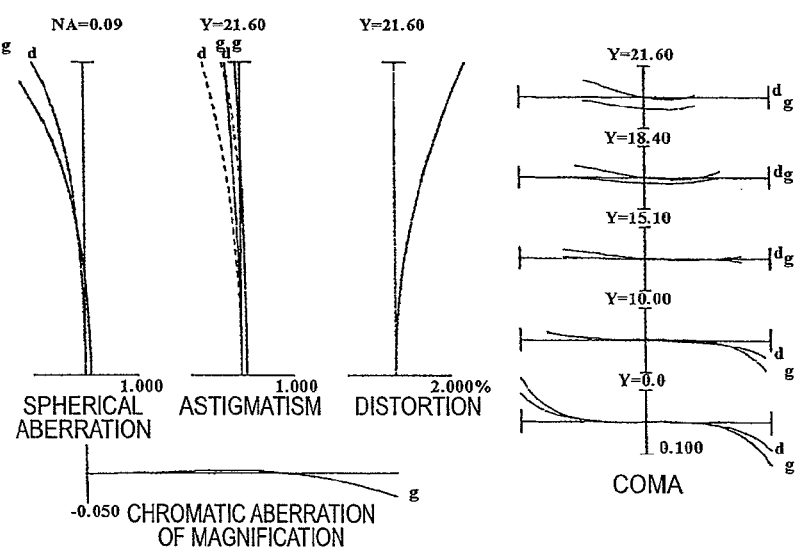

Fig.14
(a)
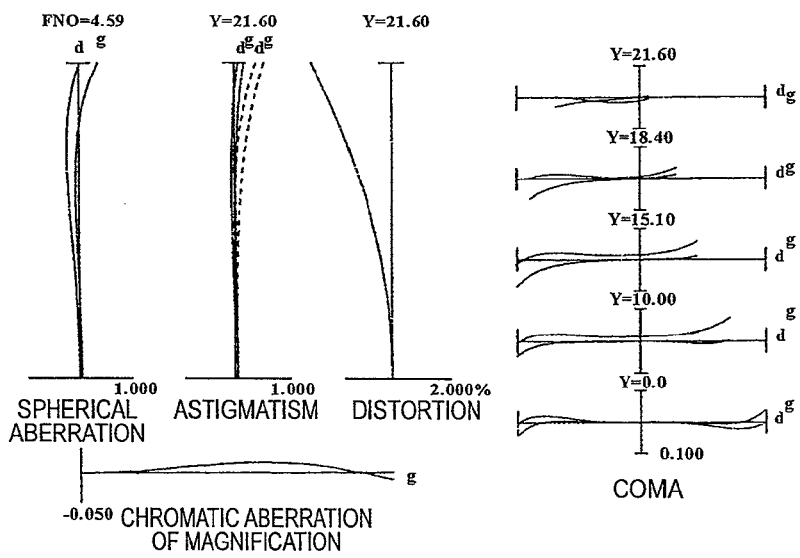
(b)
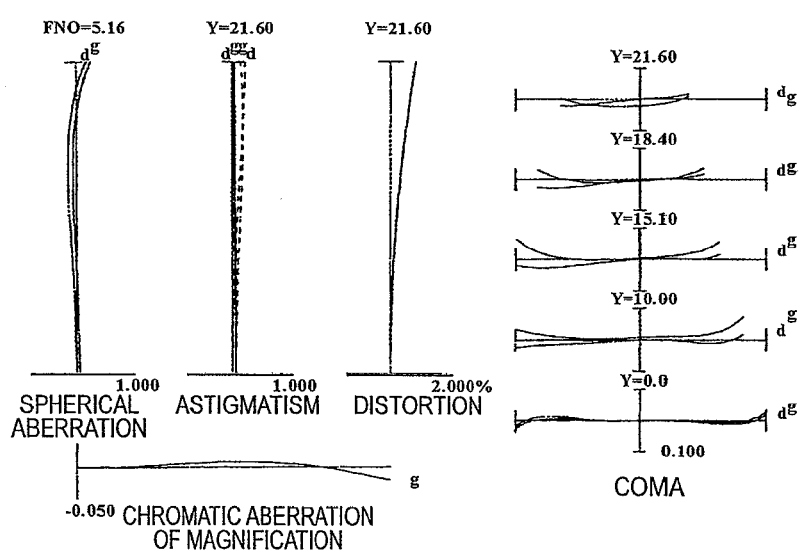
(c)
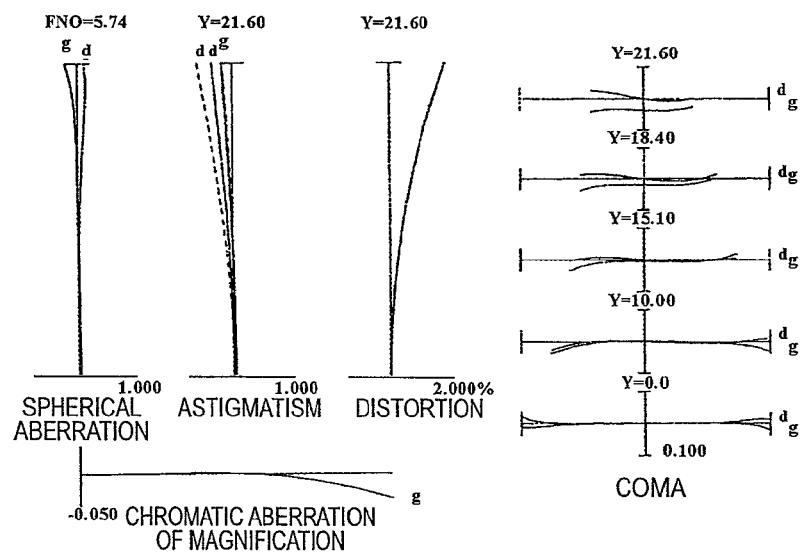

Fig.15
(a)
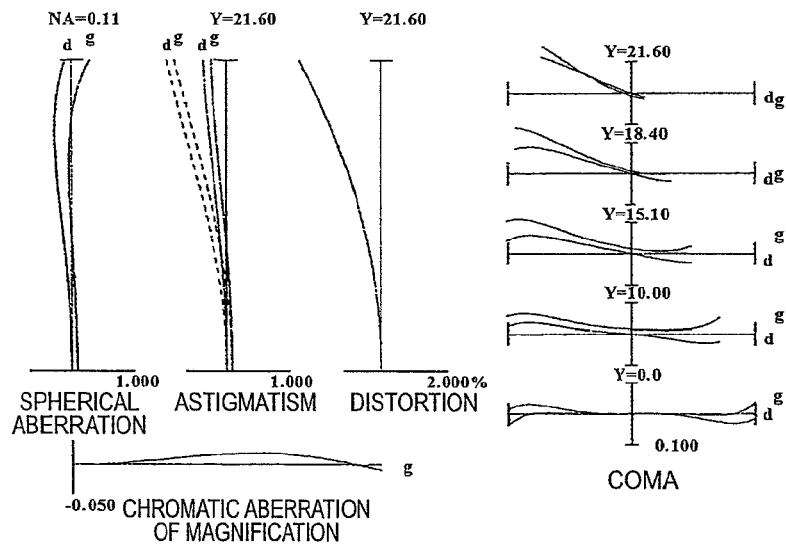
(b)
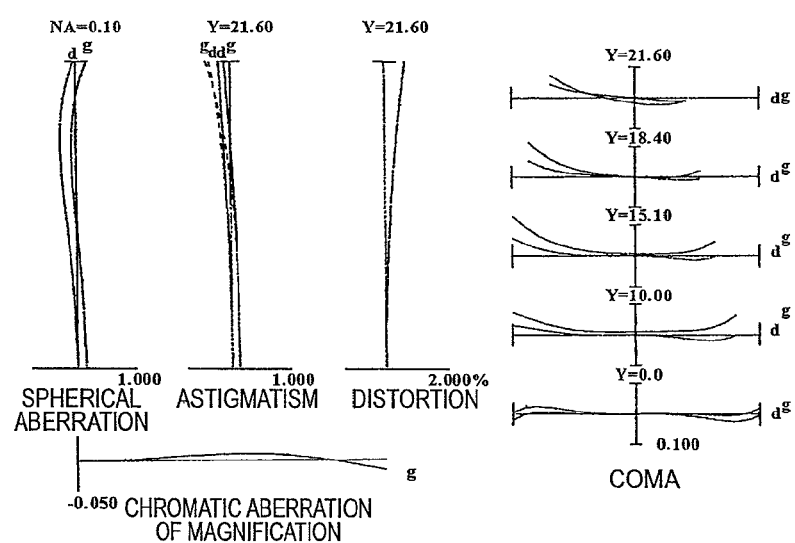
(c)
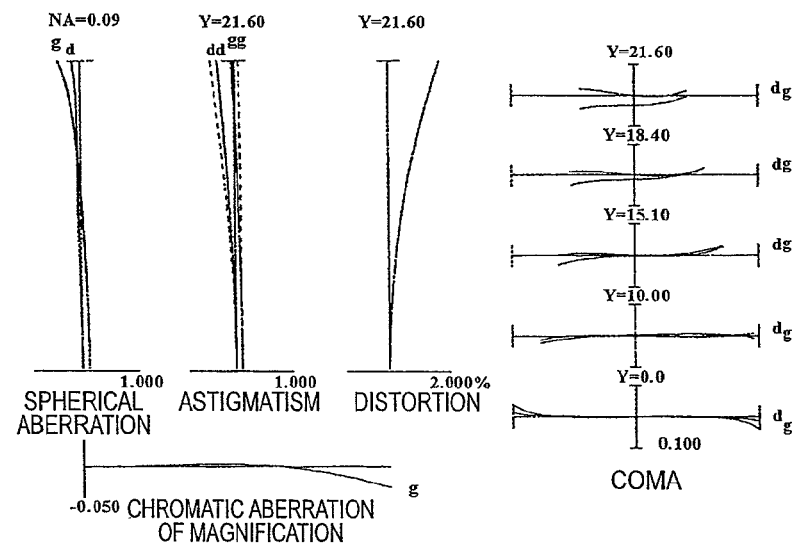

Fig.16
(a)
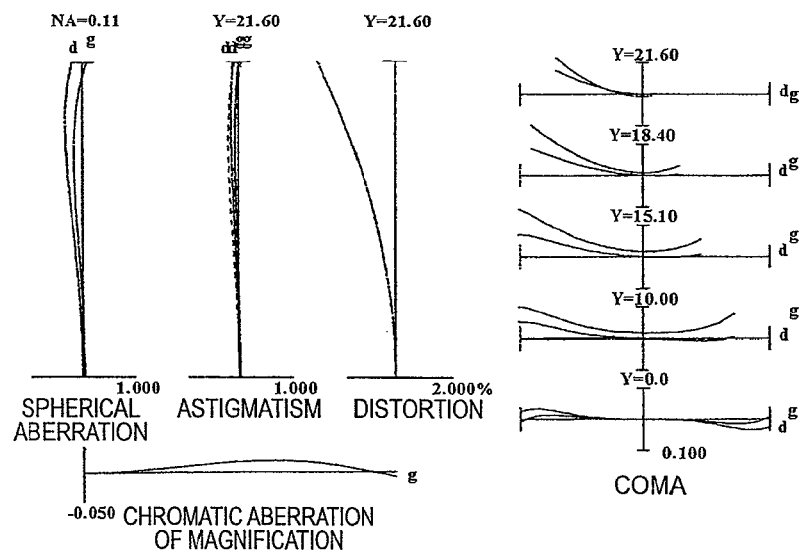
(b)
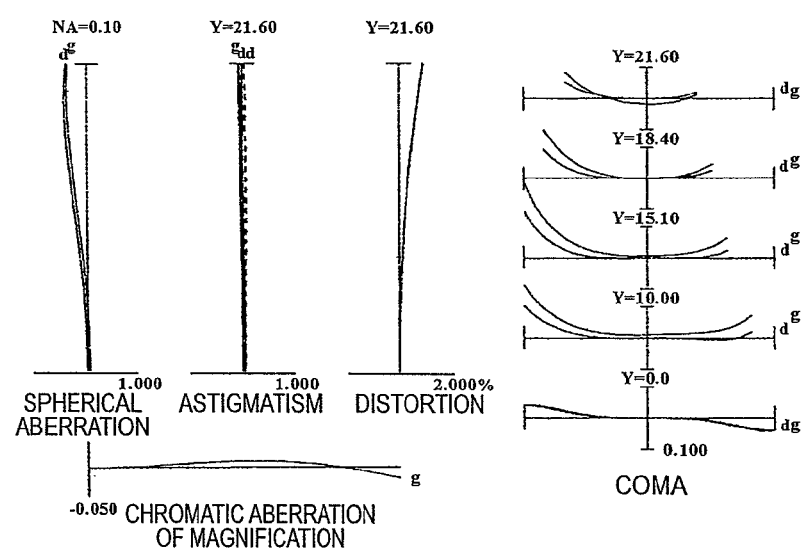
(c)
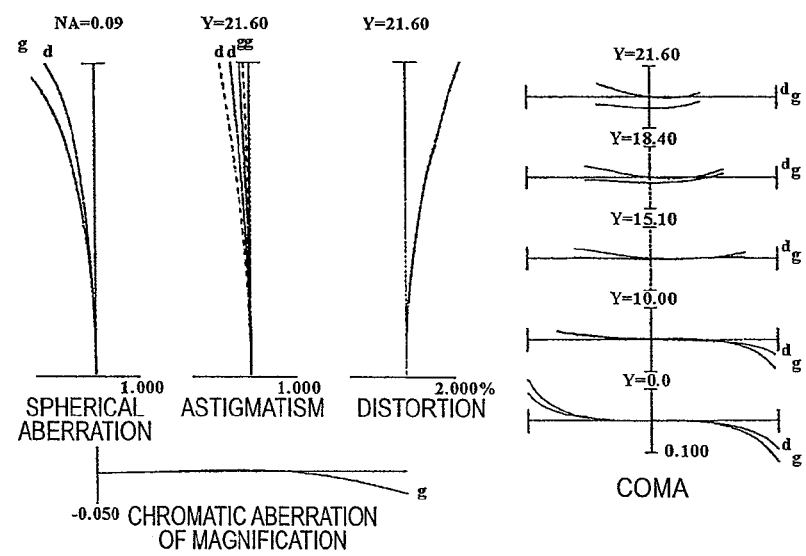

Fig.18
(a)
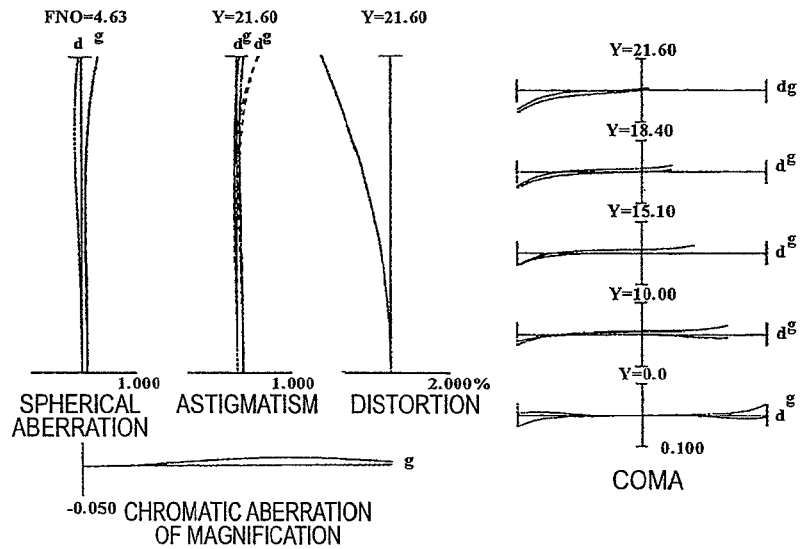
(b)
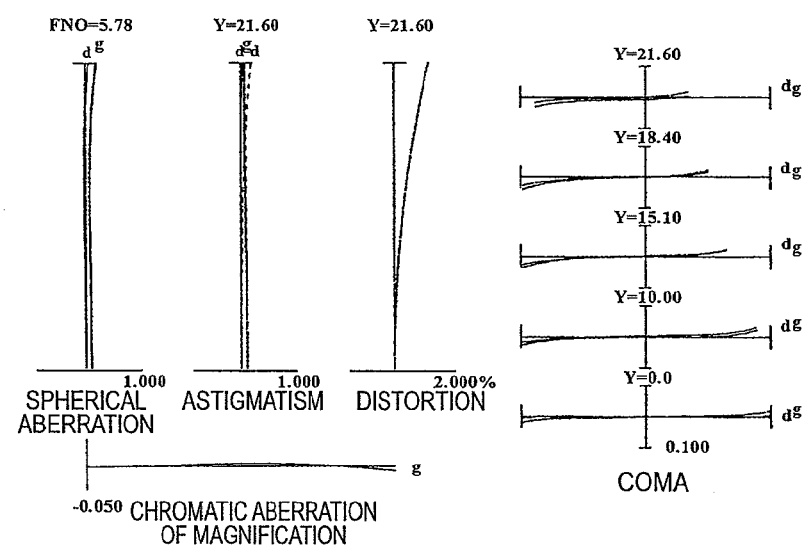
(c)
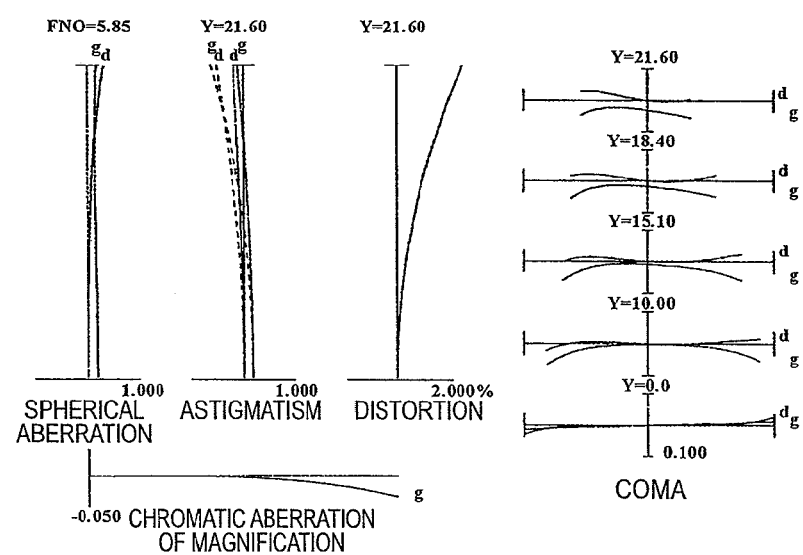

*Fig.19*
(a)
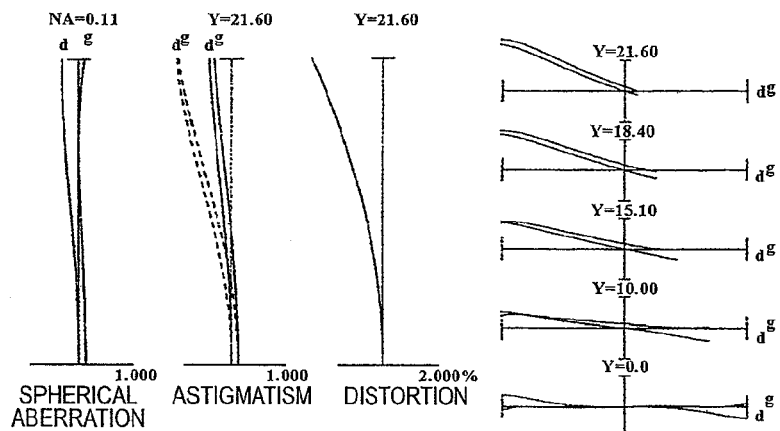
(b)
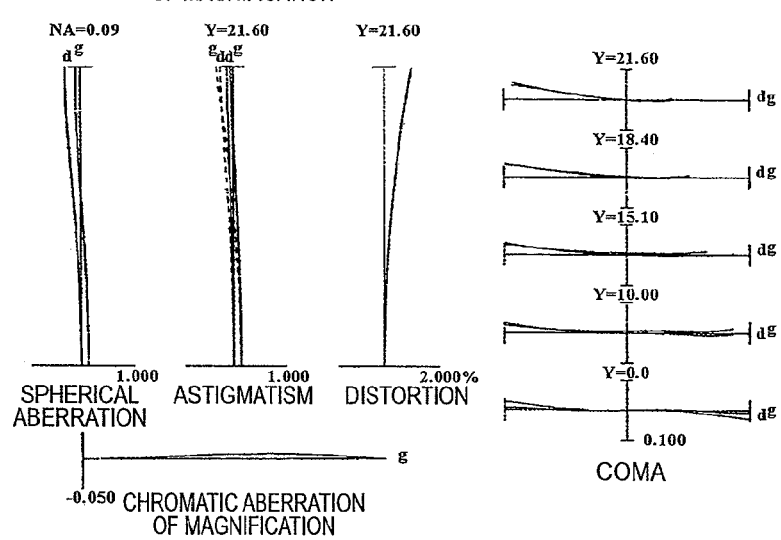
(c)
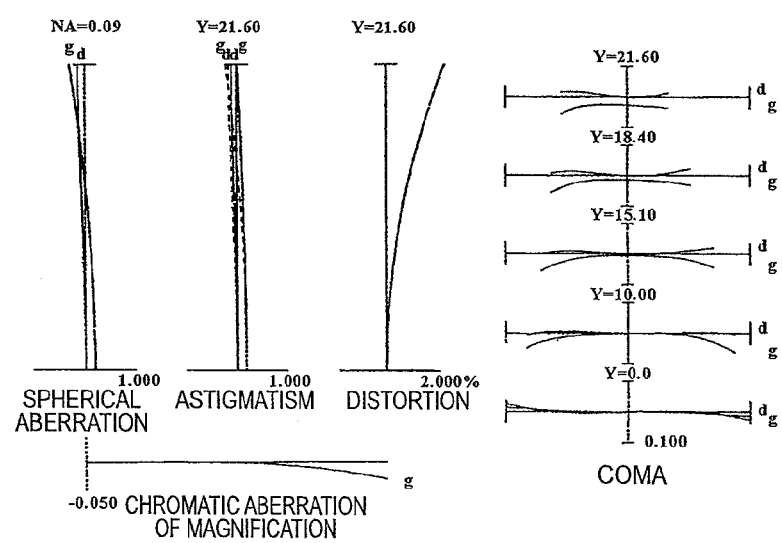

Fig.20
(a)
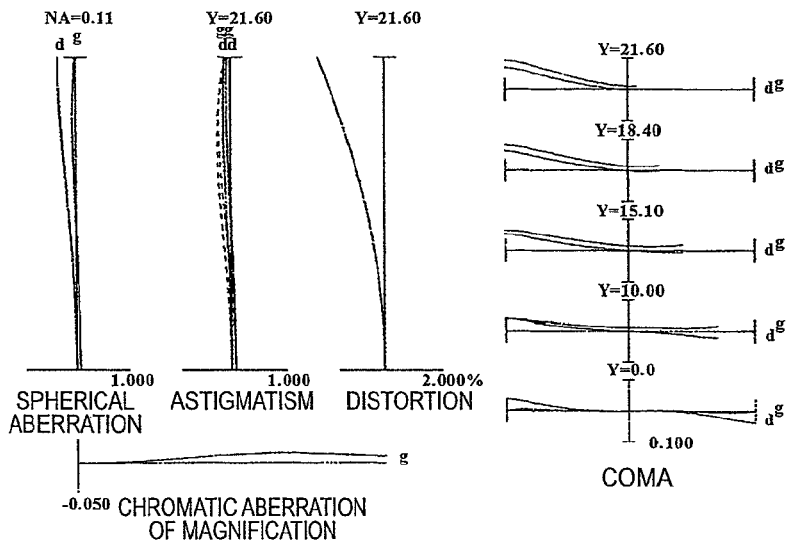
(b)
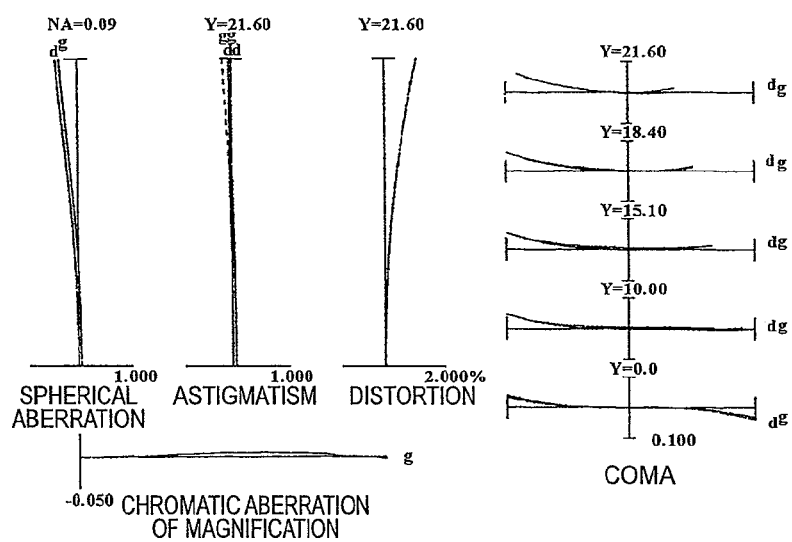
(c)
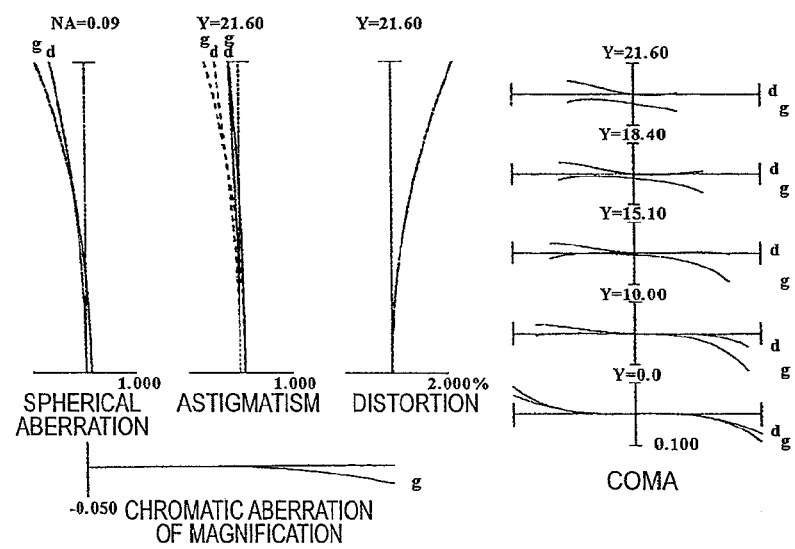

Fig.23
(a)
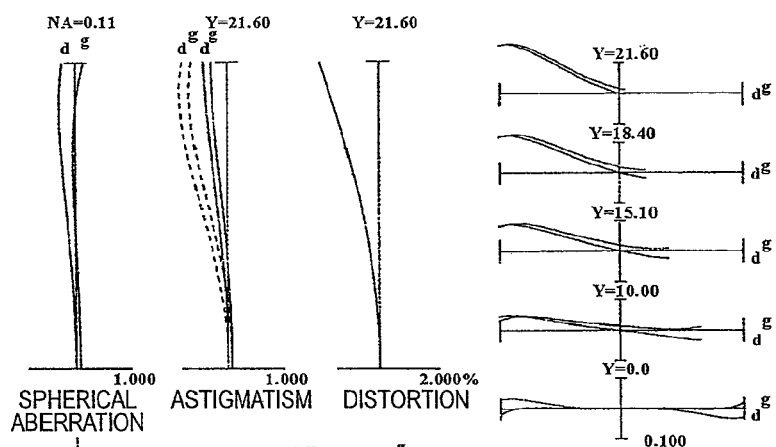
(b)
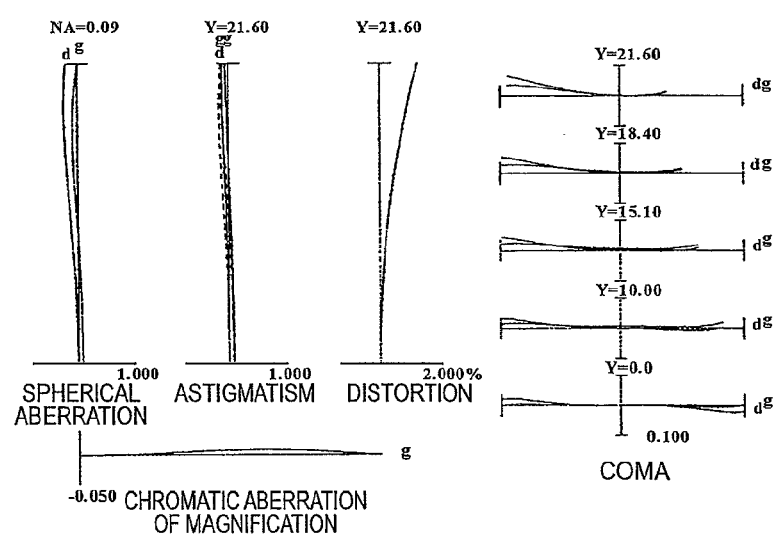
(c)
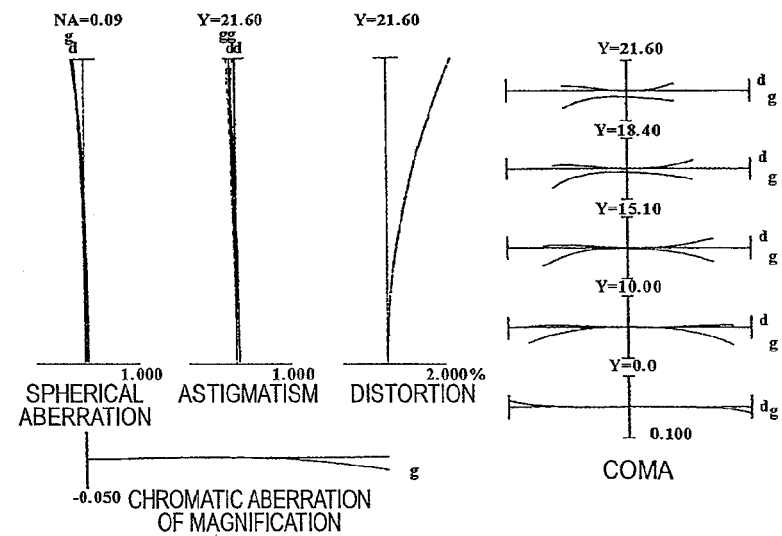

Fig.26
(a)
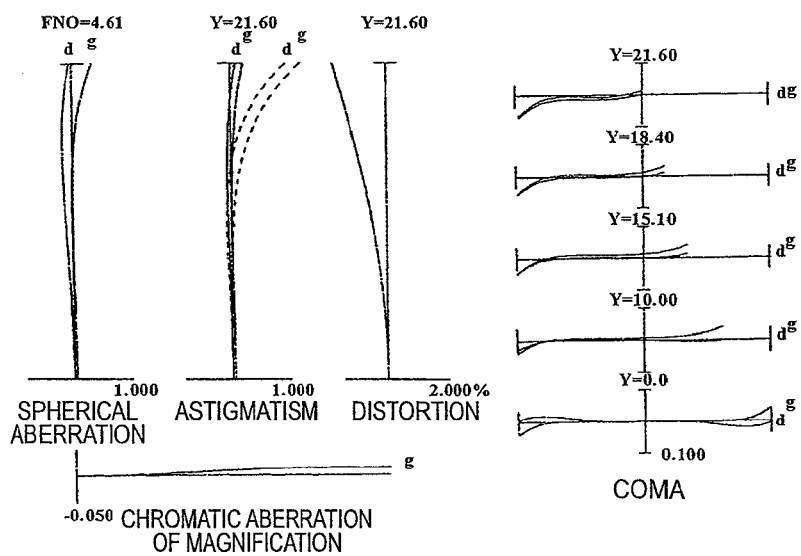
(b)
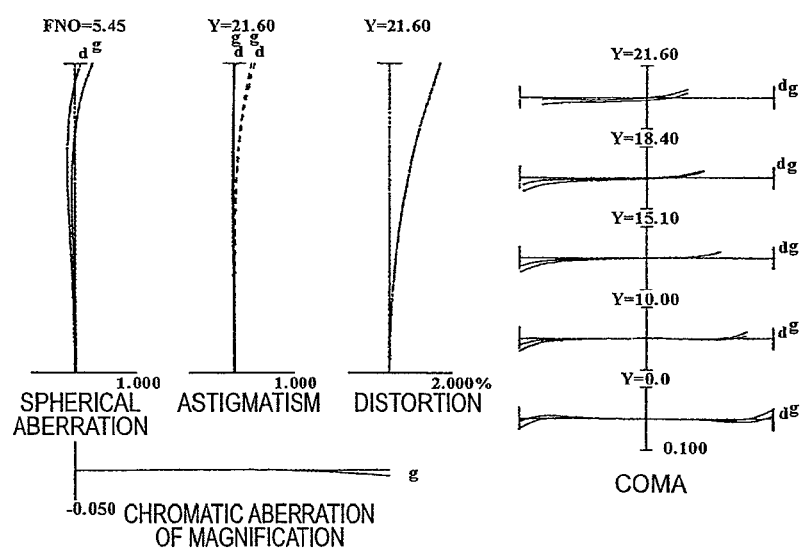
(c)
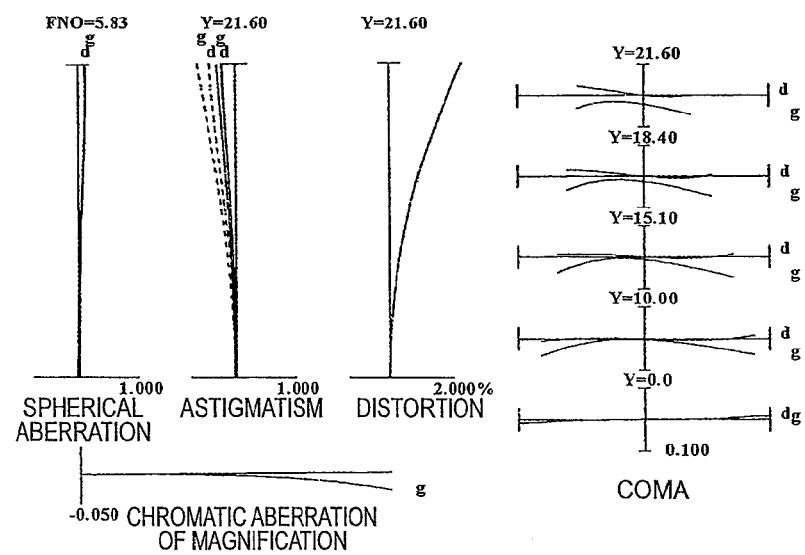

Fig.27
(a)
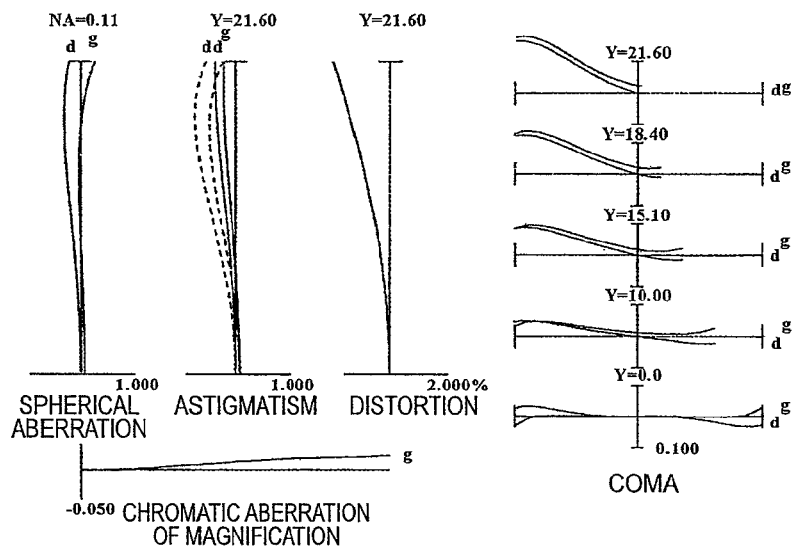
(b)
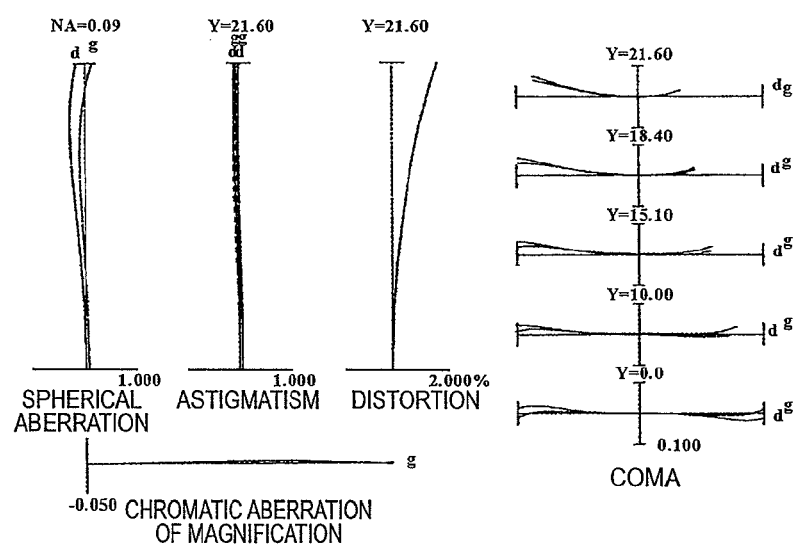
(c)
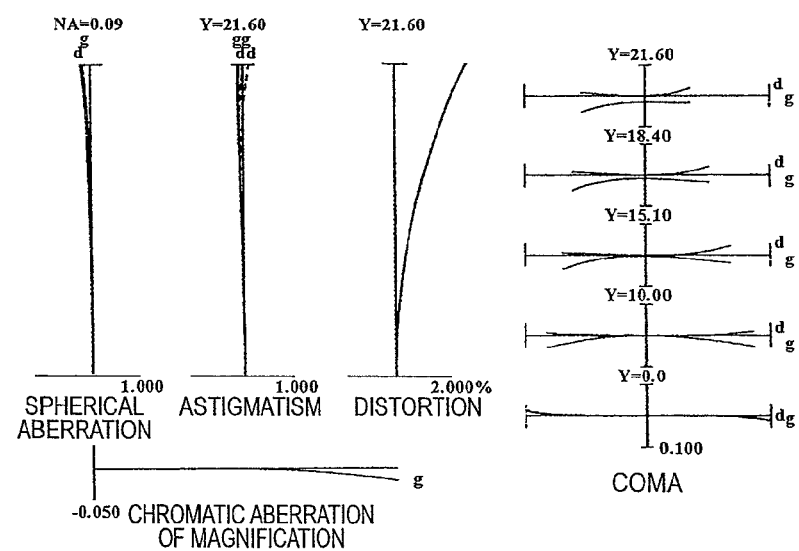

Fig.28
(a)
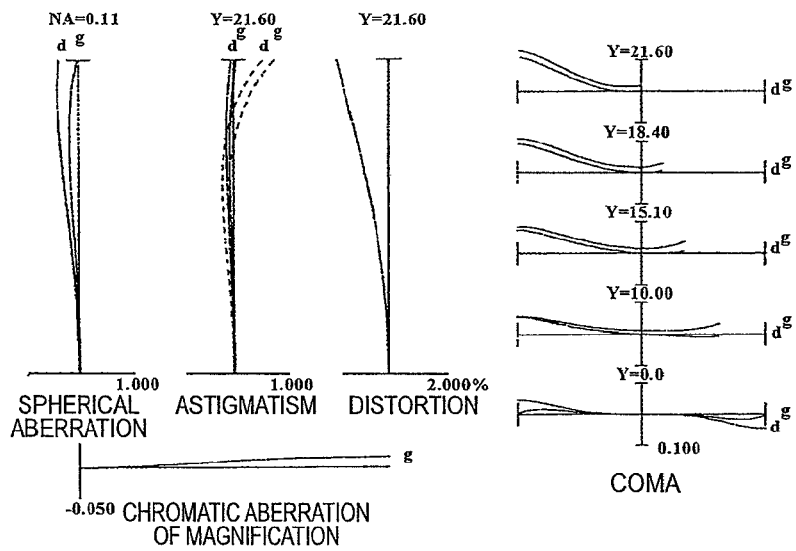
(b)
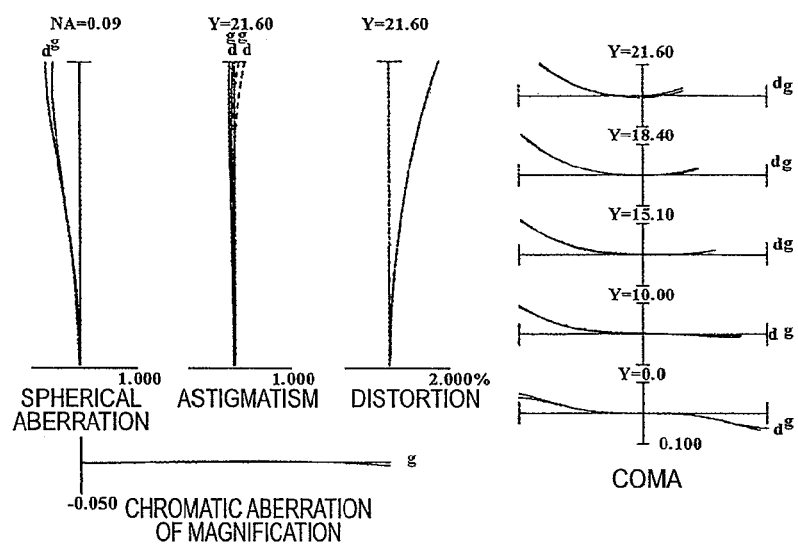
(c)
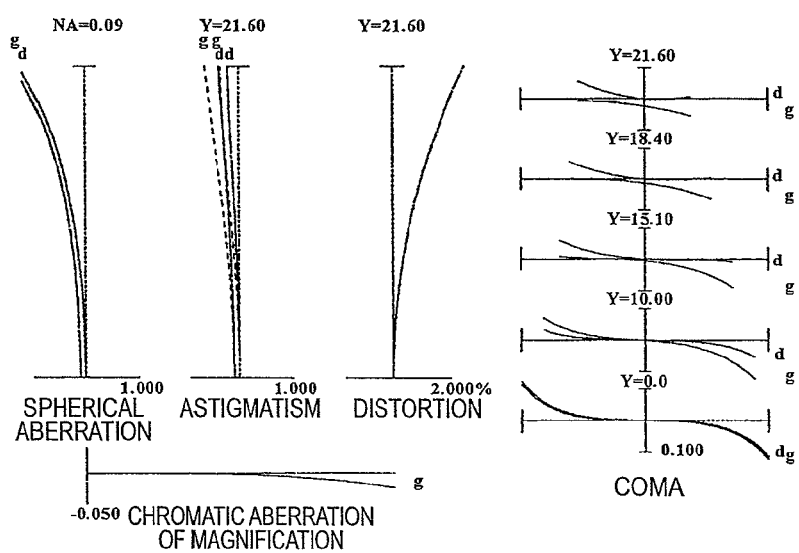

Fig.30
(a)
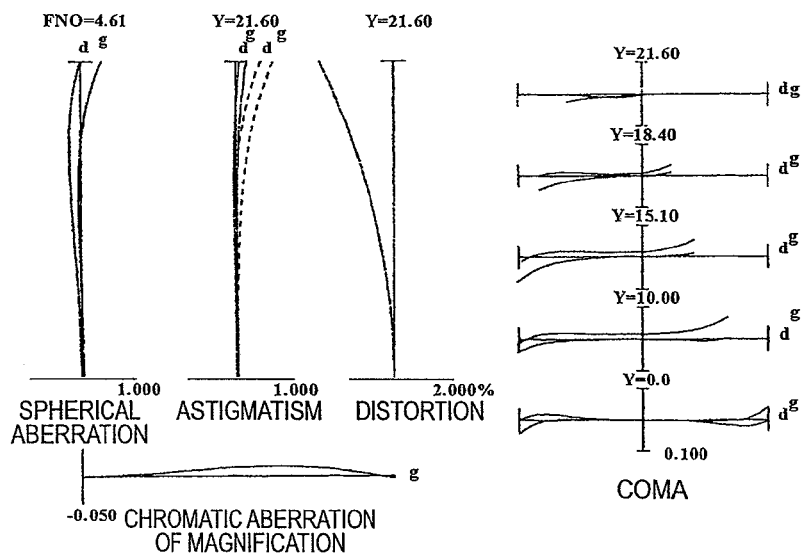
(b)
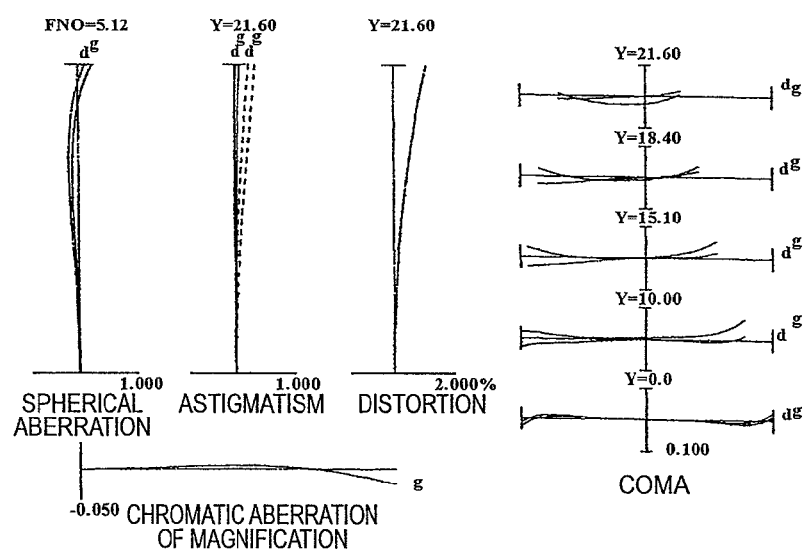
(c)
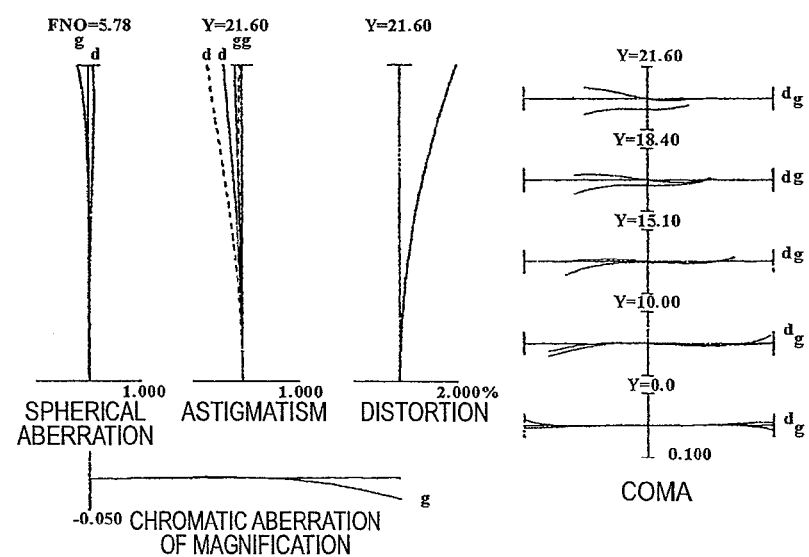

Fig.31
(a)
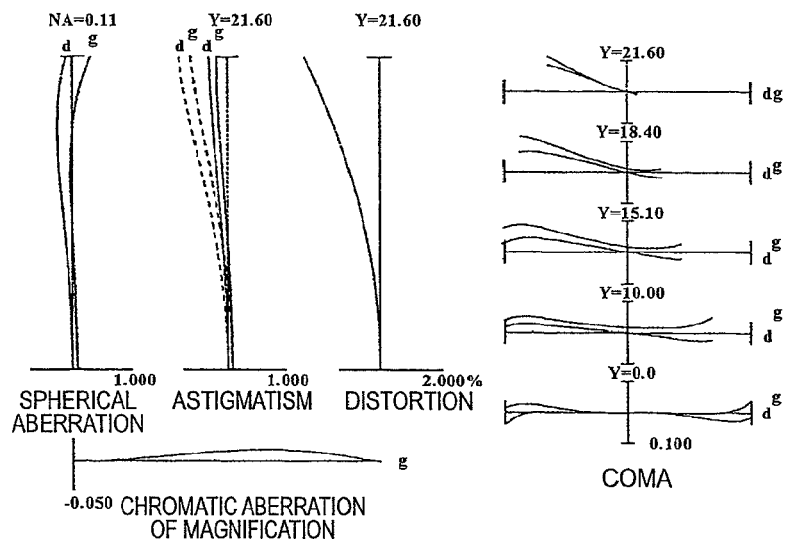
(b)
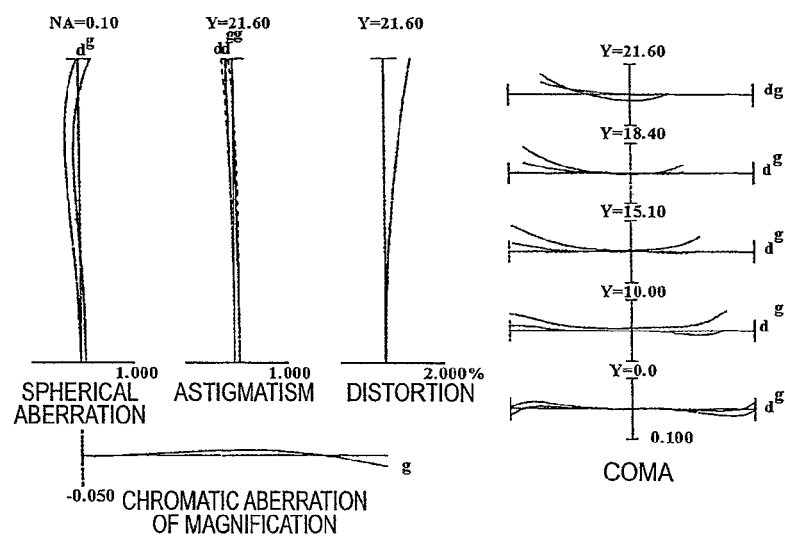
(c)
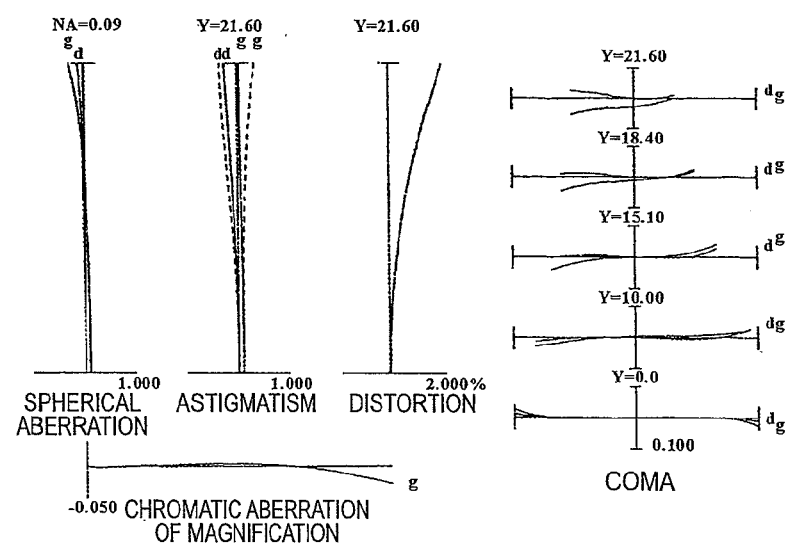

Fig.32
(a)
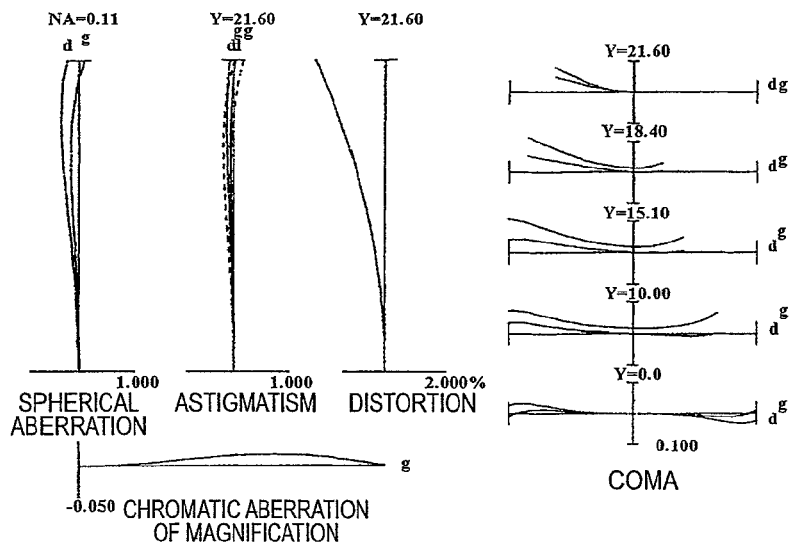
(b)
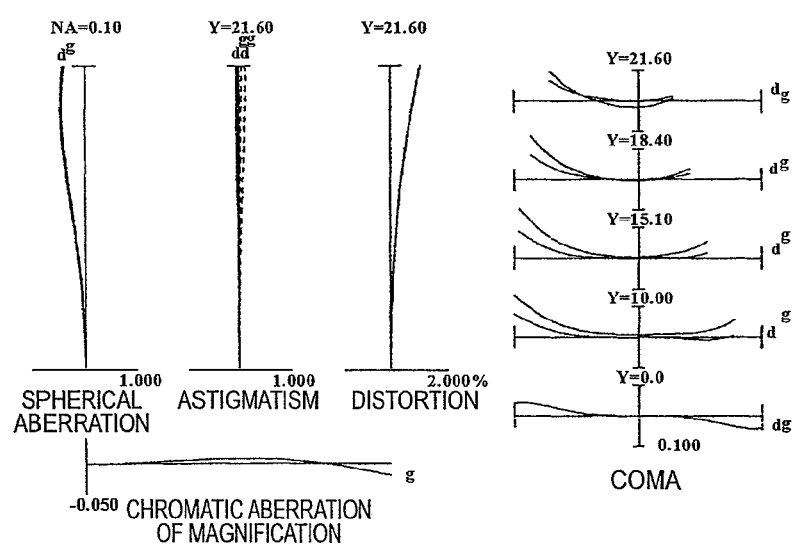
(c)
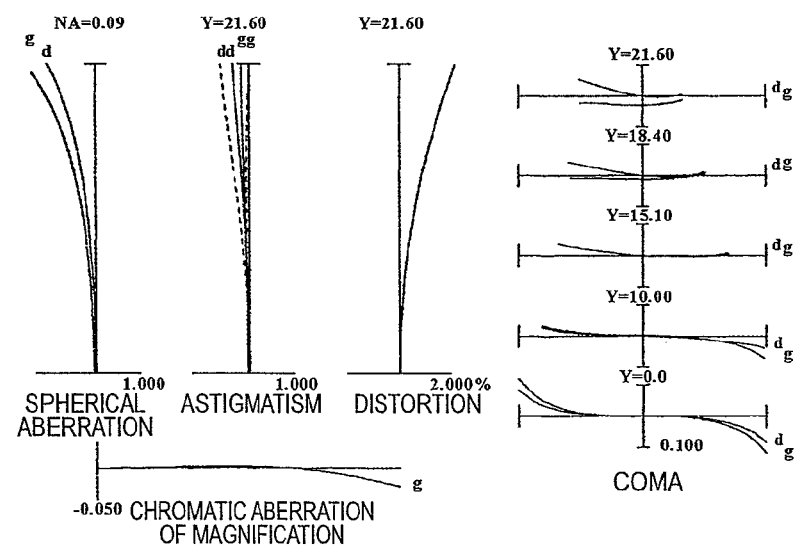

VARIABLE MAGNIFICATION OPTICAL SYSTEM, OPTICAL APPARATUS PROVIDED WITH THE VARIABLE MAGNIFICATION OPTICAL SYSTEM AND METHOD FOR MANUFACTURING VARIABLE MAGNIFICATION OPTICAL SYSTEM

TECHNICAL FIELD

The present invention relates to a variable magnification optical system and an optical apparatus provided with the variable magnification optical system.

BACKGROUND ART

A conventional focusing method of a zoom lens is a method of feeding the first lens unit, so called a front lens feeding method. It is because this method has the advantage that it enables focusing by an identical feed amount for an object at an identical object distance throughout the entire variable magnification range and is realized in a simple structure. (For example, reference is made to Patent Document 1).
Patent Document 1: Japanese Patent Application Laid-open No. 11-258504

DISCLOSURE OF THE INVENTION

Problem to be Solved by the Invention

However, the conventional front lens feeding method is generally a method of moving the large and heavy first lens unit and thus it had the problem that a holding mechanism and a driving mechanism for the focusing unit became so large as to make the focusing speed slow.

The present invention has been accomplished in view of the problem and it is an object of the present invention to provide a variable magnification optical system having excellent optical performance, being suitably applicable to a photographic camera, an electronic still camera, a video camera, or the like, and being capable of performing focusing at high speed, an optical apparatus provided with the variable magnification optical system, and a method for manufacturing the variable magnification optical system.

Means for Solving the Problem

In order to solve the problem, a variable magnification optical system according to the present invention comprises: in order from the object side, a first lens unit with a positive refractive power; a second lens unit with a negative refractive power; a third lens unit with a positive refractive power; a fourth lens unit; and a fifth lens unit with a positive refractive power, and the variable magnification optical system is configured to satisfy conditions of the following expressions:

$$2.49 < |f4|/f5 < 4.69; \text{ and}$$

$$-0.10 < \beta 5w < 0.085,$$

where f4 is a focal length of the fourth lens unit, f5 is a focal length of the fifth lens unit, and β5w is a lateral magnification of the fifth lens unit in a wide-angle end state.

In the foregoing variable magnification optical system, preferably, the fourth lens unit has a negative refractive index.

The variable magnification optical system preferably satisfies a condition of the following expression:

$$(-f2)/f5 < 0.605,$$

where f2 is a focal length of the second lens unit.

The variable magnification optical system is preferably configured as follows: during change in a lens position state from the wide-angle end state to a telephoto end state, a space between the first lens unit and the second lens unit varies, a space between the second lens unit and the third lens unit varies, a space between the third lens unit and the fourth lens unit varies, and a space between the fourth lens unit and the fifth lens unit varies.

The variable magnification optical system is preferably configured to perform focusing onto a short-distance object by moving at least one lens unit out of the fifth lens unit and the fourth lens unit along the optical axis.

The variable magnification optical system is preferably configured to perform correction for an image plane upon occurrence of image blurring by moving the whole of the second lens unit or a part of the second lens unit along a direction perpendicular to the optical axis.

The variable magnification optical system is preferably configured as follows: it has an aperture stop on the image side of the third lens unit; during change in the lens position state from the wide-angle end state to the telephoto end state, the aperture stop is configured to move along the optical axis integrally with the third lens unit.

The variable magnification optical system preferably comprises a sixth lens unit with a negative refractive power disposed on the image side of the fifth lens unit.

The variable magnification optical system is preferably configured as follows: during change in the lens position state from the wide-angle end state to the telephoto end state, the space between the first lens unit and the second lens unit increases, the space between the second lens unit and the third lens unit decreases, the space between the third lens unit and the fourth lens unit increases, and the space between the fourth lens unit and the fifth lens unit decreases.

The variable magnification optical system is preferably configured as follows: during change in the lens position state from the wide-angle end state to the telephoto end state, the second lens unit is stationary relative to the image plane.

The variable magnification optical system is preferably configured as follows: during change in the lens position state from the wide-angle end state to the telephoto end state, the fourth lens unit is stationary relative to the image plane.

In the variable magnification optical system according to the present invention, the fourth lens unit is preferably composed of a single lens.

The variable magnification optical system is preferably composed of spherical lenses only.

An optical apparatus according to the present invention comprises any one of the above-described variable magnification optical systems, which focuses an image of an object on a predetermined image plane.

A manufacturing method of a variable magnification optical system according to the present invention is a method for manufacturing a variable magnification optical system comprising a first lens unit, a second lens unit, a third lens unit, a fourth lens unit, and a fifth lens unit in order from the object side, the method comprising the following steps of arranging each lens in the first lens unit so that the first lens unit has a positive refractive power; arranging each lens in the second lens unit so that the second lens unit has a negative refractive power; arranging each lens in the third lens unit so as to have a positive refractive power; and arranging each lens in the fourth lens unit and the fifth lens unit so as to satisfy the conditions below and so that the fifth lens unit has a positive refractive power, $$2.49 < |f4|/f5 < 4.69; \text{ and}$$

$$-0.10 < \beta 5w < 0.085,$$

where f4 is a focal length of the fourth lens unit, f5 a focal length of the fifth lens unit, and β5w a lateral magnification of the fifth lens unit in a wide-angle end state.

EFFECT OF THE INVENTION

As the variable magnification optical system according to the present invention, the optical apparatus comprising the variable magnification optical system, and the method for manufacturing the variable magnification optical system are configured as described above, it is feasible to realize the variable magnification optical system having excellent optical performance, being suitably applicable to a photographic camera, an electronic still camera, a video camera, or the like, and being capable of performing focusing at high speed by employing the inner focus method.

BRIEF DESCRIPTION OF THE DRAWINGS

FIG. 2 is various aberration diagrams in the infinity in-focus state in the first example, wherein (a) is various aberration diagrams with focus on infinity in the wide-angle end state, (b) various aberration diagrams with focus on infinity in an intermediate focal length state, and (c) various aberration diagrams with focus on infinity in the telephoto end state.

FIG. 3 is various aberration diagrams in a short-distance fifth-unit in-focus state in the first example, wherein (a) is various aberration diagrams with focus on a short-distance object by the fifth lens unit in the wide-angle end state, (b) various aberrations with focus on a short-distance object by the fifth lens unit in an intermediate focal length state, and (c) various aberrations with focus on a short-distance object by the fifth lens unit in the telephoto end state.

FIG. 4 is various aberration diagrams in a short-distance fourth-unit in-focus state in the first example, wherein (a) is various aberration diagrams with focus on a short-distance object by the fourth lens unit in the wide-angle end state, (b) various aberrations with focus on a short-distance object by the fourth lens unit in an intermediate focal length state, and (c) various aberrations with focus on a short-distance object by the fourth lens unit in the telephoto end state.

FIG. 6 is various aberration diagrams in the infinity in-focus state in the second example, wherein (a) is various aberration diagrams with focus on infinity in the wide-angle end state, (b) various aberration diagrams with focus on infinity in an intermediate focal length state, and (c) various aberration diagrams with focus on infinity in the telephoto end state.

FIG. 7 is various aberration diagrams in a short-distance fifth-unit in-focus state in the second example, wherein (a) is various aberration diagrams with focus on a short-distance object by the fifth lens unit in the wide-angle end state, (b) various aberrations with focus on a short-distance object by the fifth lens unit in an intermediate focal length state, and (c) various aberrations with focus on a short-distance object by the fifth lens unit in the telephoto end state.

FIG. 8 is various aberration diagrams in a short-distance fourth-unit in-focus state in the second example, wherein (a) is various aberration diagrams with focus on a short-distance object by the fourth lens unit in the wide-angle end state, (b) various aberrations with focus on a short-distance object by the fourth lens unit in an intermediate focal length state, and (c) various aberrations with focus on a short-distance object by the fourth lens unit in the telephoto end state.

FIG. 10 is various aberration diagrams in the infinity in-focus state in the third example, wherein (a) is various aberration diagrams with focus on infinity in the wide-angle end state, (b) various aberration diagrams with focus on infinity in an intermediate focal length state, and (c) various aberration diagrams with focus on infinity in the telephoto end state.

FIG. 11 is various aberration diagrams in a short-distance fifth-unit in-focus state in the third example, wherein (a) is various aberration diagrams with focus on a short-distance object by the fifth lens unit in the wide-angle end state, (b) various aberrations with focus on a short-distance object by the fifth lens unit in an intermediate focal length state, and (c) various aberrations with focus on a short-distance object by the fifth lens unit in the telephoto end state.

FIG. 12 is various aberration diagrams in a short-distance fourth-unit in-focus state in the third example, wherein (a) is various aberration diagrams with focus on a short-distance object by the fourth lens unit in the wide-angle end state, (b) various aberrations with focus on a short-distance object by the fourth lens unit in an intermediate focal length state, and (c) various aberrations with focus on a short-distance object by the fourth lens unit in the telephoto end state.

FIG. 14 is various aberration diagrams in the infinity in-focus state in the fourth example, wherein (a) is various aberration diagrams with focus on infinity in the wide-angle end state, (b) various aberration diagrams with focus on infinity in an intermediate focal length state, and (c) various aberration diagrams with focus on infinity in the telephoto end state.

FIG. 15 is various aberration diagrams in a short-distance fifth-unit in-focus state in the fourth example, wherein (a) is various aberration diagrams with focus on a short-distance object by the fifth lens unit in the wide-angle end state, (b) various aberrations with focus on a short-distance object by the fifth lens unit in an intermediate focal length state, and (c) various aberrations with focus on a short-distance object by the fifth lens unit in the telephoto end state.

FIG. 16 is various aberration diagrams in a short-distance fourth-unit in-focus state in the fourth example, wherein (a) is various aberration diagrams with focus on a short-distance object by the fourth lens unit in the wide-angle end state, (b) various aberrations with focus on a short-distance object by the fourth lens unit in an intermediate focal length state, and (c) various aberrations with focus on a short-distance object by the fourth lens unit in the telephoto end state.

FIG. 18 is various aberration diagrams in the infinity in-focus state in the fifth example, wherein (a) is various aberration diagrams with focus on infinity in the wide-angle end state, (b) various aberration diagrams with focus on infinity in an intermediate focal length state, and (c) various aberration diagrams with focus on infinity in the telephoto end state.

FIG. 19 is various aberration diagrams in a short-distance fifth-unit in-focus state in the fifth example, wherein (a) is various aberration diagrams with focus on a short-distance object by the fifth lens unit in the wide-angle end state, (b)

various aberrations with focus on a short-distance object by the fifth lens unit in an intermediate focal length state, and (c) various aberrations with focus on a short-distance object by the fifth lens unit in the telephoto end state.

FIG. 20 is various aberration diagrams in a short-distance fourth-unit in-focus state in the fifth example, wherein (a) is various aberration diagrams with focus on a short-distance object by the fourth lens unit in the wide-angle end state, (b) various aberration diagrams with focus on a short-distance object by the fourth lens unit in an intermediate focal length state, and (c) various aberrations with focus on a short-distance object by the fourth lens unit in the telephoto end state.

Figure 21:
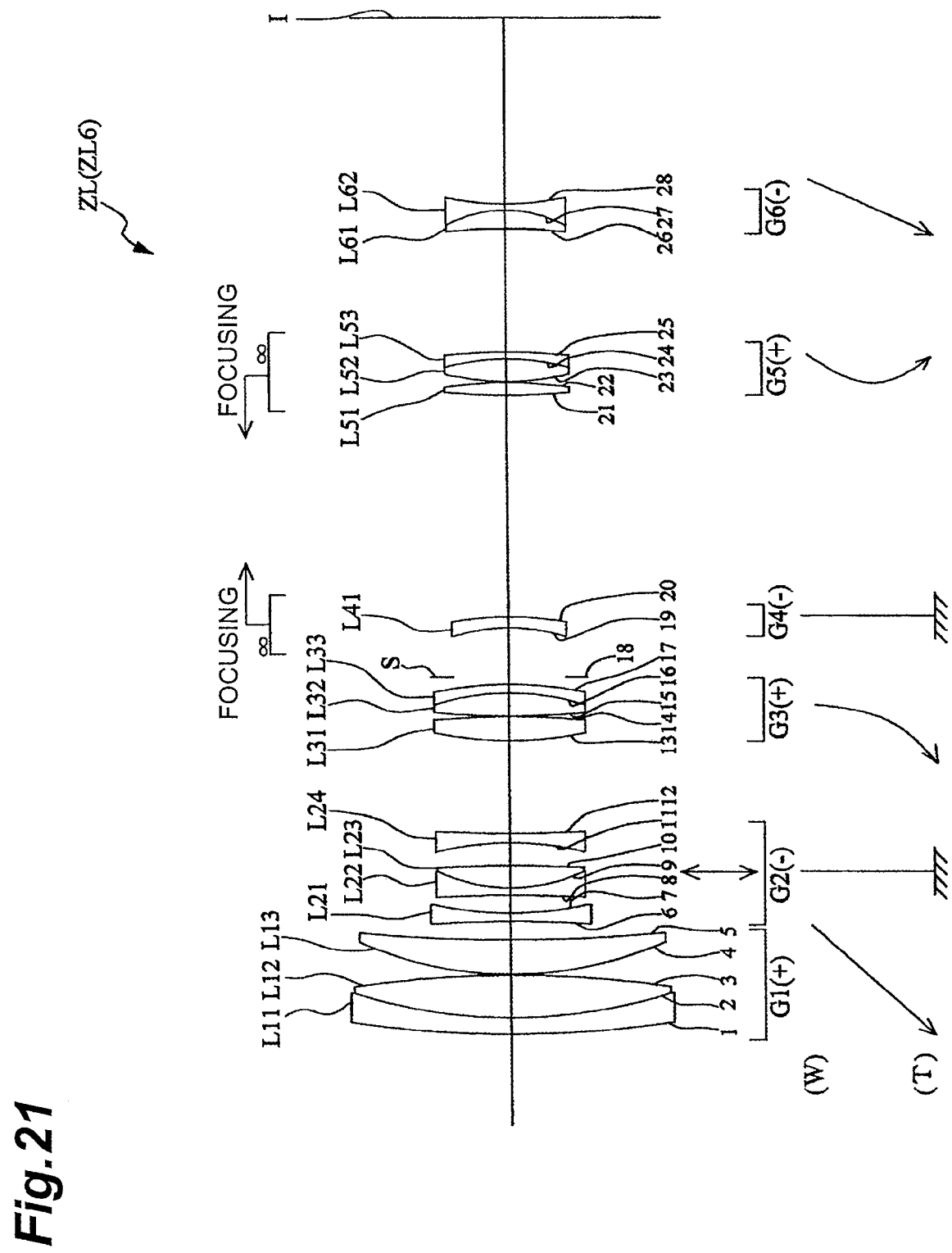

FIG. 21 is a lens sectional view in the wide-angle end state showing a configuration of a variable magnification optical system according to the sixth example.

Figure 22:
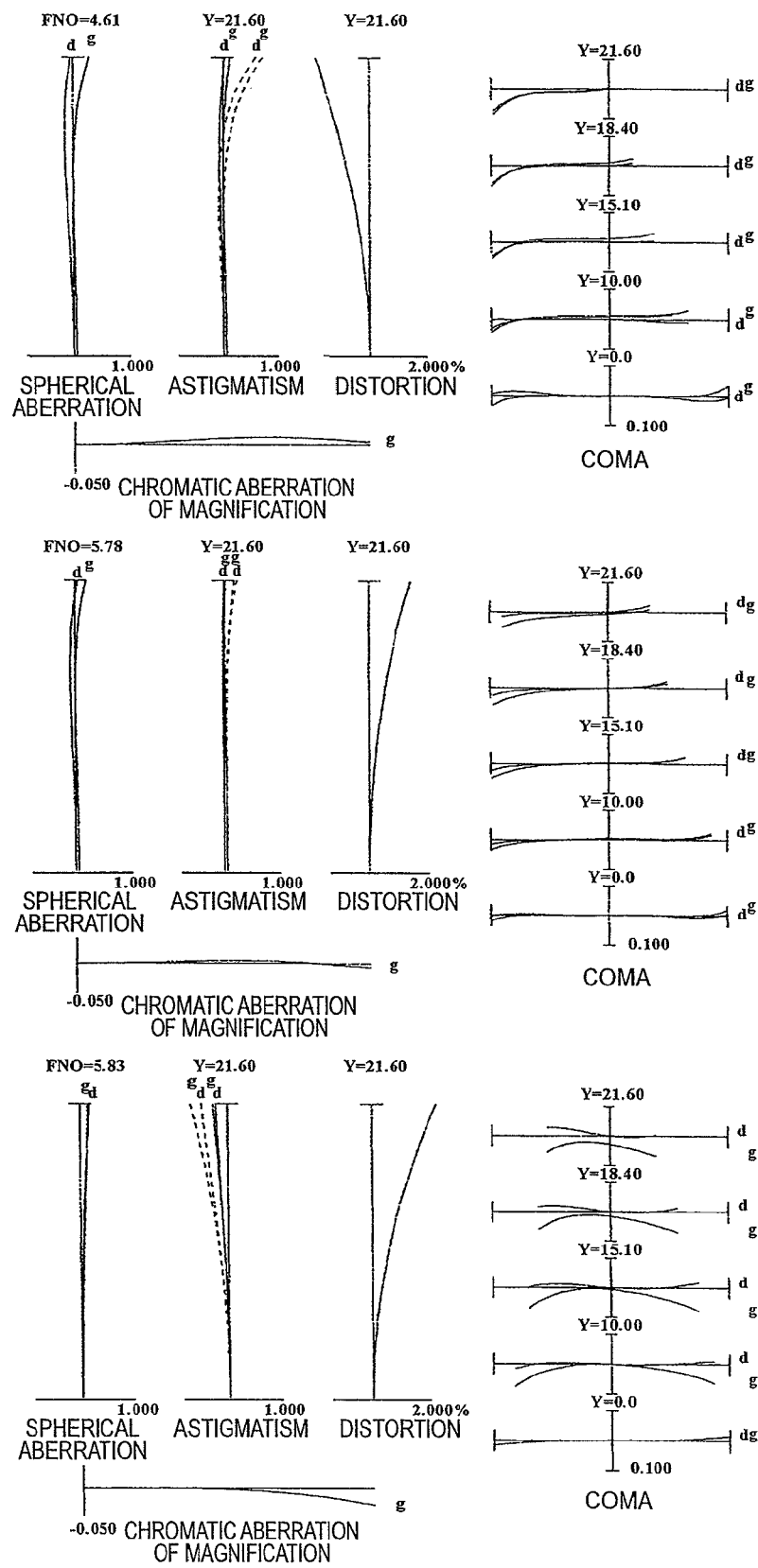

FIG. 22 is various aberration diagrams in the infinity in-focus state in the sixth example, wherein (a) is various aberration diagrams with focus on infinity in the wide-angle end state, (b) various aberration diagrams with focus on infinity in an intermediate focal length state, and (c) various aberration diagrams with focus on infinity in the telephoto end state.

FIG. 23 is various aberration diagrams in a short-distance fifth-unit in-focus state in the sixth example, wherein (a) is various aberration diagrams with focus on a short-distance object by the fifth lens unit in the wide-angle end state, (b) various aberrations with focus on a short-distance object by the fifth lens unit in an intermediate focal length state, and (c) various aberrations with focus on a short-distance object by the fifth lens unit in the telephoto end state.

Figure 24:
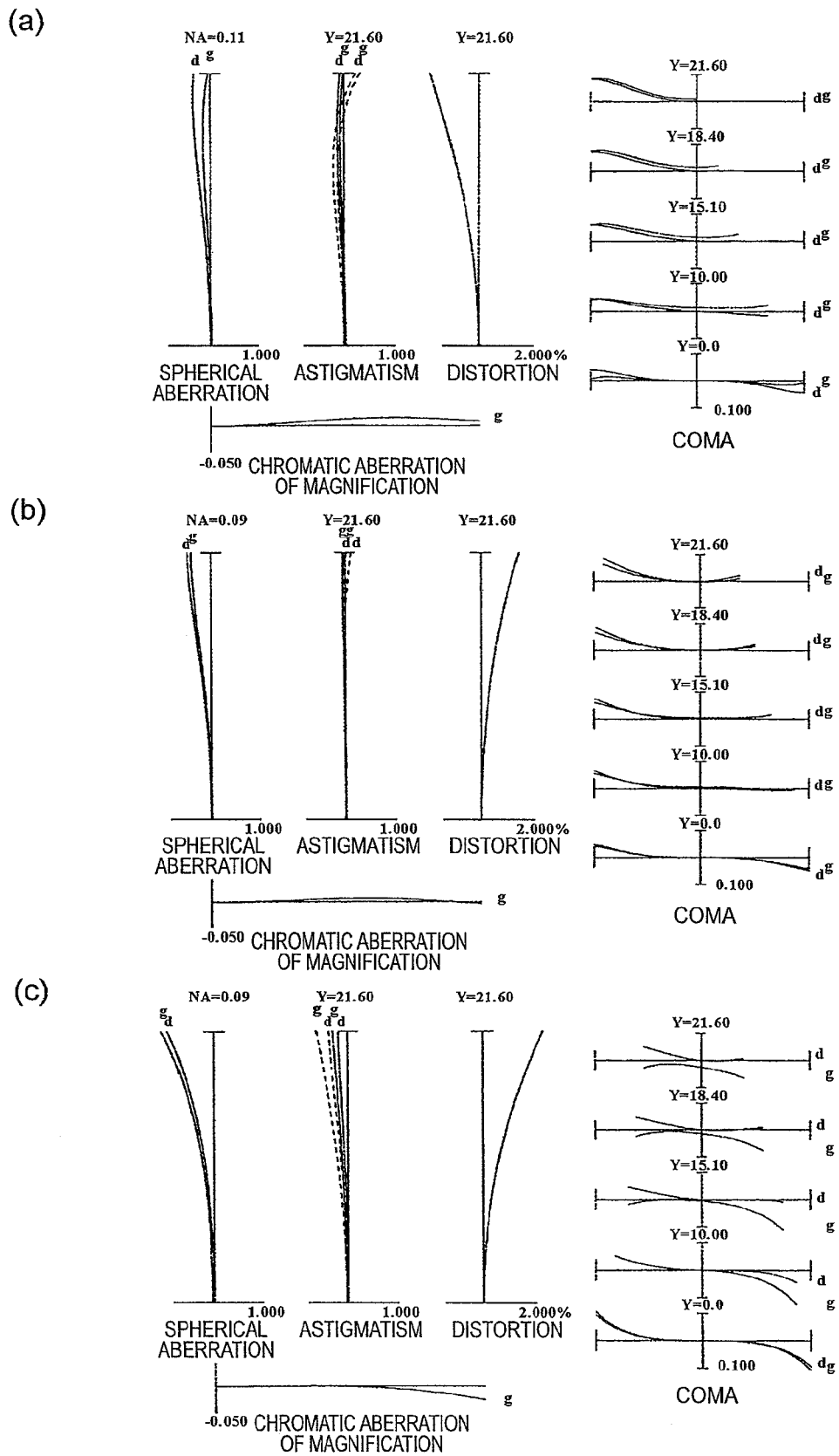

FIG. 24 is various aberration diagrams in a short-distance fourth-unit in-focus state in the sixth example, wherein (a) is various aberration diagrams with focus on a short-distance object by the fourth lens unit in the wide-angle end state, (b) various aberrations with focus on a short-distance object by the fourth lens unit in an intermediate focal length state, and (c) various aberrations with focus on a short-distance object by the fourth lens unit in the telephoto end state.

Figure 25:
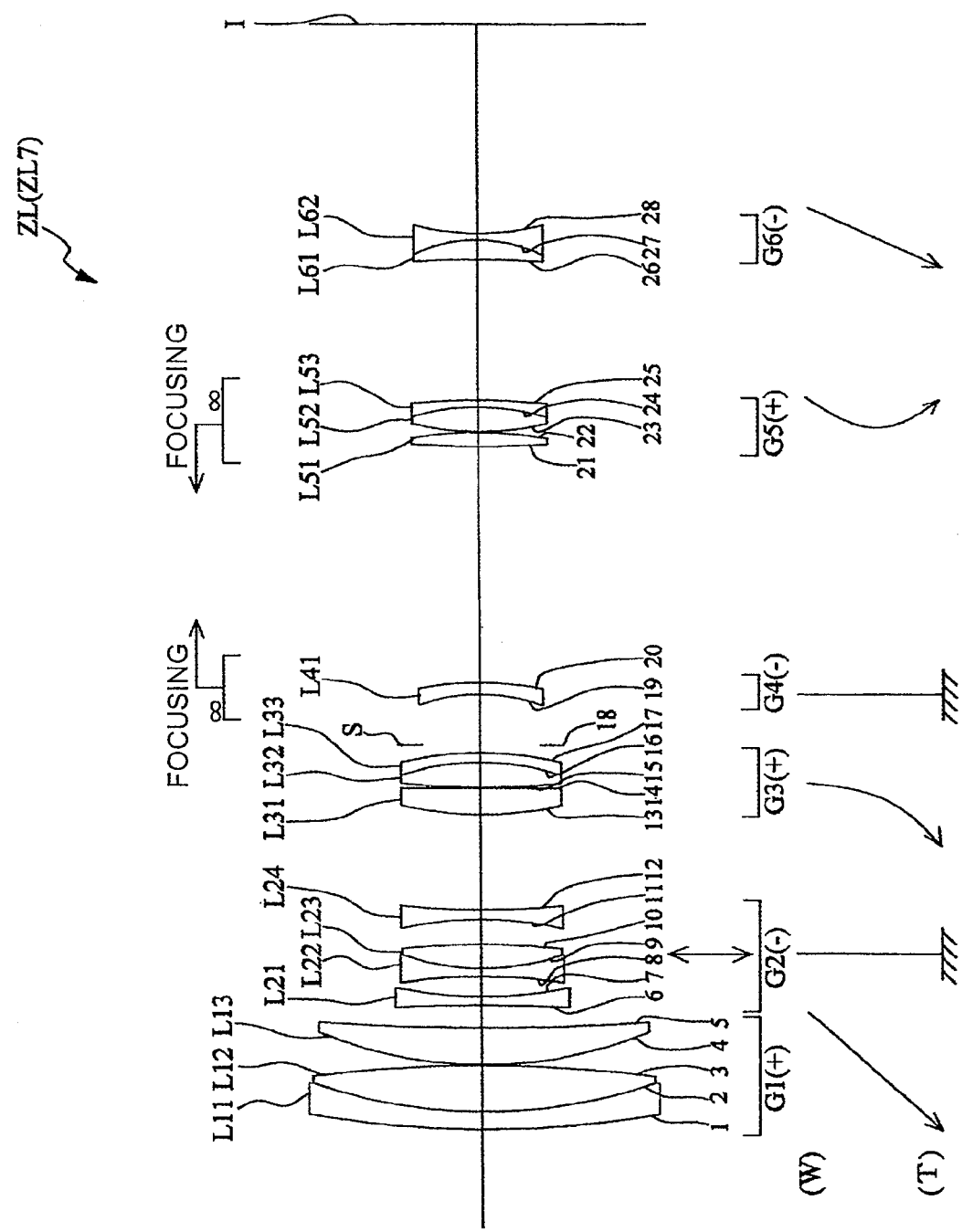

FIG. 25 is a lens sectional view in the wide-angle end state showing a configuration of a variable magnification optical system according to the seventh example.

FIG. 26 is various aberration diagrams in the infinity in-focus state in the seventh example, wherein (a) is various aberration diagrams with focus on infinity in the wide-angle end state, (b) various aberration diagrams with focus on infinity in an intermediate focal length state, and (c) various aberration diagrams with focus on infinity in the telephoto end state.

FIG. 27 is various aberration diagrams in a short-distance fifth-unit in-focus state in the seventh example, wherein (a) is various aberration diagrams with focus on a short-distance object by the fifth lens unit in the wide-angle end state, (b) various aberrations with focus on a short-distance object by the fifth lens unit in an intermediate focal length state, and (c) various aberrations with focus on a short-distance object by the fifth lens unit in the telephoto end state.

FIG. 28 is various aberration diagrams in a short-distance fourth-unit in-focus state in the seventh example, wherein (a) is various aberration diagrams with focus on a short-distance object by the fourth lens unit in the wide-angle end state, (b) various aberrations with focus on a short-distance object by the fourth lens unit in an intermediate focal length state, and (c) various aberrations with focus on a short-distance object by the fourth lens unit in the telephoto end state.

Figure 29:
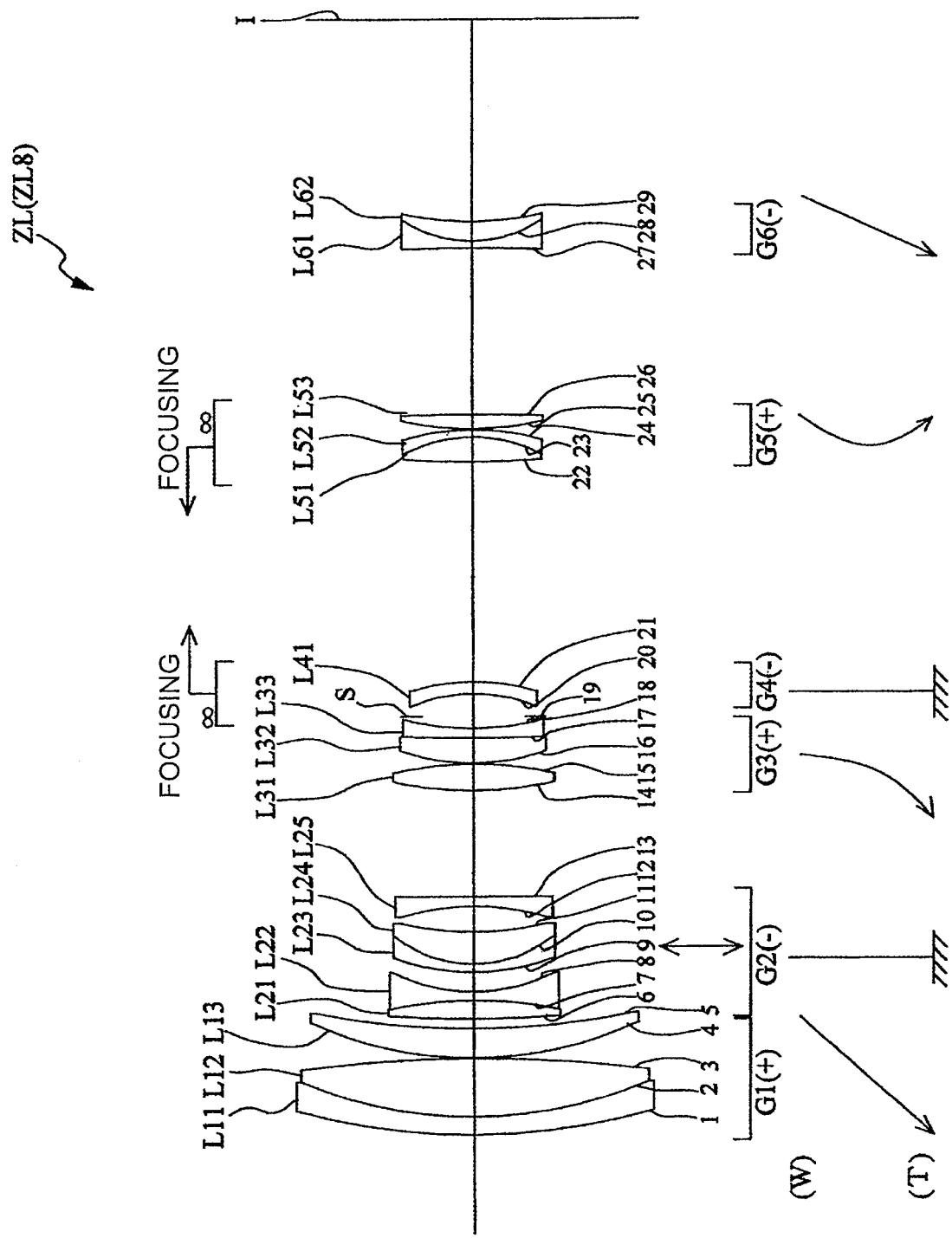

FIG. 29 is a lens sectional view in the wide-angle end state showing a configuration of a variable magnification optical system according to the eighth example.

FIG. 30 is various aberration diagrams in the infinity in-focus state in the eighth example, wherein (a) is various aberration diagrams with focus on infinity in the wide-angle end state, (b) various aberration diagrams with focus on infinity in an intermediate focal length state, and (c) various aberration diagrams with focus on infinity in the telephoto end state.

FIG. 31 is various aberration diagrams in a short-distance fifth-unit in-focus state in the eighth example, wherein (a) is various aberration diagrams with focus on a short-distance object by the fifth lens unit in the wide-angle end state, (b) various aberrations with focus on a short-distance object by the fifth lens unit in an intermediate focal length state, and (c) various aberrations with focus on a short-distance object by the fifth lens unit in the telephoto end state.

FIG. 32 is various aberration diagrams in a short-distance fourth-unit in-focus state in the eighth example, wherein (a) is various aberration diagrams with focus on a short-distance object by the fourth lens unit in the wide-angle end state, (b) various aberrations with focus on a short-distance object by the fourth lens unit in an intermediate focal length state, and (c) various aberrations with focus on a short-distance object by the fourth lens unit in the telephoto end state.

Figure 33:
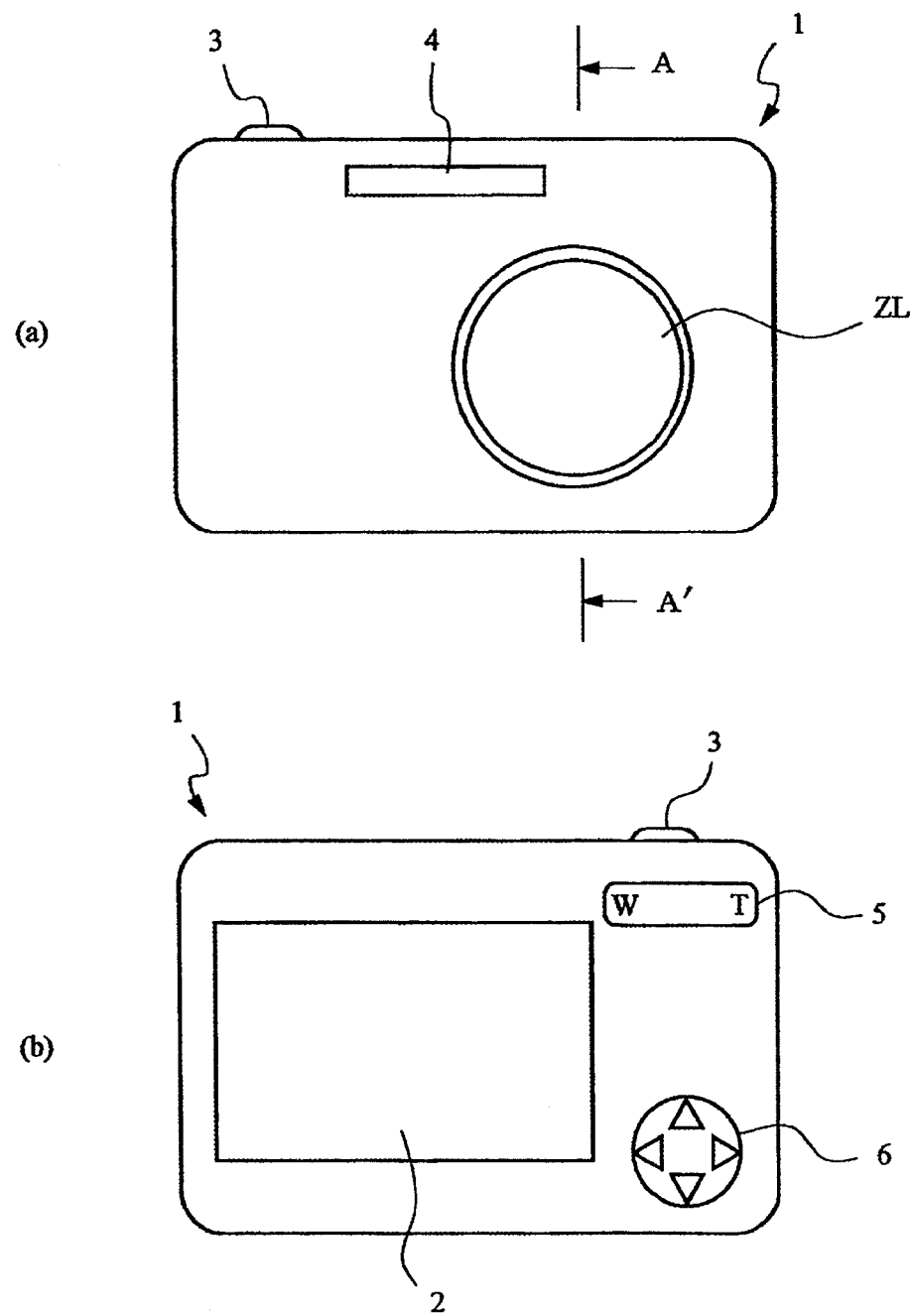

FIG. 33 is a drawing showing an electronic still camera equipped with a variable magnification optical system according to the present invention, wherein (a) is a front view and (b) a back view.

Figure 34:
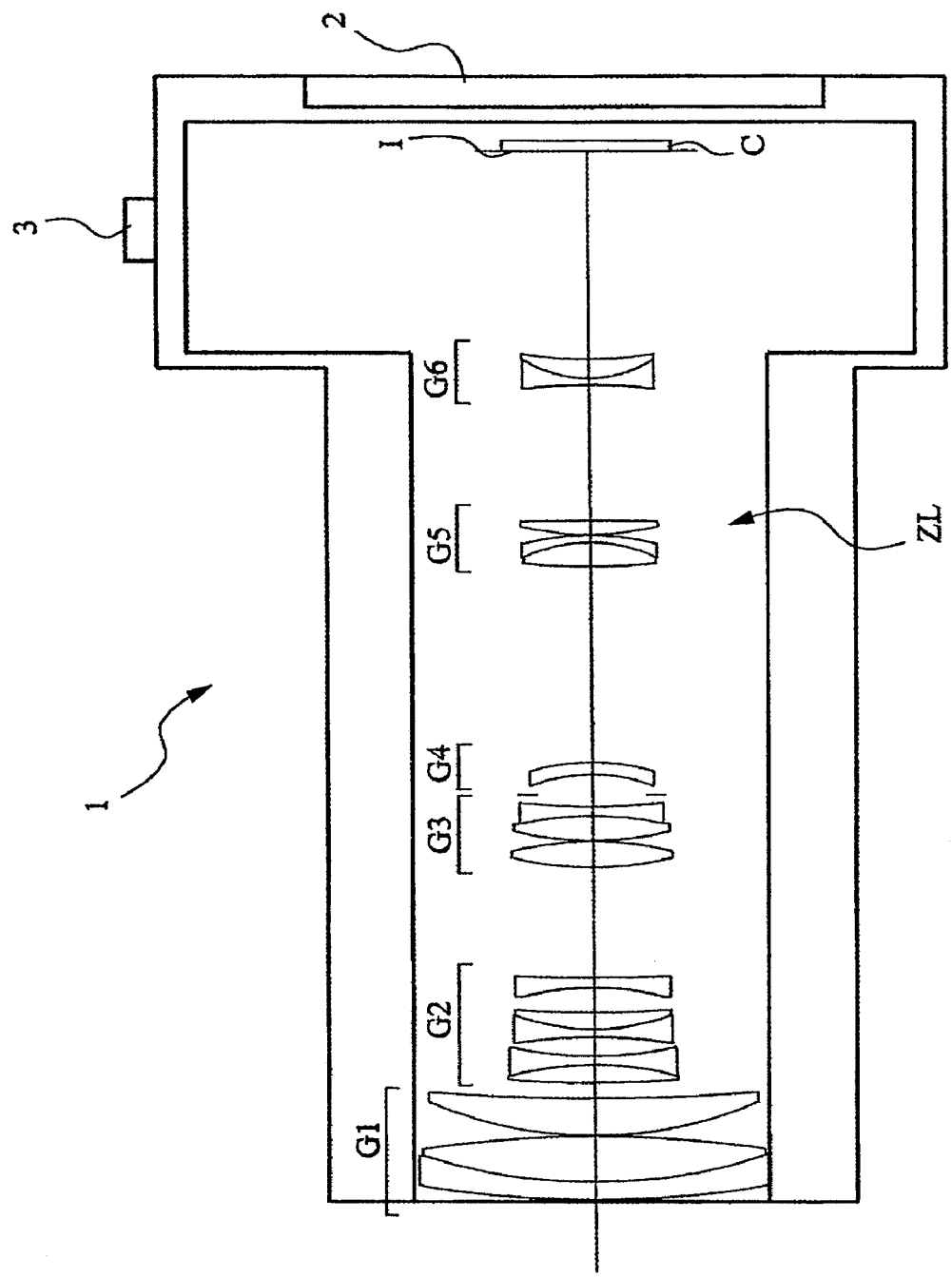

FIG. 34 is a sectional view along line A-A' in FIG. 33 (a).

Figure 35:
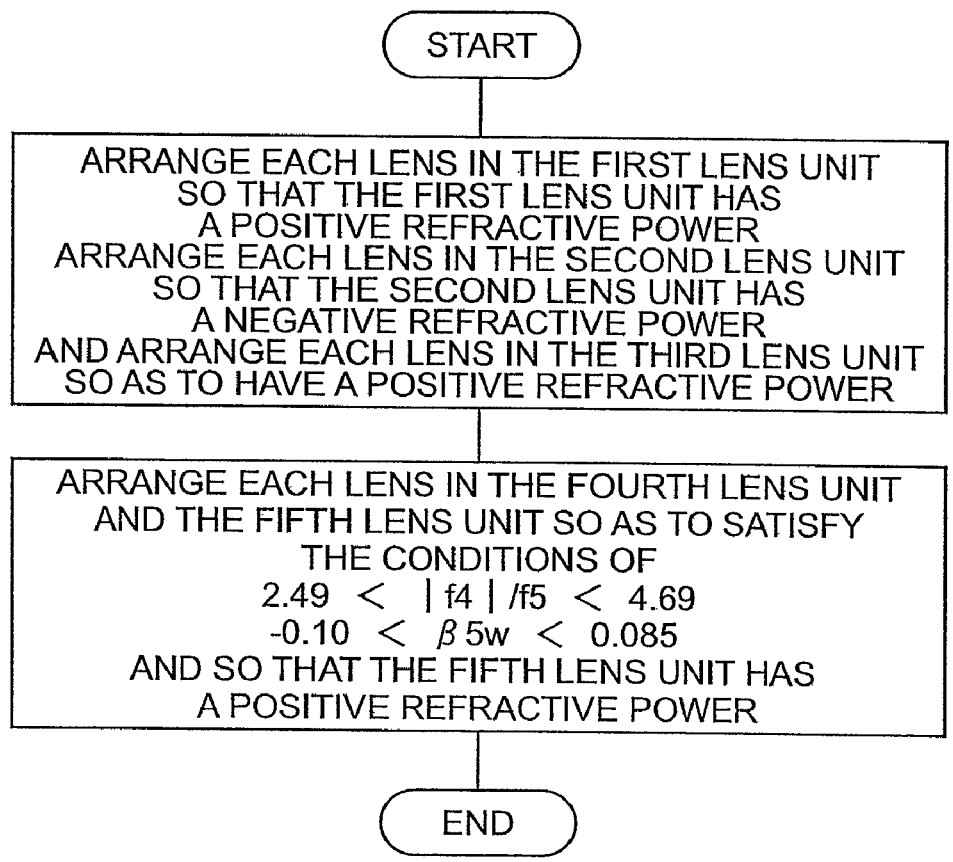

FIG. 35 is a flowchart of a method for manufacturing a variable magnification optical system according to an embodiment.

LIST OF REFERENCE SYMBOLS

ZL (ZL1-ZL8) variable magnification optical system; G1 first lens unit; G2 second lens unit; G3 third lens unit; G4 fourth lens unit; G5 fifth lens unit; G6 sixth lens unit; S aperture stop; 1 electronic still camera (optical apparatus).

BEST MODE FOR CARRYING OUT THE INVENTION

A preferred embodiment of the present invention will be described below with reference to the drawings. First, a configuration of a variable magnification optical system ZL according to the present embodiment will be described using FIG. 1. The variable magnification optical system ZL is composed of, in order from the object side, a first lens unit G1 with a positive refractive index, a second lens unit G2 with a negative refractive index, a third lens unit G3 with a positive refractive power, a fourth lens unit G4, and a fifth lens unit G5 with a positive refractive power. The fourth lens unit G4 preferably has a negative refractive index. The variable magnification optical system is configured as follows: during change in the lens position state (so called zooming) from the wide-angle end state to the telephoto end state, a space between the first lens unit G1 and the second lens unit G2 varies, a space between the second lens unit G2 and the third lens unit G3 varies, a space between the third lens unit G3 and the fourth lens unit G4 varies, and a space between the fourth lens unit G4 and the fifth lens unit G5 varies. Specifically, the space between the first lens unit G1 and the second lens unit G2 increases, the space between the second lens unit G2 and the third lens unit G3 decreases, the space between the third lens unit G3 and the fourth lens unit G4 increases, and the space between the fourth lens unit G4 and the fifth lens unit G5 decreases. This configuration achieves excellent optical performance while effectively ensuring a predetermined variable magnification ratio.

In this case, the variable magnification optical system ZL according to the present embodiment is preferably configured so that during change in the lens position state from the wide-angle end state to the telephoto end state, the second lens unit G2 is stationary relative to the image plane, and this configuration simplifies the configuration of the variable magnification optical system ZL and reduces variation in various aberrations during the magnification change. Furthermore, the variable magnification optical system ZL according to the present embodiment is preferably configured so that during change in the lens position state from the wide-angle end state to the telephoto end state, the fourth lens unit G4 is stationary relative to the image plane, and this configuration simplifies the configuration of the variable magnification optical system ZL and reduces variation in various aberrations during the magnification change.

The variable magnification optical system ZL according to the present embodiment is provided with an aperture stop S on the image side of the third lens unit G3 and during change in the lens position state from the wide-angle end state to the telephoto end state, the aperture stop S is configured to move along the optical axis integrally with the third lens unit G3. This configuration reduces the lens diameters of the first lens unit G1 and the lens unit nearest to the image. In addition, it allows good correction for distortion and curvature of field.

Now, let us explain conditions for configuring the variable magnification optical system ZL in the configuration as described above. First, the variable magnification optical system ZL according to the present embodiment is configured to satisfy Conditions (1) and (2) below where f4 is the focal length of the fourth lens unit G4, f5 the focal length of the fifth lens unit G5, and β5w the lateral magnification of the fifth lens unit G5 in the wide-angle end state.

$$2.49 < |f4|/f5 < 4.69 \quad (1)$$

$$-0.10 < \beta 5w < 0.085 \quad (2)$$

Condition (1) defines a ratio of the refractive power of the fourth lens unit G4 to the refractive power of the fifth lens unit G5. When the variable magnification optical system ZL satisfies this Condition (1), it can achieve excellent optical performance. If the ratio is below the lower limit of Condition (1), the refractive power of the fourth lens unit G4 will be too large to correct for spherical aberration and the overall length of the lens will be large, which is not preferred. On the other hand, if the ratio is over the upper limit of Condition (1), the refractive power of the fifth lens unit G5 will be too large to correct for curvature of field and it will be difficult to ensure the back focus, which is not preferred. For better ensuring the effect of the present embodiment, it is desirable to set the upper limit of Condition (1) to 4.685 and the lower limit to 2.495.

Condition (2) defines the lateral magnification of the fifth lens unit G5. When the variable magnification optical system ZL satisfies this Condition (2), axial rays between the fourth lens unit G4 and the fifth lens unit G5 can be approximately afocal and it is thus feasible to reduce variation in aberration between infinity and short range during focusing, particularly, variation in image plane; therefore, it is feasible to realize excellent optical performance. If the lateral magnification is below the lower limit of Condition (2), axial rays emerging from the fourth lens unit G4 will become divergent and will not be approximately afocal. Therefore, it is not preferred because it becomes difficult to reduce the variation in aberration between infinity and short range during focusing, particularly, variation in image plane. On the other hand, if the lateral magnification is over the upper limit of Condition (2), the axial rays emerging from the fourth lens unit G4 will become convergent and will not be approximately afocal. Therefore, it is not preferred because it is difficult to reduce the variation in aberration between infinity and short range during focusing, particularly, variation in image plane. The reason why the condition of the upper limit is severer than the lower limit in this Condition (2) is that the condition for the convergent beam needs to be severer in order to ensure the afocal property of rays emerging from the fourth lens unit G4. For better ensuring the effect of the present embodiment, it is desirable to set the lower limit of Condition (2) to −0.08 and the upper limit to 0.08.

In the variable magnification optical system ZL according to the present embodiment, as described above, the fourth lens unit G4 preferably has the negative refractive power. This configuration allows the negative refractive power to be assigned to the fourth lens unit G4 and the second lens unit G2 and thus enables good correction for various aberrations including spherical aberration, which is preferred.

The variable magnification optical system ZL according to the present embodiment is preferably configured so as to satisfy Condition (3) below where f'2 is the focal length of the second lens unit G2 and f5 the focal length of the fifth lens unit G5.

$$(-f2)/f5 < 0.605 \quad (3)$$

Condition (3) defines a ratio of the refractive power of the second lens unit G2 to the refractive power of the fifth lens unit G5. When the variable magnification optical system ZL satisfies this Condition (3), it achieves excellent optical performance while effectively ensuring the predetermined variable magnification ratio. If the ratio is over the upper limit of Condition (3), the refractive power of the second lens unit G2 will be too small to correct for curvature of field, which is not preferred. For better ensuring the effect of the present embodiment, it is preferable to set the upper limit of Condition (3) to 0.603.

The variable magnification optical system ZL is provided with a sixth lens unit G6 with a negative refractive power on the image side of the fifth lens unit G5, and this allows better correction for curvature of field.

The variable magnification optical system ZL according to the present embodiment is preferably configured to perform focusing onto a short-distance object by moving at least one lens unit out of the fifth lens unit G5 and the fourth lens unit G4 along the optical axis. Since the axial rays between the fifth lens unit G5 and the fourth lens unit G4 are approximately afocal, it is feasible to reduce the variation in aberration between infinity and short range during focusing, particularly, variation in image plane. In this case, the structure of the variable magnification optical system ZL can be simpler in the configuration where either one unit is moved than in the configuration where both of the fifth lens unit G5 and the fourth lens unit G4 are moved. During focusing from the infinity in-focus state to the short-range in-focus state, as indicated by arrows in FIG. 1, in the case of movement of the fifth lens unit G5, it is configured to move toward the object and in the case of movement of the fourth lens unit G4, it is configured to move toward the image. In the case of movement of the both, the fifth lens unit G5 is configured to move toward the object and the fourth lens unit G4 toward the image.

In the variable magnification optical system ZL according to the present embodiment, the whole or a part of the second lens unit G2 is preferably configured to move along a direction perpendicular to the optical axis, which allows good correction for the image plane during occurrence of image blurring.

In the variable magnification optical system ZL according to the present embodiment, the fourth lens unit G4 is preferably composed of a single lens and this configuration allows the lens unit to be composed of the minimum number of lens and allows sufficient spaces to be provided before and after the lens.

The variable magnification optical system ZL according to the present embodiment is preferably composed of spherical lenses only and this configuration reduces variation in accuracy of lenses and simplifies manufacture of the variable magnification optical system ZL.

The contents described below can be optionally adopted as far as the optical performance is not deteriorated.

First, the embodiments described above and hereinafter show the variable magnification optical systems ZL in the six-unit configuration, and the unit configuration of the present variable magnification optical systems does not have to be limited to it but may be any other unit configuration such as a seven-unit or eight-unit configuration. For example, the present embodiment shows the lens system composed of the six movable units, but it is also possible to add another lens unit between lens units or to add another lens unit adjacent on the image side or on the object side to the lens system.

The variable magnification optical system ZL according to the present embodiment may be configured to move a part of a lens unit, a lens unit, or a plurality of lens units as a focusing lens unit along the optical-axis direction, in order to perform focusing from an infinity object to a short-distance object. This focusing lens unit is also applicable to autofocus and is also suitable for driving with a motor for autofocus, e.g., an ultrasonic motor. In the present variable magnification optical system, particularly, the whole or a part of the fourth lens unit G4 or the fifth lens unit G5 is preferably the focusing lens unit.

The variable magnification optical system ZL according to the present embodiment shows the variable magnification optical system configured to shift the whole or a part of the second lens unit G2 as an antivibration lens unit in the direction perpendicular to the optical axis, but it is also possible to use the whole or a part of another lens unit as an antivibration lens unit.

A lens surface of a lens forming the variable magnification optical system ZL according to the present embodiment may be an aspherical surface. This aspherical surface may be an aspherical surface made by grinding, a glass mold aspherical surface made by molding glass in an aspherical shape with a mold, or a composite aspherical surface made by forming a resin on a glass surface in an aspherical shape.

A lens surface of a lens forming the variable magnification optical system ZL according to the present embodiment may be provided with an antireflection film having high transmittance over a wide wavelength range. This reduces flare and ghost and can achieve high optical performance with high contrast.

The aperture stop S is preferably located near the third lens unit G3 as described above, but a lens frame may be configured to function as the aperture stop, without providing any member as the aperture stop.

The present invention was described above with the constitutive requirements of the embodiment in order to explain the present invention in an easily understood manner, and it is needless to mention that the present invention is not limited to them.

FIGS. 33 and 34 show a configuration of an electronic still camera 1 (hereinafter referred to simply as a camera) as an optical apparatus provided with the above-described variable magnification optical system ZL. This camera 1 is configured as follows: when a photographer pushes an unrepresented power button, an unrepresented shutter of a taking lens (variable magnification optical system ZL) is opened, and the variable magnification optical system ZL condenses light from an unrepresented subject to focus an image thereof on an imaging device C (e.g., a CCD, CMOS, or the like) located on the image plane I. The subject image focused on the imaging device C is displayed on a liquid crystal monitor 2 located on the back of the camera 1. The photographer decides a composition of the subject image while watching the liquid crystal monitor 2, and then depresses a release button 3 to take the subject image through the imaging device C and to record and store the image in an unrepresented memory.

This camera 1 is equipped with an auxiliary light emitter 4 for emitting auxiliary light for a dark subject, a wide (W)-tele (T) button 5 for zooming the variable magnification optical system ZL from the wide-angle end state (W) to the telephoto end state (T), a function button 6 used, for example, for setting various conditions of the camera 1, and so on.

EXAMPLE 1

Figure 1:
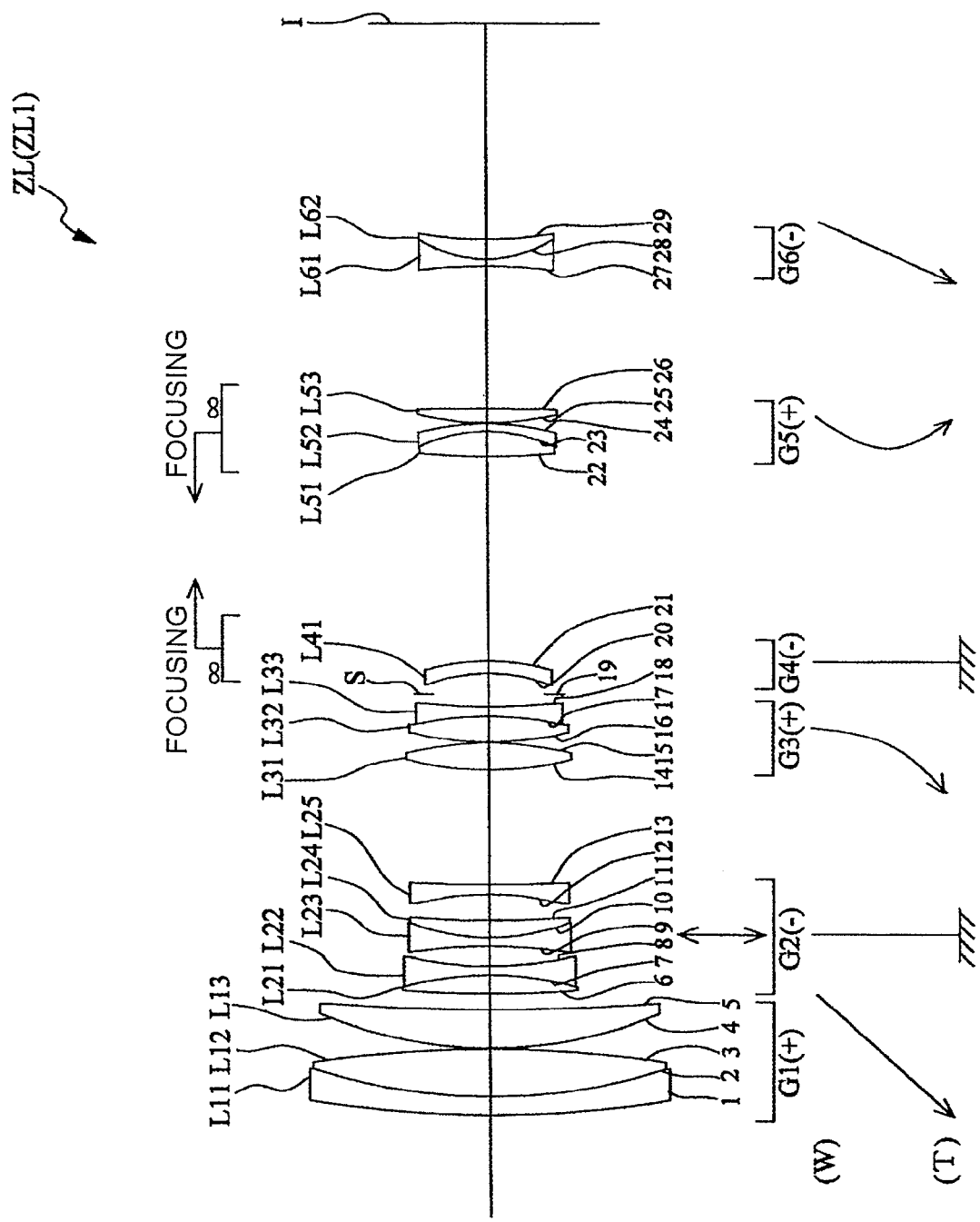
FIG. 1 is a lens sectional view in the wide-angle end state showing a configuration of a variable magnification optical system according to the first example.

Each example of the present invention will be described below on the basis of the accompanying drawings. FIG. 1 shows refractive power arrangement of the variable magnification optical system ZL and a state of movement of each lens unit during change in a focal length state from the wide-angle end state (W) to the telephoto end state (T) (zoom trajectories shown in the lower part in FIG. 1, which will be shown in the same form in all examples hereinafter). As shown in this FIG. 1, the variable magnification optical system ZL according to the present example is configured as follows: it has, in order from the object side, a first lens unit G1 with a positive refractive power, a second lens unit G2 with a negative refractive power, a third lens unit G3 with a positive refractive power, a fourth lens unit G4 with a negative refractive power, and a fifth lens unit G5 with a positive refractive power and further has a sixth lens unit G6 with a negative refractive power disposed on the image side of the fifth lens unit G5. During change in the focal length state (i.e., zooming) from the wide-angle end state to the telephoto end state, the lens units move so that a space between the first lens unit G1 and the second lens unit G2 increases, a space between the second lens unit G2 and the third lens unit G3 decreases, a space between the third lens unit G3 and the fourth lens unit G4 increases, a space between the fourth lens unit G4 and the fifth lens unit G5 decreases and then increases, and a space between the fifth lens unit G5 and the sixth lens unit G6 decreases. At this time, the second lens unit G2 and the fourth lens unit G4 are stationary relative to the image plane during the magnification change from the wide-angle end state to the telephoto end state. An aperture stop S is located between the third lens unit G3 and the fourth lens unit G4 and moves together with the third lens unit G3 during the magnification change from the wide-angle end state to the telephoto end state. The examples below will describe cases where the fifth lens unit G5 or the fourth lens unit G4 is configured to move along the optical axis and in directions of arrows shown in the upper part in FIG. 1 and others, during focusing from the infinity in-focus state to the short-distance in-focus state.

First Example

FIG. 1 is a lens sectional view in the wide-angle end state showing a configuration of a variable magnification optical system according to the first example. In this variable magnification optical system ZL1 in FIG. 1, the first lens unit G1 is composed of, in order from the object side, a cemented lens of a negative meniscus lens L11 with a convex surface on the object side and a positive lens L12 of a biconvex shape, and a positive meniscus lens L13 with a convex surface on the object side. The second lens unit G2 is composed of, in order from the object side, a cemented lens of a positive lens L21 of a biconvex shape and a negative lens L22 of a biconcave shape, a cemented lens of a negative lens L23 of a biconcave shape and a positive meniscus lens L24 with a convex surface on the object side, and a negative lens L25 of a biconcave shape. The third lens unit G3 is composed of, in order from the object side, a positive lens L31 of a biconvex shape, and a cemented lens of a positive lens L32 of a biconvex shape and a negative lens L33 of a biconcave shape. The fourth lens unit G4 is composed of, in order from the object side, a negative lens L41 with a concave surface on the object side. The fifth lens unit G5 is composed of, in order from the object side, a cemented lens of a positive lens L51 of a biconvex shape and a negative meniscus lens L52 with a concave surface on the object side, and a positive lens L53 of a biconvex shape. The sixth lens unit G6 is composed of, in order from the object side, a cemented lens of a negative lens L61 of a biconcave shape and a positive meniscus lens L62 with a convex surface on the object side. In this variable magnification optical system ZL1, the presence or absence of movement and variations of the spaces of the respective lens units G1-G6 during the magnification change from the wide-angle end state to the telephoto end state, and the configuration of the aperture stop S are as described above.

Table 1 below provides values of specifications of the variable magnification optical system ZL1 according to the first example. In the overall specifications of this Table 1, f represents the focal length and F.NO the F number. In the lens data, the surface number represents an order of each lens surface from the object side along the direction of travel of rays, the refractive index and Abbe number values for the d line (λ=587.6 nm), and Bf the back focus. The radius of curvature of 0.0000 indicates a plane and the refractive index of air of 1.00000 is omitted. In the focal length data of the units, f1 represents the focal length of the first lens unit G1, f2 the focal length of the second lens unit G2, f3 the focal length of the third lens unit G3, f4 the focal length of the fourth lens unit G4, f5 the focal length of the fifth lens unit G5, and f6 the focal length of the sixth lens unit G6. The units of the focal lengths f, the radii of curvature, surface separations, and other lengths listed in all the specification values below are generally "mm," but the units do not have to be limited to this because equivalent optical performance can also be achieved by optical systems proportionally enlarged or proportionally reduced. These notations and descriptions of the reference symbols and specification tables also apply to the examples below.

TABLE 1

[Overall Specification]

|  | Wide-angle end | | Intermediate focal length | | Telephoto end |
|---|---|---|---|---|---|
| f = | 82.4 | ~ | 200.0 | ~ | 388.2 |
| F. NO = | 4.6 | ~ | 5.4 | ~ | 5.8 |
| Overall length = | 219.70 | ~ | 260.03 | ~ | 277.72 |

TABLE 1-continued

[Lens Data]

| Surface number | Radius of curvature | Surface Separation | Refractive index | Abbe number |
|---|---|---|---|---|
| 1 | 223.6063 | 3.6 | 1.80518 | 25.4 |
| 2 | 116.8315 | 9.5 | 1.49782 | 82.6 |
| 3 | −249.2338 | 0.2 | 1.00000 | |
| 4 | 87.2218 | 7.7 | 1.49782 | 82.6 |
| 5 | 455.1351 | d5 | 1.00000 | |
| 6 | 211.7845 | 3.8 | 1.80518 | 25.4 |
| 7 | 65.6705 | 1.8 | 1.80610 | 40.9 |
| 8 | 76.7374 | 4.0 | 1.00000 | |
| 9 | −105.0125 | 1.7 | 1.64000 | 60.1 |
| 10 | 45.2343 | 3.5 | 1.80384 | 33.9 |
| 11 | 223.7133 | 5.2 | 1.00000 | |
| 12 | −58.1450 | 2.0 | 1.79500 | 45.3 |
| 13 | 426.3599 | d13 | 1.00000 | |
| 14 | 66.9594 | 5.5 | 1.64000 | 60.1 |
| 15 | −65.6978 | 0.2 | 1.00000 | |
| 16 | 66.8084 | 5.2 | 1.49782 | 82.6 |
| 17 | −65.8174 | 2.0 | 1.77250 | 49.6 |
| 18 | 135.7452 | 2.5 | 1.00000 | |
| 19 | 0.0000 | d19 | 1.00000 | |
| 20 | −33.5355 | 2.5 | 1.62041 | 60.3 |
| 21 | −44.0079 | d21 | 1.00000 | |
| 22 | 152.8115 | 5.1 | 1.48749 | 70.5 |
| 23 | −31.0088 | 1.5 | 1.80518 | 25.4 |
| 24 | −53.8057 | 0.2 | 1.00000 | |
| 25 | 60.4870 | 2.9 | 1.48749 | 70.5 |
| 26 | −551.3152 | d26 | 1.00000 | |
| 27 | −112.3121 | 1.4 | 1.79500 | 45.3 |
| 28 | 24.5333 | 4.0 | 1.80518 | 25.4 |
| 29 | 80.2064 | Bf | 1.00000 | |

[Focal Length Data of Lens Units]

| f1 | 132.33 |
|---|---|
| f2 | −33.17 |
| f3 | 56.49 |
| f4 | −250.00 |
| f5 | 59.52 |
| f6 | −59.16 |

In this first example, an axial aerial distance d0 between the object and the first lens unit G1, an axial aerial distance d5 between the first lens unit G1 and the second lens unit G2, an axial aerial distance d13 between the second lens unit G2 and the third lens unit G3, an axial aerial distance d19 between the third lens unit G3 and the fourth lens unit G4, an axial aerial distance d21 between the fourth lens unit G4 and the fifth lens unit G5, an axial aerial distance d26 between the fifth lens unit G5 and the sixth lens unit G6, and the back focus Bf vary during zooming. Table 2 below shows the variable distance data at each of focal lengths in the wide-angle end state, in an intermediate focal length state, and in the telephoto end state with focus on infinity, with focus on a short-distance object by the fifth lens unit, and with focus on a short-distance object by the fourth lens unit in the first example. In this Table 2, f represents the focal length, and β the image magnification between object and image. The notation of these reference symbols also applies to the examples hereinafter.

TABLE 2

| | Wide-angle end | Intermediate focal length | Telephoto end |
|---|---|---|---|
| [Focus on infinity] | | | |
| f | 82.4 | 200.0 | 388.2 |
| d0 | ∞ | ∞ | ∞ |
| d5 | 3.20 | 43.54 | 61.23 |
| d13 | 23.31 | 13.87 | 2.10 |
| d19 | 4.30 | 13.73 | 25.50 |

TABLE 2-continued

|  | Wide-angle end | Intermediate focal length | Telephoto end |
|---|---|---|---|
| d21 | 41.57 | 30.61 | 34.46 |
| d26 | 28.48 | 17.65 | 3.98 |
| Bf | 42.85 | 64.63 | 74.45 |
| [Focus by fifth unit] | | | |
| β | −0.0739 | −0.0442 | −0.0245 |
| d0 | 1056.21 | 4334.17 | 15354.08 |
| d5 | 3.20 | 43.54 | 61.23 |
| d13 | 23.31 | 13.87 | 2.10 |
| d19 | 4.30 | 13.73 | 25.50 |
| d21 | 39.57 | 28.61 | 32.46 |
| d26 | 30.48 | 19.65 | 5.98 |
| Bf | 42.85 | 64.63 | 74.45 |
| [Focus by fourth units] | | | |
| β | −0.0052 | −0.0047 | −0.0049 |
| d0 | 15887.86 | 43003.22 | 79079.42 |
| d5 | 3.20 | 43.54 | 61.23 |
| d13 | 23.31 | 13.87 | 2.10 |
| d19 | 6.30 | 15.73 | 27.50 |
| d21 | 39.57 | 28.61 | 32.46 |
| d26 | 28.48 | 17.65 | 3.98 |
| Bf | 42.85 | 64.63 | 74.45 |

Table 3 below shows values corresponding to the respective conditions in the first example.

TABLE 3

(1) |f4|/f5 = 4.200
(2) β5w = 0.030
(3) (−f2)/f5 = 0.557

FIGS. 2 to 4 are various aberration diagrams of the variable magnification optical system ZL1 according to the first example. FIG. 2 shows various aberration diagrams in the infinity in-focus state, wherein FIG. 2 (a) is various aberration diagrams in the infinity in-focus state in the wide-angle end state, FIG. 2 (b) various aberrations in the infinity in-focus state in the intermediate focal length state, and FIG. 2 (c) various aberrations in the infinity in-focus state in the telephoto end state. FIG. 3 shows various aberration diagrams in the short-distance fifth-unit in-focus state, wherein FIG. 3 (a) is various aberration diagrams with focus on a short-distance object by the fifth unit in the wide-angle end state, FIG. 3 (b) various aberrations with focus on a short-distance object by the fifth unit in the intermediate focal length state, and FIG. 3 (c) various aberrations with focus on a short-distance object by the fifth unit in the telephoto end state. FIG. 4 shows various aberration diagrams in the short-distance fourth-unit in-focus state, wherein FIG. 4 (a) is various aberration diagrams with focus on a short-distance object by the fourth unit in the wide-angle end state, FIG. 4 (b) various aberrations with focus on a short-distance object by the fourth unit in the intermediate focal length state, and FIG. 4 (c) various aberrations with focus on a short-distance object by the fourth unit in the telephoto end state.

In the aberration diagrams, FNO represents the F number and Y an image height (unit: mm). The spherical aberration diagrams show values of the F number corresponding to a maximum aperture, the astigmatism diagrams and distortion diagrams show respective maximum values of image heights, and the coma diagrams values at respective image heights. Furthermore, d indicates the d line (λ=587.6 nm) and g the g line (λ=435.8 nm). In the astigmatism diagrams, solid lines indicate a sagittal image surface and dashed lines a meridional image surface. The description of the aberration diagrams also applies to the examples hereinafter. As apparent from the aberration diagrams, it is seen that this variable magnification optical system ZL1 according to the first example is well corrected for the various aberrations in each of the focal length states ranging from the wide-angle end state to the telephoto end state and has excellent imaging performance.

Second Example

Figure 5:
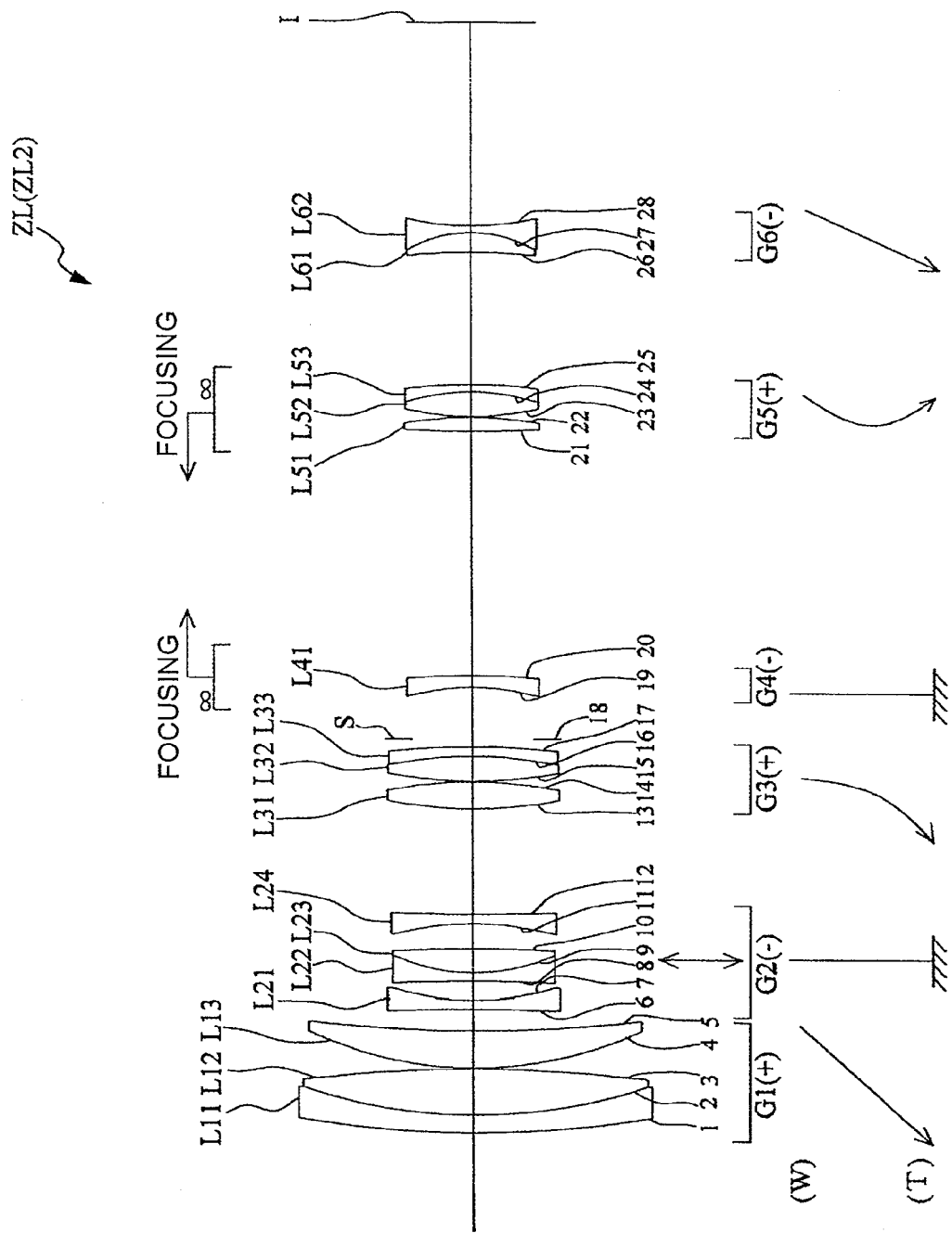
FIG. 5 is a lens sectional view in the wide-angle end state showing a configuration of a variable magnification optical system according to the second example.

FIG. 5 is a lens sectional view in the wide-angle end state showing a configuration of a variable magnification optical system according to the second example. In this variable magnification optical system ZL2 in FIG. 5, the first lens unit G1 is composed of, in order from the object side, a cemented lens of a negative meniscus lens L11 with a convex surface on the object side and a positive lens L12 of a biconvex shape, and a positive meniscus lens L13 with a convex surface on the object side. The second lens unit G2 is composed of, in order from the object side, a negative lens L21 of a biconcave shape, a cemented lens of a negative lens L22 of a biconcave shape and a positive lens L23 of a biconvex shape, and a negative lens L24 of a biconcave shape. The third lens unit G3 is composed of, in order from the object side, a positive lens L31 of a biconvex shape, and a cemented lens of a positive lens L32 of a biconvex shape and a negative meniscus lens L33 with a concave surface on the object side. The fourth lens unit G4 is composed of, in order from the object side, a negative meniscus lens L41 with a concave surface on the object side. The fifth lens unit G5 is composed of, in order from the object side, a positive lens L51 of a biconvex shape, and a cemented lens of a positive lens L52 of a biconvex shape and a negative meniscus lens L53 with a concave surface on the object side. The sixth lens unit G6 is composed of, in order from the object side, a cemented lens of a positive meniscus lens L61 with a concave surface on the object side and a negative lens L62 of a biconcave shape. In this variable magnification optical system ZL2, the presence or absence of movement and variations of the spaces of the respective lens units G1-G6 during the magnification change from the wide-angle end state to the telephoto end state, and the configuration of the aperture stop S are as described above.

Table 4 below provides values of specifications of the variable magnification optical system ZL2 according to the second example.

TABLE 4

| [Overall Specification] | | | | | |
|---|---|---|---|---|---|
| | Wide-angle end | | Intermediate focal length | | Telephoto end |
| f = | 82.4 | ~ | 200.0 | ~ | 388.2 |
| F. NO = | 4.6 | ~ | 5.7 | ~ | 5.8 |
| Overall length = | 228.73 | ~ | 270.34 | ~ | 290.00 |

| [Lens Data] | | | | |
|---|---|---|---|---|
| Surface number | Radius of curvature | Surface Separation | Refractive index | Abbe number |
| 1 | 219.7439 | 3.6 | 1.79504 | 28.7 |
| 2 | 111.1554 | 9.5 | 1.49782 | 82.6 |
| 3 | −287.9130 | 0.2 | 1.00000 | |
| 4 | 80.3918 | 7.7 | 1.49782 | 82.6 |
| 5 | 294.8146 | d5 | 1.00000 | |
| 6 | −437.3943 | 1.8 | 1.83481 | 42.7 |
| 7 | 55.5806 | 4.0 | 1.00000 | |
| 8 | −335.8995 | 1.7 | 1.72916 | 54.7 |
| 9 | 40.5343 | 5.0 | 1.78470 | 26.3 |
| 10 | −254.6206 | 5.2 | 1.00000 | |

TABLE 4-continued

| | | | | |
|---|---|---|---|---|
| 11 | −63.8260 | 2.0 | 1.73400 | 51.5 |
| 12 | 775.2289 | d12 | 1.00000 | |
| 13 | 91.6310 | 5.5 | 1.60311 | 60.7 |
| 14 | −97.1523 | 0.2 | 1.00000 | |
| 15 | 93.2203 | 5.2 | 1.49782 | 82.6 |
| 16 | −86.4633 | 2.0 | 1.80809 | 22.8 |
| 17 | −156.6859 | 1.6 | 1.00000 | |
| 18 | 0.0000 | d18 | 1.00000 | |
| 19 | −51.6524 | 2.5 | 1.48749 | 70.5 |
| 20 | −169.2097 | d20 | 1.00000 | |
| 21 | 203.9117 | 2.9 | 1.48749 | 70.5 |
| 22 | −81.3372 | 0.2 | 1.00000 | |
| 23 | 60.5772 | 5.1 | 1.48749 | 70.5 |
| 24 | −46.7896 | 1.5 | 1.80518 | 25.4 |
| 25 | −118.9322 | d25 | 1.00000 | |
| 26 | −142.6521 | 4.0 | 1.80518 | 25.4 |
| 27 | −27.4184 | 1.4 | 1.79500 | 45.3 |
| 28 | 62.3203 | Bf | 1.00000 | |

[Focal Length Data of Lens Units]

| | |
|---|---|
| f1 | 139.14 |
| f2 | −34.01 |
| f3 | 52.07 |
| f4 | −153.58 |
| f5 | 61.43 |
| f6 | −54.83 |

In this second example, the axial aerial distance d0 between the object and the first lens unit G1, the axial aerial distance d5 between the first lens unit G1 and the second lens unit G2, the axial aerial distance d12 between the second lens unit G2 and the third lens unit G3, the axial aerial distance d18 between the third lens unit G3 and the fourth lens unit G4, the axial aerial distance d20 between the fourth lens unit G4 and the fifth lens unit G5, the axial aerial distance d25 between the fifth lens unit G5 and the sixth lens unit G6, and the back focus Bf vary during zooming. Table 5 below shows the variable distance data at each of focal lengths in the wide-angle end state, in an intermediate focal length state, and in the telephoto end state with focus on infinity, with focus on a short-distance object by the fifth lens unit, and with focus on a short-distance object by the fourth lens unit in the second example.

TABLE 5

| | Wide-angle end | Intermediate focal length | Telephoto end |
|---|---|---|---|
| [Focus on infinity] | | | |
| f | 82.4 | 200.0 | 388.2 |
| d0 | ∞ | ∞ | ∞ |
| d5 | 4.45 | 46.06 | 65.72 |
| d12 | 21.81 | 12.00 | 1.49 |
| d18 | 10.74 | 20.56 | 31.07 |
| d20 | 50.94 | 38.41 | 42.11 |
| d25 | 26.98 | 17.01 | 4.07 |
| Bf | 41.00 | 63.50 | 72.74 |
| [Focus by fifth unit] | | | |
| β | −0.0754 | −0.0466 | −0.0257 |
| d0 | 1034.33 | 4103.80 | 14597.06 |
| d5 | 4.45 | 46.06 | 65.72 |
| d12 | 21.82 | 12.00 | 1.49 |
| d18 | 10.74 | 20.56 | 31.07 |
| d20 | 48.94 | 36.41 | 40.11 |
| d25 | 28.98 | 19.01 | 6.07 |
| Bf | 41.00 | 63.50 | 72.74 |
| [Focus by fourth units] | | | |
| β | −0.0161 | −0.0119 | −0.0104 |
| d0 | 5124.53 | 16842.04 | 37234.52 |
| d5 | 4.45 | 46.06 | 65.72 |

TABLE 5-continued

| | Wide-angle end | Intermediate focal length | Telephoto end |
|---|---|---|---|
| d12 | 21.82 | 12.00 | 1.49 |
| d18 | 12.74 | 22.56 | 33.07 |
| d20 | 48.94 | 36.41 | 40.11 |
| d25 | 26.98 | 17.01 | 4.07 |
| Bf | 41.00 | 63.50 | 72.74 |

Table 6 below shows values corresponding to the respective conditions in the second example.

TABLE 6

| |
|---|
| (1) |f4|/f5 = 2.500 |
| (2) β5w = 0.070 |
| (3) (−f2)/f5 = 0.554 |

FIGS. 6 to 8 are various aberration diagrams of the variable magnification optical system ZL2 according to the second example. FIG. 6 shows various aberration diagrams in the infinity in-focus state, wherein FIG. 6 (*a*) is various aberration diagrams in the infinity in-focus state in the wide-angle end state, FIG. 6 (*b*) various aberrations in the infinity in-focus state in the intermediate focal length state, and FIG. 6 (*c*) various aberrations in the infinity in-focus state in the telephoto end state. FIG. 7 shows various aberration diagrams in the short-distance fifth-unit in-focus state, wherein FIG. 7 (*a*) is various aberration diagrams with focus on a short-distance object by the fifth unit in the wide-angle end state, FIG. 7 (*b*) various aberrations with focus on a short-distance object by the fifth unit in the intermediate focal length state, and FIG. 7 (*c*) various aberrations with focus on a short-distance object by the fifth unit in the telephoto end state. FIG. 8 shows various aberration diagrams in the short-distance fourth-unit in-focus state, wherein FIG. 8 (*a*) is various aberration diagrams with focus on a short-distance object by the fourth unit in the wide-angle end state, FIG. 8 (*b*) various aberrations with focus on a short-distance object by the fourth unit in the intermediate focal length state, and FIG. 8 (*c*) various aberrations with focus on a short-distance object by the fourth unit in the telephoto end state. As apparent from the aberration diagrams, it is seen that the variable magnification optical system ZL2 according to the second example is well corrected for the various aberrations in each of the focal length states ranging from the wide-angle end state to the telephoto end state and has excellent imaging performance.

Third Example

Figure 9:
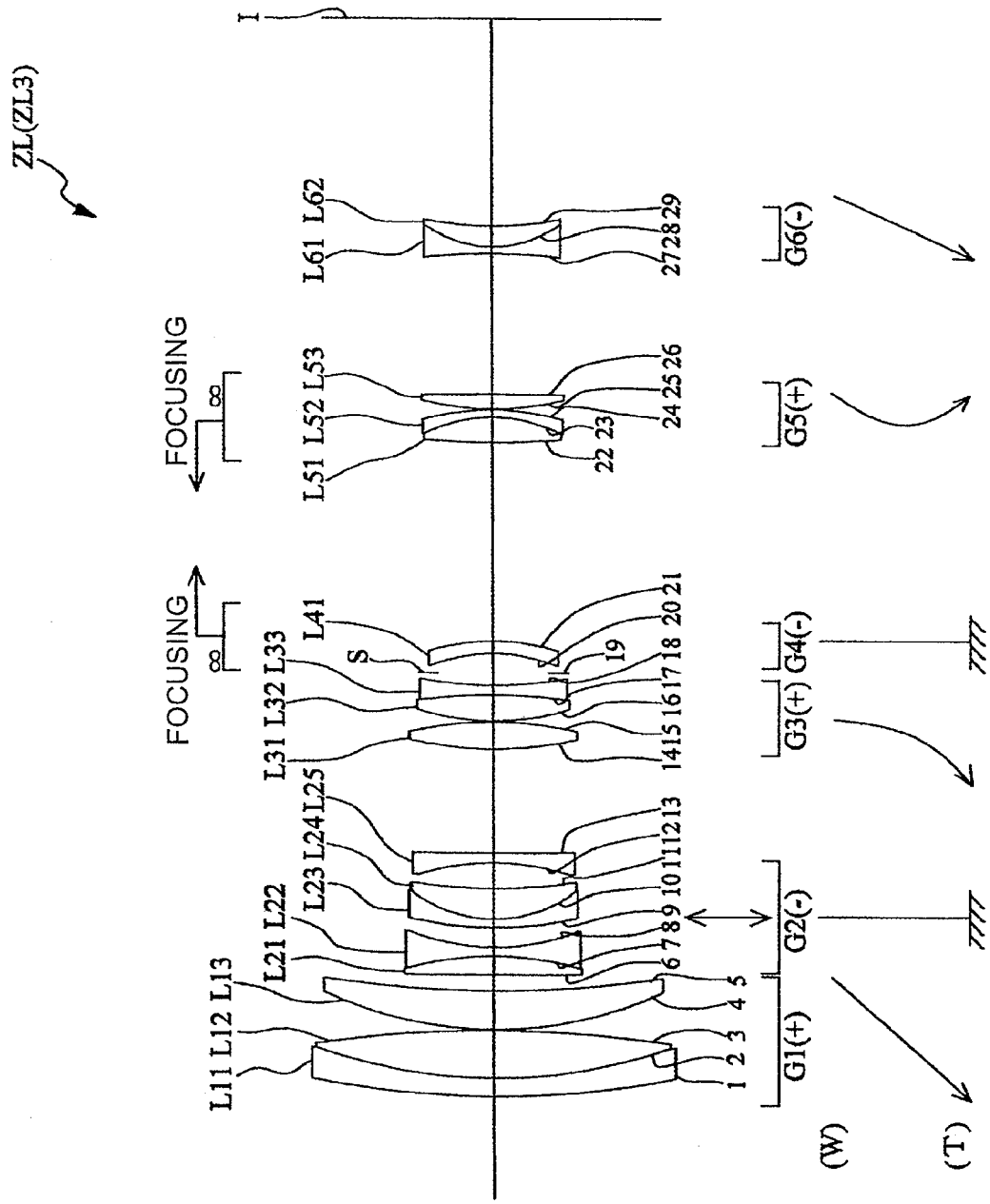
FIG. 9 is a lens sectional view in the wide-angle end state showing a configuration of a variable magnification optical system according to the third example.

FIG. 9 is a lens sectional view in the wide-angle end state showing a configuration of a variable magnification optical system according to the third example. In the variable magnification optical system ZL3 in FIG. 9, the first lens unit G1 is composed of, in order from the object side, a cemented lens of a negative meniscus lens L11 with a convex surface on the object side and a positive lens L12 of a biconvex shape, and a positive meniscus lens L13 with a convex surface on the object side. The second lens unit G2 is composed of, in order from the object side, a cemented lens of a positive lens L21 of a biconvex shape and a negative lens L22 of a biconcave shape, a cemented lens of a negative meniscus lens L23 with a convex surface on the object side and a positive meniscus lens L24 with a convex surface on the object side, and a negative lens L25 of a biconcave shape. The third lens unit G3 is composed of, in order from the object side, a positive lens L31 of a biconvex shape, and a cemented lens of a positive lens L32 of a biconvex shape and a negative lens L33 of a biconcave shape. The fourth lens unit G4 is composed of, in order from the object side, a negative meniscus lens L41 with a concave surface on the object side. The fifth lens unit G5 is composed of, in order from the object side, a cemented lens of a positive lens L51 of a biconvex shape and a negative meniscus lens L52 with a concave surface on the object side, and a positive lens L53 of a biconvex shape. The sixth lens unit G6 is composed of, in order from the object side, a cemented lens of a negative lens L61 of a biconcave shape and a positive meniscus lens L62 with a convex surface on the object side. In this variable magnification optical system ZL3, the presence or absence of movement and variations of the spaces of the respective lens units G1-G6 during the magnification change from the wide-angle end state to the telephoto end state, and the configuration of the aperture stop S are as described above.

Table 7 below provides values of specifications of the variable magnification optical system ZL3 according to the third example.

In this third example, the axial aerial distance d0 between the object and the first lens unit G1, the axial aerial distance d5 between the first lens unit G1 and the second lens unit G2, the axial aerial distance d13 between the second lens unit G2 and the third lens unit G3, the axial aerial distance d19 between the third lens unit G3 and the fourth lens unit G4, the axial aerial distance d21 between the fourth lens unit G4 and the fifth lens unit G5, the axial aerial distance d26 between the fifth lens unit G5 and the sixth lens unit G6, and the back focus Bf vary during zooming. Table 8 below shows the variable distance data at each of focal lengths in the wide-angle end state, in an intermediate focal length state, and in the telephoto end state with focus on infinity, with focus on a short-distance object by the fifth lens unit, and with focus on a short-distance object by the fourth lens unit in the third example.

TABLE 7

[Overall Specification]

| | Wide-angle end | | Intermediate focal length | | Telephoto end |
|---|---|---|---|---|---|
| f = | 82.4 | ~ | 200.0 | ~ | 388.0 |
| F. NO = | 4.6 | ~ | 5.2 | ~ | 5.7 |
| Overall length = | 216.46 | ~ | 256.52 | ~ | 274.62 |

[Lens Data]

| Surface number | Radius of curvature | Surface Separation | Refractive index | Abbe number |
|---|---|---|---|---|
| 1 | 186.6056 | 3.6 | 1.80518 | 25.4 |
| 2 | 106.6724 | 9.5 | 1.49782 | 82.6 |
| 3 | −236.0925 | 0.2 | 1.00000 | |
| 4 | 79.8692 | 7.7 | 1.49782 | 82.6 |
| 5 | 216.1842 | d5 | 1.00000 | |
| 6 | 1245.4086 | 3.8 | 1.80518 | 25.4 |
| 7 | −62.3722 | 1.8 | 1.80610 | 40.9 |
| 8 | 44.6712 | 4.0 | 1.00000 | |
| 9 | 73.9833 | 1.7 | 1.64000 | 60.1 |
| 10 | 26.4127 | 6.0 | 1.80384 | 33.9 |
| 11 | 95.2700 | 5.2 | 1.00000 | |
| 12 | −49.4813 | 2.0 | 1.79500 | 45.3 |
| 13 | 802.0738 | d13 | 1.00000 | |
| 14 | 70.7118 | 5.5 | 1.64000 | 60.1 |
| 15 | −68.7799 | 0.2 | 1.00000 | |
| 16 | 48.6749 | 5.2 | 1.49782 | 82.6 |
| 17 | −122.4910 | 2.0 | 1.77250 | 49.6 |
| 18 | 77.7615 | 2.5 | 1.00000 | |
| 19 | 0.0000 | d19 | 1.00000 | |
| 20 | −31.8964 | 2.5 | 1.62041 | 60.3 |
| 21 | −41.3589 | d21 | 1.00000 | |
| 22 | 151.6384 | 5.1 | 1.48749 | 70.5 |
| 23 | −28.9806 | 1.5 | 1.80518 | 25.4 |
| 24 | −49.5568 | 0.2 | 1.00000 | |
| 25 | 57.3841 | 2.9 | 1.48749 | 70.5 |
| 26 | −762.4247 | d26 | 1.00000 | |
| 27 | −119.3028 | 1.4 | 1.79500 | 45.3 |
| 28 | 23.0311 | 4.0 | 1.80518 | 25.4 |
| 29 | 68.7798 | Bf | 1.00000 | |

[Focal Length Data of Lens Units]

| f1 | 133.32 |
|---|---|
| f2 | −33.34 |
| f3 | 56.61 |
| f4 | −250.00 |
| f5 | 56.82 |
| f6 | −55.10 |

TABLE 8

| | Wide-angle end | Intermediate focal length | Telephoto end |
|---|---|---|---|
| [Focus on infinity] | | | |
| f | 82.4 | 200.0 | 388.0 |
| d0 | ∞ | ∞ | ∞ |
| d5 | 3.20 | 43.26 | 61.37 |
| d13 | 21.21 | 11.60 | 1.40 |
| d19 | 3.98 | 13.60 | 23.79 |
| d21 | 40.26 | 29.88 | 31.96 |
| d26 | 28.30 | 18.33 | 3.92 |
| Bf | 41.00 | 61.36 | 73.69 |
| [Focus by fifth unit] | | | |
| β | −0.0755 | −0.0453 | −0.0264 |
| d0 | 1032.88 | 4232.59 | 14235.06 |
| d5 | 3.20 | 43.26 | 61.37 |
| d13 | 21.21 | 11.60 | 1.40 |
| d19 | 3.98 | 13.60 | 23.79 |
| d21 | 38.26 | 27.88 | 29.96 |
| d26 | 30.30 | 20.33 | 5.92 |
| Bf | 41.00 | 61.36 | 73.69 |
| [Focus by fourth units] | | | |
| β | −0.0042 | −0.0040 | −0.0049 |
| d0 | 19721.36 | 49821.38 | 79773.09 |
| d5 | 3.20 | 43.26 | 61.37 |
| d13 | 21.21 | 11.60 | 1.40 |
| d19 | 5.98 | 15.60 | 25.79 |
| d21 | 38.26 | 27.88 | 29.96 |
| d26 | 28.30 | 18.33 | 3.92 |
| Bf | 41.00 | 61.36 | 73.69 |

Table 9 below shows values corresponding to the respective conditions in the third example.

TABLE 9

(1) |f4|/f5 = 4.400
(2) β5w = 0.009
(3)) (−f2)/f5 = 0.587

FIGS. 10 to 12 are various aberration diagrams of the variable magnification optical system ZL3 according to the third example. FIG. 10 shows various aberration diagrams in the infinity in-focus state, wherein FIG. 10 (a) is various aberration diagrams in the infinity in-focus state in the wide-angle end state, FIG. 10 (b) various aberrations in the infinity in-focus state in the intermediate focal length state, and FIG. 10 (c) various aberrations in the infinity in-focus state in the telephoto end state. FIG. 11 shows various aberration diagrams in the short-distance fifth-unit in-focus state, wherein FIG. 11 (a) is various aberration diagrams with focus on a short-distance object by the fifth unit in the wide-angle end state, FIG. 11 (b) various aberrations with focus on a short-distance object by the fifth unit in the intermediate focal length state, and FIG. 11 (c) various aberrations with focus on a short-distance object by the fifth unit in the telephoto end state. FIG. 12 shows various aberration diagrams in the short-distance fourth-unit in-focus state, wherein FIG. 12 (a) is various aberration diagrams with focus on a short-distance object by the fourth unit in the wide-angle end state, FIG. 12 (b) various aberrations with focus on a short-distance object by the fourth unit in the intermediate focal length state, and FIG. 12 (c) various aberrations with focus on a short-distance object by the fourth unit in the telephoto end state. As apparent from the aberration diagrams, it is seen that the variable magnification optical system ZL3 according to the third example is well corrected for the various aberrations in each of the focal length states ranging from the wide-angle end state to the telephoto end state and has excellent imaging performance.

Fourth Example

Figure 13:
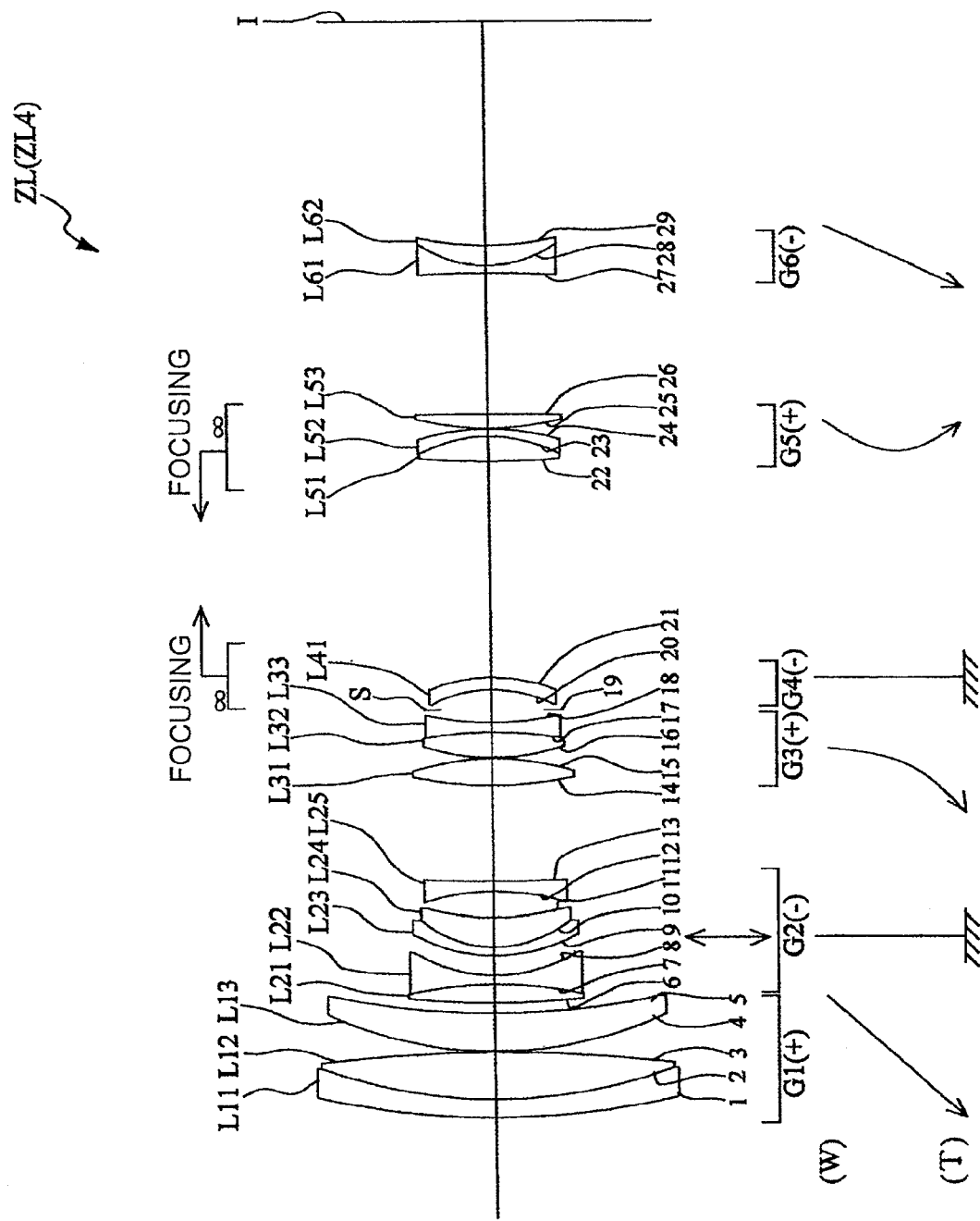
FIG. 13 is a lens sectional view in the wide-angle end state showing a configuration of a variable magnification optical system according to the fourth example.

FIG. 13 is a lens sectional view in the wide-angle end state showing a configuration of a variable magnification optical system according to the fourth example. In the variable magnification optical system ZL4 in FIG. 13, the first lens unit G1 is composed of, in order from the object side, a cemented lens of a negative meniscus lens L11 with a convex surface on the object side and a positive lens L12 of a biconvex shape, and a positive meniscus lens L13 with a convex surface on the object side. The second lens unit G2 is composed of, in order from the object side, a cemented lens of a positive lens L21 of a biconvex shape and a negative lens L22 of a biconcave shape, a cemented lens of a negative meniscus lens L23 with a convex surface on the object side and a positive meniscus lens L24 with a convex surface on the object side, and a negative lens L25 of a biconcave shape. The third lens unit G3 is composed of, in order from the object side, a positive lens L31 of a biconvex shape, and a cemented lens of a positive lens L32 of a biconvex shape and a negative lens L33 of a biconcave shape. The fourth lens unit G4 is composed of, in order from the object side, a negative meniscus lens L41 with a concave surface on the object side. The fifth lens unit G5 is composed of, in order from the object side, a cemented lens of a positive lens L51 of a biconvex shape and a negative meniscus lens L52 with a concave surface on the object side, and a positive lens L53 of a biconvex shape. The sixth lens unit G6 is composed of, in order from the object side, a cemented lens of a negative lens L61 of a biconcave shape and a positive meniscus lens L62 with a convex surface on the object side. In this variable magnification optical system ZL4, the presence or absence of movement and variations of the spaces of the respective lens units G1-G6 during the magnification change from the wide-angle end state to the telephoto end state, and the configuration of the aperture stop S are as described above.

Table 10 below provides values of specifications of the variable magnification optical system ZL4 according to the fourth example.

TABLE 10

[Overall Specification]

| | Wide-angle end | | Intermediate focal length | | Telephoto end |
|---|---|---|---|---|---|
| f = | 82.4 | ~ | 200.0 | ~ | 388.0 |
| F. NO = | 4.6 | ~ | 5.2 | ~ | 5.7 |
| Overall length = | 221.92 | ~ | 267.73 | ~ | 290.00 |

[Lens Data]

| Surface number | Radius of curvature | Surface Separation | Refractive index | Abbe number |
|---|---|---|---|---|
| 1 | 162.5250 | 3.6 | 1.80518 | 25.4 |
| 2 | 102.0845 | 9.5 | 1.49782 | 82.6 |
| 3 | −305.2951 | 0.2 | 1.00000 | |
| 4 | 80.2939 | 7.7 | 1.49782 | 82.6 |
| 5 | 156.1211 | d5 | 1.00000 | |
| 6 | 161.2325 | 3.8 | 1.80518 | 25.4 |
| 7 | −76.8951 | 1.8 | 1.80610 | 40.9 |
| 8 | 31.0020 | 4.0 | 1.00000 | |
| 9 | 33.5194 | 1.7 | 1.64000 | 60.1 |
| 10 | 23.4523 | 6.0 | 1.80384 | 33.9 |
| 11 | 55.0560 | 5.2 | 1.00000 | |
| 12 | −47.9871 | 2.0 | 1.79500 | 45.3 |
| 13 | 265.2947 | d13 | 1.00000 | |
| 14 | 76.0490 | 5.5 | 1.64000 | 60.1 |
| 15 | −51.9825 | 0.2 | 1.00000 | |
| 16 | 44.9819 | 5.2 | 1.49782 | 82.6 |
| 17 | −78.7748 | 2.0 | 1.77250 | 49.6 |
| 18 | 61.4549 | 2.5 | 1.00000 | |
| 19 | 0.0000 | d19 | 1.00000 | |
| 20 | −26.1736 | 2.5 | 1.62041 | 60.3 |
| 21 | −32.6385 | d21 | 1.00000 | |
| 22 | 180.5887 | 5.1 | 1.48749 | 70.5 |
| 23 | −29.4100 | 1.5 | 1.80518 | 25.4 |
| 24 | −47.8428 | 0.2 | 1.00000 | |
| 25 | 60.3197 | 2.9 | 1.48749 | 70.5 |
| 26 | −609.3087 | d26 | 1.00000 | |
| 27 | −245.3301 | 1.4 | 1.79500 | 45.3 |
| 28 | 24.4400 | 4.0 | 1.80518 | 25.4 |
| 29 | 64.3269 | Bf | 1.00000 | |

[Focal Length Data of Lens Units]

| f1 | 150.00 |
|---|---|
| f2 | −34.09 |
| f3 | 56.55 |
| f4 | −250.00 |
| f5 | 56.82 |
| f6 | −64.73 |

In this fourth example, the axial aerial distance d0 between the object and the first lens unit G1, the axial aerial distance d5 between the first lens unit G1 and the second lens unit G2, the axial aerial distance d13 between the second lens unit G2 and the third lens unit G3, the axial aerial distance d19 between the third lens unit G3 and the fourth lens unit G4, the axial aerial distance d21 between the fourth lens unit G4 and the fifth lens unit G5, the axial aerial distance d26 between the fifth lens unit G5 and the sixth lens unit G6, and the back focus Bf vary during zooming. Table 11 below shows the variable distance data at each of focal lengths in the wide-angle end state, in an intermediate focal length state, and in the telephoto end state with focus on infinity, with focus on a short-distance object by the fifth lens unit, and with focus on a short-distance object by the fourth lens unit in the fourth example.

TABLE 11

| | Wide-angle end | Intermediate focal length | Telephoto end |
|---|---|---|---|
| [Focus on infinity] | | | |
| f | 82.4 | 200.0 | 388.0 |
| d0 | ∞ | ∞ | ∞ |
| d5 | 2.10 | 47.91 | 70.18 |
| d13 | 19.70 | 10.87 | 1.66 |
| d19 | 4.21 | 13.04 | 22.25 |
| d21 | 44.33 | 30.88 | 32.19 |
| d26 | 28.57 | 18.11 | 3.60 |
| Bf | 44.51 | 68.42 | 81.63 |
| [Focus by fifth unit] | | | |
| β | −0.0696 | −0.0427 | −0.0255 |
| d0 | 1125.74 | 4498.43 | 14737.20 |
| d5 | 2.10 | 47.91 | 70.18 |
| d13 | 19.70 | 10.87 | 1.66 |
| d19 | 4.21 | 13.04 | 22.25 |
| d21 | 42.33 | 28.88 | 30.19 |
| d26 | 30.57 | 20.11 | 5.60 |
| Bf | 44.51 | 68.42 | 81.63 |
| [Focus by fourth units] | | | |
| β | −0.0020 | −0.0025 | −0.0038 |
| d0 | 41049.00 | 81710.26 | 103696.2 |
| d5 | 2.10 | 47.91 | 70.18 |
| d13 | 19.70 | 10.87 | 1.66 |
| d19 | 6.21 | 15.04 | 24.25 |
| d21 | 42.33 | 28.88 | 30.19 |
| d26 | 28.57 | 18.11 | 3.60 |
| Bf | 44.51 | 68.42 | 81.63 |

Table 12 below shows values corresponding to the respective conditions in the fourth example.

TABLE 12

(1) |f4|/f5 = 4.400
(2) β5w = 0.050
(3) (−f2)/f5 = 0.600

FIGS. 14 to 16 are various aberration diagrams of the variable magnification optical system ZL4 according to the fourth example. FIG. 14 shows various aberration diagrams in the infinity in-focus state, wherein FIG. 14 (a) is various aberration diagrams in the infinity in-focus state in the wide-angle end state, FIG. 14 (b) various aberrations in the infinity in-focus state in the intermediate focal length state, and FIG. 14 (c) various aberrations in the infinity in-focus state in the telephoto end state. FIG. 15 shows various aberration diagrams in the short-distance fifth-unit in-focus state, wherein FIG. 15 (a) is various aberration diagrams with focus on a short-distance object by the fifth unit in the wide-angle end state, FIG. 15 (b) various aberrations with focus on a short-distance object by the fifth unit in the intermediate focal length state, and FIG. 15 (c) various aberrations with focus on a short-distance object by the fifth unit in the telephoto end state. FIG. 16 shows various aberration diagrams in the short-distance fourth-unit in-focus state, wherein FIG. 16 (a) is various aberration diagrams with focus on a short-distance object by the fourth unit in the wide-angle end state, FIG. 16 (b) various aberrations with focus on a short-distance object by the fourth unit in the intermediate focal length state, and FIG. 16 (c) various aberrations with focus on a short-distance object by the fourth unit in the telephoto end state. As apparent from the aberration diagrams, it is seen that the variable magnification optical system ZL4 according to the fourth example is well corrected for the various aberrations in each of the focal length states ranging from the wide-angle end state to the telephoto end state and has excellent imaging performance.

Fifth Example

Figure 17:
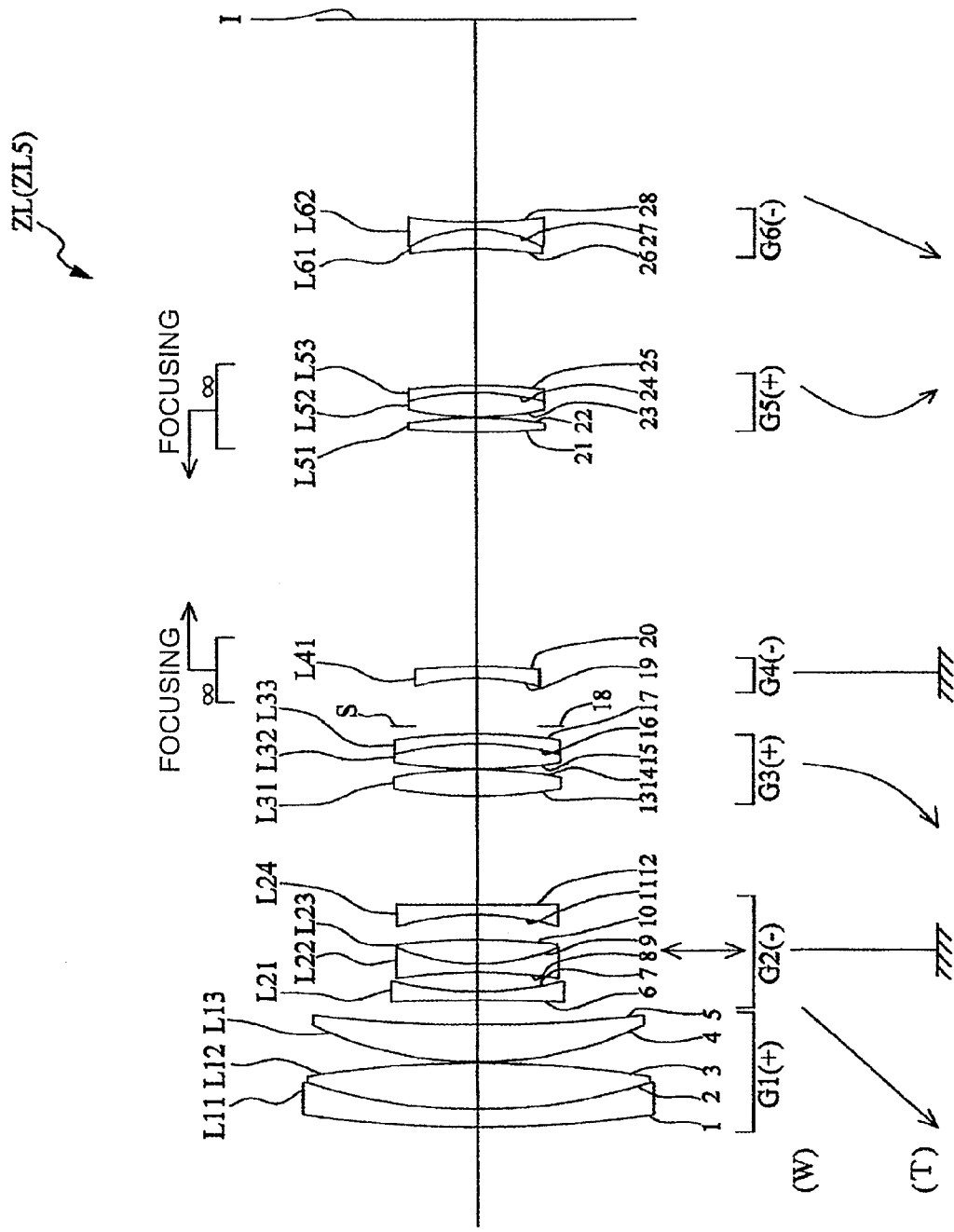
FIG. 17 is a lens sectional view in the wide-angle end state showing a configuration of a variable magnification optical system according to the fifth example.

FIG. 17 is a lens sectional view in the wide-angle end state showing a configuration of a variable magnification optical system according to the fifth example. In the variable magnification optical system ZL5 in FIG. 17, the first lens unit G1 is composed of, in order from the object side, a cemented lens of a negative meniscus lens L11 with a convex surface on the object side and a positive lens L12 of a biconvex shape, and a positive meniscus lens L13 with a convex surface on the object side. The second lens unit G2 is composed of, in order from the object side, a negative lens L21 of a biconcave shape, a cemented lens of a negative lens L22 of a biconcave shape and a positive lens L23 of a biconvex shape, and a negative lens L24 of a biconcave shape. The third lens unit G3 is composed of, in order from the object side, a positive lens L31 of a biconvex shape, and a cemented lens of a positive lens L32 of a biconvex shape and a negative meniscus lens L33 with a concave surface on the object side. The fourth lens unit G4 is composed of, in order from the object side, a negative meniscus lens L41 with a concave surface on the object side. The fifth lens unit G5 is composed of, in order from the object side, a positive lens L51 of a biconvex shape, and a cemented lens of a positive lens L52 of a biconvex shape and a negative meniscus lens L53 with a concave surface on the object side. The sixth lens unit G6 is composed of, in order from the object side, a cemented lens of a positive meniscus lens L61 with a concave surface on the object side and a negative lens L62 of a biconcave shape. In this variable magnification optical system ZL5, the presence or absence of movement and variations of the spaces of the respective lens units G1-G6 during the magnification change from the wide-angle end state to the telephoto end state, and the configuration of the aperture stop S are as described above.

Table 13 below provides values of specifications of the variable magnification optical system ZL5 according to the fifth example.

TABLE 13

| [Overall Specification] | | | | | |
|---|---|---|---|---|---|
| | Wide-angle end | | Intermediate focal length | | Telephoto end |
| f = | 82.4 | ~ | 200.0 | ~ | 389.5 |
| F. NO = | 4.6 | ~ | 5.8 | ~ | 5.8 |
| Overall length = | 228.82 | ~ | 270.31 | ~ | 290.00 |

| [Lens Data] | | | | |
|---|---|---|---|---|
| Surface number | Radius of curvature | Surface Separation | Refractive index | Abbe number |
| 1 | 259.6002 | 3.6 | 1.79504 | 28.7 |
| 2 | 117.8430 | 9.5 | 1.49782 | 82.6 |
| 3 | −224.9740 | 0.2 | 1.00000 | |
| 4 | 80.6825 | 7.7 | 1.49782 | 82.6 |
| 5 | 295.3559 | d5 | 1.00000 | |
| 6 | −435.9750 | 1.8 | 1.83481 | 42.7 |
| 7 | 71.8208 | 4.0 | 1.00000 | |
| 8 | −106.7755 | 1.7 | 1.72916 | 54.7 |
| 9 | 41.3365 | 5.0 | 1.78470 | 26.3 |
| 10 | −139.1040 | 5.2 | 1.00000 | |
| 11 | −56.8948 | 2.0 | 1.73400 | 51.5 |
| 12 | 1165.4359 | d12 | 1.00000 | |
| 13 | 97.2937 | 5.5 | 1.60311 | 60.7 |

TABLE 13-continued

| | | | | |
|---|---|---|---|---|
| 14 | −93.6175 | 0.2 | 1.00000 | |
| 15 | 114.0679 | 5.2 | 1.49782 | 82.6 |
| 16 | −67.2334 | 2.0 | 1.80809 | 22.8 |
| 17 | −124.0377 | 1.6 | 1.00000 | |
| 18 | 0.0000 | d18 | 1.00000 | |
| 19 | −50.3282 | 2.5 | 1.48749 | 70.5 |
| 20 | −123.0151 | d20 | 1.00000 | |
| 21 | 184.2064 | 2.9 | 1.48749 | 70.5 |
| 22 | −99.1526 | 0.2 | 1.00000 | |
| 23 | 61.3376 | 5.1 | 1.48749 | 70.5 |
| 24 | −53.7718 | 1.5 | 1.80518 | 25.4 |
| 25 | −125.7580 | d25 | 1.00000 | |
| 26 | −89.6653 | 4.0 | 1.80518 | 25.4 |
| 27 | −27.5018 | 1.4 | 1.79500 | 45.3 |
| 28 | 89.8682 | Bf | 1.00000 | |

[Focal Length Data of Lens Units]

| | |
|---|---|
| f1 | 137.69 |
| f2 | −34.27 |
| f3 | 54.29 |
| f4 | −176.71 |
| f5 | 63.11 |
| f6 | −56.55 |

In this fifth example, the axial aerial distance d0 between the object and the first lens unit G1, the axial aerial distance d5 between the first lens unit G1 and the second lens unit G2, the axial aerial distance d12 between the second lens unit G2 and the third lens unit G3, the axial aerial distance d18 between the third lens unit G3 and the fourth lens unit G4, the axial aerial distance d20 between the fourth lens unit G4 and the fifth lens unit G5, the axial aerial distance d25 between the fifth lens unit G5 and the sixth lens unit G6, and the back focus Bf vary during zooming. Table 14 below shows the variable distance data at each of focal lengths in the wide-angle end state, in an intermediate focal length state, and in the telephoto end state with focus on infinity, with focus on a short-distance object by the fifth lens unit, and with focus on a short-distance object by the fourth lens unit in the fifth example.

TABLE 14

| | Wide-angle end | Intermediate focal length | Telephoto end |
|---|---|---|---|
| [Focus on infinity] | | | |
| f | 82.4 | 200.0 | 389.5 |
| d0 | ∞ | ∞ | ∞ |
| d5 | 5.09 | 46.57 | 66.27 |
| d12 | 22.82 | 12.70 | 2.10 |
| d18 | 10.06 | 20.18 | 30.78 |
| d20 | 48.86 | 36.81 | 43.87 |
| d25 | 28.19 | 17.94 | 3.65 |
| Bf | 41.00 | 63.31 | 70.53 |
| [Focus by fifth unit] | | | |
| β | −0.0742 | −0.0453 | −0.0236 |
| d0 | 1051.29 | 4229.71 | 15966.43 |
| d5 | 5.09 | 46.57 | 66.27 |
| d12 | 22.82 | 12.70 | 2.10 |
| d18 | 10.06 | 20.18 | 30.78 |
| d20 | 46.86 | 34.81 | 41.87 |
| d25 | 30.19 | 19.94 | 5.65 |
| Bf | 41.00 | 63.31 | 70.53 |
| [Focus by fourth units] | | | |
| β | −0.0134 | −0.099 | −0.0089 |
| d0 | 6175.37 | 20302.39 | 43723.45 |
| d5 | 5.09 | 46.57 | 66.27 |
| d12 | 22.82 | 12.70 | 2.10 |
| d18 | 12.06 | 22.18 | 32.78 |
| d20 | 46.86 | 34.81 | 41.87 |

TABLE 14-continued

| | Wide-angle end | Intermediate focal length | Telephoto end |
|---|---|---|---|
| d25 | 28.19 | 17.94 | 3.65 |
| Bf | 41.00 | 63.31 | 70.53 |

Table 15 below shows values corresponding to the respective conditions in the fifth example.

TABLE 15

(1) |f4|/f5 = 2.800
(2) β5w = 0.078
(3) (−f2)/f5 = 0.543

FIGS. 18 to 20 are various aberration diagrams of the variable magnification optical system ZL5 according to the fifth example. FIG. 18 shows various aberration diagrams in the infinity in-focus state, wherein FIG. 18 (a) is various aberration diagrams in the infinity in-focus state in the wide-angle end state, FIG. 18 (b) various aberrations in the infinity in-focus state in the intermediate focal length state, and FIG. 18 (c) various aberrations in the infinity in-focus state in the telephoto end state. FIG. 19 shows various aberration diagrams in the short-distance fifth-unit in-focus state, wherein FIG. 19 (a) is various aberration diagrams with focus on a short-distance object by the fifth unit in the wide-angle end state, FIG. 19 (b) various aberrations with focus on a short-distance object by the fifth unit in the intermediate focal length state, and FIG. 19 (c) various aberrations with focus on a short-distance object by the fifth unit in the telephoto end state. FIG. 20 shows various aberration diagrams in the short-distance fourth-unit in-focus state, wherein FIG. 20 (a) is various aberration diagrams with focus on a short-distance object by the fourth unit in the wide-angle end state, FIG. 20 (b) various aberrations with focus on a short-distance object by the fourth unit in the intermediate focal length state, and FIG. 20 (c) various aberrations with focus on a short-distance object by the fourth unit in the telephoto end state. As apparent from the aberration diagrams, it is seen that the variable magnification optical system ZL5 according to the fifth example is well corrected for the various aberrations in each of the focal length states ranging from the wide-angle end state to the telephoto end state and has excellent imaging performance.

Sixth Example

FIG. 21 is a lens sectional view in the wide-angle end state showing a configuration of a variable magnification optical system according to the sixth example. In the variable magnification optical system ZL6 in FIG. 21, the first lens unit G1 is composed of, in order from the object side, a cemented lens of a negative meniscus lens L11 with a convex surface on the object side and a positive lens L12 of a biconvex shape, and a positive meniscus lens L13 with a convex surface on the object side. The second lens unit G2 is composed of, in order from the object side, a negative lens L21 of a biconcave shape, a cemented lens of a negative lens L22 of a biconcave shape and a positive lens L23 of a biconvex shape, and a negative lens L24 of a biconcave shape. The third lens unit G3 is composed of, in order from the object side, a positive lens L31 of a biconvex shape, and a cemented lens of a positive lens L32 of a biconvex shape and a negative meniscus lens L33 with a concave surface on the object side. The fourth lens unit G4 is composed of, in order from the object side, a negative meniscus lens L41 with a concave surface on the object side.

The fifth lens unit G5 is composed of, in order from the object side, a positive lens L51 of a biconvex shape, and a cemented lens of a positive lens L52 of a biconvex shape and a negative meniscus lens L53 with a concave surface on the object side. The sixth lens unit G6 is composed of, in order from the object side, a cemented lens of a positive meniscus lens L61 with a concave surface on the object side and a negative lens L62 of a biconcave shape. In this variable magnification optical system ZL6, the presence or absence of movement and variations of the spaces of the respective lens units G1-G6 during the magnification change from the wide-angle end state to the telephoto end state, and the configuration of the aperture stop S are as described above.

Table 16 below provides values of specifications of the variable magnification optical system ZL6 according to the sixth example.

TABLE 16

[Overall Specification]

|  | Wide-angle end | | Intermediate focal length | | Telephoto end |
|---|---|---|---|---|---|
| f = | 82.4 | ~ | 200.0 | ~ | 388.4 |
| F. NO = | 4.6 | ~ | 5.8 | ~ | 5.8 |
| Overall length = | 228.02 | ~ | 269.85 | ~ | 290.00 |

[Lens Data]

| Surface number | Radius of curvature | Surface Separation | Refractive index | Abbe number |
|---|---|---|---|---|
| 1 | 239.8352 | 3.6 | 1.79504 | 28.7 |
| 2 | 115.2026 | 9.5 | 1.49782 | 82.6 |
| 3 | −252.5673 | 0.2 | 1.00000 | |
| 4 | 84.0283 | 7.7 | 1.49782 | 82.6 |
| 5 | 371.7031 | d5 | 1.00000 | |
| 6 | −266.4667 | 1.8 | 1.83481 | 42.7 |
| 7 | 72.9431 | 4.0 | 1.00000 | |
| 8 | −335.3573 | 1.7 | 1.72916 | 54.7 |
| 9 | 37.6276 | 5.0 | 1.78470 | 26.3 |
| 10 | −314.5027 | 5.2 | 1.00000 | |
| 11 | −64.3696 | 2.0 | 1.73400 | 51.5 |
| 12 | 302.4627 | d12 | 1.00000 | |
| 13 | 77.3663 | 5.5 | 1.60311 | 60.7 |
| 14 | −205.5291 | 0.2 | 1.00000 | |
| 15 | 174.2760 | 5.2 | 1.49782 | 82.6 |
| 16 | −54.2264 | 2.0 | 1.80809 | 22.8 |
| 17 | −77.9537 | 1.6 | 1.00000 | |
| 18 | 0.0000 | d18 | 1.00000 | |
| 19 | −40.0175 | 2.5 | 1.48749 | 70.5 |
| 20 | −66.2219 | d20 | 1.00000 | |
| 21 | 161.3373 | 2.9 | 1.48749 | 70.5 |
| 22 | −94.9495 | 0.2 | 1.00000 | |
| 23 | 57.8327 | 5.1 | 1.48749 | 70.5 |
| 24 | −51.4556 | 1.5 | 1.80518 | 25.4 |
| 25 | −132.5543 | d25 | 1.00000 | |
| 26 | −136.8248 | 4.0 | 1.80518 | 25.4 |
| 27 | −28.2489 | 1.4 | 1.79500 | 45.3 |
| 28 | 60.3266 | Bf | 1.00000 | |

[Focal Length Data of Lens Units]

| f1 | 137.18 |
|---|---|
| f2 | −34.47 |
| f3 | 56.73 |
| f4 | −214.15 |
| f5 | 61.18 |
| f6 | −52.84 |

In this sixth example, the axial aerial distance d0 between the object and the first lens unit G1, the axial aerial distance d5 between the first lens unit G1 and the second lens unit G2, the axial aerial distance d12 between the second lens unit G2 and the third lens unit G3, the axial aerial distance d18 between the third lens unit G3 and the fourth lens unit G4, the axial aerial distance d20 between the fourth lens unit G4 and the fifth lens unit G5, the axial aerial distance d25 between the fifth lens unit G5 and the sixth lens unit G6, and the back focus Bf vary during zooming. Table 17 below shows the variable distance data at each of focal lengths in the wide-angle end state, in an intermediate focal length state, and in the telephoto end state with focus on infinity, with focus on a short-distance object by the fifth lens unit, and with focus on a short-distance object by the fourth lens unit in the sixth example.

TABLE 17

| | Wide-angle end | Intermediate focal length | Telephoto end |
|---|---|---|---|
| [Focal Length Data of Lens Units] | | | |
| f | 82.4 | 200.0 | 388.2 |
| d0 | ∞ | ∞ | ∞ |
| d5 | 4.13 | 45.96 | 66.11 |
| d12 | 20.88 | 11.96 | 2.10 |
| d18 | 11.25 | 20.17 | 30.03 |
| d20 | 50.33 | 36.67 | 40.91 |
| d25 | 27.63 | 17.32 | 3.81 |
| Bf | 41.00 | 64.97 | 74.24 |
| [Focus by fifth unit] | | | |
| β | −0.079 | −0.0498 | −0.0274 |
| d0 | 998.21 | 3826.65 | 13693.70 |
| d5 | 4.13 | 45.96 | 66.11 |
| d12 | 20.88 | 11.96 | 2.10 |
| d18 | 11.25 | 20.17 | 30.03 |
| d20 | 48.33 | 34.67 | 38.91 |
| d25 | 29.63 | 19.32 | 5.81 |
| Bf | 41.00 | 64.97 | 74.24 |
| [Focus by fourth units] | | | |
| β | −0.0090 | −0.0074 | −0.0072 |
| d0 | 9215.31 | 26980.55 | 53589.07 |
| d5 | 4.13 | 45.96 | 66.11 |
| d12 | 20.88 | 11.96 | 2.10 |
| d18 | 13.25 | 22.17 | 32.03 |
| d20 | 48.33 | 34.67 | 38.91 |
| d25 | 27.63 | 17.32 | 3.81 |
| Bf | 41.00 | 64.97 | 74.24 |

Table 18 below shows values corresponding to the respective conditions in the sixth example.

TABLE 18

(1) |f4|/f5 = 3.500
(2) β5w = 0.060
(3) (−f2)/f5 = 0.563

FIGS. 22 to 24 are various aberration diagrams of the variable magnification optical system ZL6 according to the sixth example. FIG. 22 shows various aberration diagrams in the infinity in-focus state, wherein FIG. 22 (*a*) is various aberration diagrams in the infinity in-focus state in the wide-angle end state, FIG. 22 (*b*) various aberrations in the infinity in-focus state in the intermediate focal length state, and FIG. 22 (*c*) various aberrations in the infinity in-focus state in the telephoto end state. FIG. 23 shows various aberration diagrams in the short-distance fifth-unit in-focus state, wherein FIG. 23 (*a*) is various aberration diagrams with focus on a short-distance object by the fifth unit in the wide-angle end state, FIG. 23 (*b*) various aberrations with focus on a short-distance object by the fifth unit in the intermediate focal length state, and FIG. 23 (*c*) various aberrations with focus on a short-distance object by the fifth unit in the telephoto end state. FIG. 24 shows various aberration diagrams in the short-distance fourth-unit in-focus state, wherein FIG. 24 (*a*) is various aberration diagrams with focus on a short-distance object by the fourth unit in the wide-angle end state, FIG. 24(b) various aberrations with focus on a short-distance object by the fourth unit in the intermediate focal length state, and FIG. 24(c) various aberrations with focus on a short-distance object by the fourth unit in the telephoto end state. As apparent from the aberration diagrams, it is seen that the variable magnification optical system ZL6 according to the sixth example is well corrected for the various aberrations in each of the focal length states ranging from the wide-angle end state to the telephoto end state and has excellent imaging performance.

Seventh Example

FIG. 25 is a lens sectional view in the wide-angle end state showing a configuration of a variable magnification optical system according to the seventh example. In the variable magnification optical system ZL7 in FIG. 25, the first lens unit G1 is composed of, in order from the object side, a cemented lens of a negative meniscus lens L11 with a convex surface on the object side and a positive lens L12 of a biconvex shape, and a positive meniscus lens L13 with a convex surface on the object side. The second lens unit G2 is composed of, in order from the object side, a negative lens L21 of a biconcave shape, a cemented lens of a negative lens L22 of a biconcave shape and a positive lens L23 of a biconvex shape, and a negative lens L24 of a biconcave shape. The third lens unit G3 is composed of, in order from the object side, a positive meniscus lens L31 with a convex surface on the object side, and a cemented lens of a positive lens L32 of a biconvex shape and a negative meniscus lens L33 with a concave surface on the object side. The fourth lens unit G4 is composed of, in order from the object side, a negative meniscus lens L41 with a concave surface on the object side. The fifth lens unit G5 is composed of, in order from the object side, a positive lens L51 of a biconvex shape, and a cemented lens of a positive lens L52 of a biconvex shape and a negative meniscus lens L53 with a concave surface on the object side. The sixth lens unit G6 is composed of, in order from the object side, a cemented lens of a positive meniscus lens L61 with a concave surface on the object side and a negative lens L62 of a biconcave shape. In this variable magnification optical system ZL7, the presence or absence of movement and variations of the spaces of the respective lens units G1-G6 during the magnification change from the wide-angle end state to the telephoto end state, and the configuration of the aperture stop S are as described above.

Table 19 below provides values of specifications of the variable magnification optical system ZL7 according to the seventh example.

TABLE 19

[Overall Specification]

| | Wide-angle end | | Intermediate focal length | | Telephoto end |
|---|---|---|---|---|---|
| f = | 82.4 | ~ | 200.0 | ~ | 388.2 |
| F. NO = | 4.6 | ~ | 5.4 | ~ | 5.8 |
| Overall length = | 228.92 | ~ | 270.46 | ~ | 290.00 |

[Lens Data]

| Surface number | Radius of curvature | Surface Separation | Refractive index | Abbe number |
|---|---|---|---|---|
| 1 | 210.0261 | 3.6 | 1.79504 | 28.7 |
| 2 | 108.0610 | 9.5 | 1.49782 | 82.6 |
| 3 | −289.7806 | 0.2 | 1.00000 | |

TABLE 19-continued

| 4 | 89.0950 | 7.7 | 1.49782 | 82.6 |
|---|---|---|---|---|
| 5 | 500.5026 | d5 | 1.00000 | |
| 6 | −391.4927 | 1.8 | 1.83481 | 42.7 |
| 7 | 85.9119 | 4.0 | 1.00000 | |
| 8 | −125.7195 | 1.7 | 1.72916 | 54.7 |
| 9 | 48.2861 | 5.0 | 1.78470 | 26.3 |
| 10 | −158.0961 | 5.2 | 1.00000 | |
| 11 | −75.2204 | 2.0 | 1.73400 | 51.5 |
| 12 | 149.3048 | d12 | 1.00000 | |
| 13 | 70.0710 | 5.5 | 1.60311 | 60.7 |
| 14 | 4661.8783 | 0.2 | 1.00000 | |
| 15 | 145.0522 | 5.2 | 1.49782 | 82.6 |
| 16 | −54.0568 | 2.0 | 1.80809 | 22.8 |
| 17 | −69.0322 | 1.6 | 1.00000 | |
| 18 | 0.0000 | d18 | 1.00000 | |
| 19 | −36.9445 | 2.5 | 1.48749 | 70.5 |
| 20 | −64.3707 | d20 | 1.00000 | |
| 21 | 178.9643 | 2.9 | 1.48749 | 70.5 |
| 22 | −80.2954 | 0.2 | 1.00000 | |
| 23 | 57.3464 | 5.1 | 1.48749 | 70.5 |
| 24 | −49.2038 | 1.5 | 1.80518 | 25.4 |
| 25 | −129.8402 | d25 | 1.00000 | |
| 26 | −200.1086 | 4.0 | 1.80518 | 25.4 |
| 27 | −30.0256 | 1.4 | 1.79500 | 45.3 |
| 28 | 54.3130 | Bf | 1.00000 | |

[Focal Length Data of Lens Units]

| f1 | 136.68 |
|---|---|
| f2 | −35.05 |
| f3 | 57.94 |
| f4 | −183.35 |
| f5 | 59.14 |
| f6 | −54.08 |

In this seventh example, the axial aerial distance d0 between the object and the first lens unit G1, the axial aerial distance d5 between the first lens unit G1 and the second lens unit G2, the axial aerial distance d12 between the second lens unit G2 and the third lens unit G3, the axial aerial distance d18 between the third lens unit G3 and the fourth lens unit G4, the axial aerial distance d20 between the fourth lens unit G4 and the fifth lens unit G5, the axial aerial distance d25 between the fifth lens unit G5 and the sixth lens unit G6, and the back focus Bf vary during zooming. Table 20 below shows the variable distance data at each of focal lengths in the wide-angle end state, in an intermediate focal length state, and in the telephoto end state with focus on infinity, with focus on a short-distance object by the fifth lens unit, and with focus on a short-distance object by the fourth lens unit in the seventh example.

TABLE 20

| | Wide-angle end | Intermediate focal length | Telephoto end |
|---|---|---|---|
| | [Focus on infinity] | | |
| f | 82.4 | 200.0 | 388.2 |
| d0 | ∞ | ∞ | ∞ |
| d5 | 4.70 | 46.24 | 65.78 |
| d12 | 20.10 | 12.05 | 2.10 |
| d18 | 10.67 | 18.72 | 28.66 |
| d20 | 49.33 | 36.64 | 40.26 |
| d25 | 29.01 | 17.69 | 3.74 |
| Bf | 42.31 | 66.32 | 76.66 |
| | [Focus by fifth unit] | | |
| β | −0.0781 | −0.0499 | −0.0283 |
| d0 | 996.06 | 3821.15 | 13243.36 |
| d5 | 4.70 | 46.24 | 65.78 |
| d12 | 20.10 | 12.05 | 2.10 |

TABLE 20-continued

|  | Wide-angle end | Intermediate focal length | Telephoto end |
|---|---|---|---|
| d18 | 10.67 | 18.72 | 28.66 |
| d20 | 47.33 | 34.64 | 38.26 |
| d25 | 31.01 | 19.69 | 5.74 |
| Bf | 42.31 | 66.32 | 76.66 |
| [Focus by fourth units] | | | |
| β | −0.0076 | −0.0075 | −0.0080 |
| d0 | 10842.33 | 26729.20 | 48777.64 |
| d5 | 4.70 | 46.24 | 65.78 |
| d12 | 20.10 | 12.05 | 2.10 |
| d18 | 12.67 | 20.72 | 30.66 |
| d20 | 47.33 | 34.64 | 38.26 |
| d25 | 29.01 | 17.69 | 3.74 |
| Bf | 42.31 | 66.32 | 76.66 |

Table 21 below shows values corresponding to the respective conditions in the seventh example.

TABLE 21

(1) |f4|/f5 = 3.100
(2) β5w = 0.010
(3) (−f2)/f5 = 0.593

FIGS. 26 to 28 are various aberration diagrams of the variable magnification optical system ZL7 according to the seventh example. FIG. 26 shows various aberration diagrams in the infinity in-focus state, wherein FIG. 26 (a) is various aberration diagrams in the infinity in-focus state in the wide-angle end state, FIG. 26 (b) various aberrations in the infinity in-focus state in the intermediate focal length state, and FIG. 26 (c) various aberrations in the infinity in-focus state in the telephoto end state. FIG. 27 shows various aberration diagrams in the short-distance fifth-unit in-focus state, wherein FIG. 27 (a) is various aberration diagrams with focus on a short-distance object by the fifth unit in the wide-angle end state, FIG. 27 (b) various aberrations with focus on a short-distance object by the fifth unit in the intermediate focal length state, and FIG. 27 (c) various aberrations with focus on a short-distance object by the fifth unit in the telephoto end state. FIG. 28 shows various aberration diagrams in the short-distance fourth-unit in-focus state, wherein FIG. 28 (a) is various aberration diagrams with focus on a short-distance object by the fourth unit in the wide-angle end state, FIG. 28 (b) various aberrations with focus on a short-distance object by the fourth unit in the intermediate focal length state, and FIG. 28 (c) various aberrations with focus on a short-distance object by the fourth unit in the telephoto end state. As apparent from the aberration diagrams, it is seen that the variable magnification optical system ZL7 according to the seventh example is well corrected for the various aberrations in each of the focal length states ranging from the wide-angle end state to the telephoto end state and has excellent imaging performance.

Eighth Example

FIG. 29 is a lens sectional view in the wide-angle end state showing a configuration of a variable magnification optical system according to the eighth example. In the variable magnification optical system ZL8 in FIG. 29, the first lens unit G1 is composed of, in order from the object side, a cemented lens of a negative meniscus lens L11 with a convex surface on the object side and a positive lens L12 of a biconvex shape, and a positive meniscus lens L13 with a convex surface on the object side. The second lens unit G2 is composed of, in order from the object side, a cemented lens of a positive lens L21 of a biconvex shape and a negative lens L22 of a biconcave shape, a cemented lens of a negative meniscus lens L23 with a convex surface on the object side and a positive meniscus lens L24 with a convex surface on the object side, and a negative lens L25 of a biconcave shape. The third lens unit G3 is composed of, in order from the object side, a positive lens L31 of a biconvex shape, and a cemented lens of a positive meniscus lens L32 with a convex surface on the object side and a negative meniscus lens L33 with a convex surface on the object side. The fourth lens unit G4 is composed of, in order from the object side, a negative meniscus lens L41 with a concave surface on the object side. The fifth lens unit G5 is composed of, in order from the object side, a cemented lens of a positive lens L51 of a biconvex shape and a negative meniscus lens L52 with a concave surface on the object side, and a positive lens L53 of a biconvex shape. The sixth lens unit G6 is composed of, in order from the object side, a cemented lens of a negative lens L61 of a biconcave shape and a positive meniscus lens L62 with a convex surface on the object side. In this variable magnification optical system ZL8, the presence or absence of movement and variations of the spaces of the respective lens units G1-G6 during the magnification change from the wide-angle end state to the telephoto end state, and the configuration of the aperture stop S are as described above.

Table 22 below provides values of specifications of the variable magnification optical system ZL8 according to the eighth example.

TABLE 22

[Overall Specification]

|  | Wide-angle end |  | Intermediate focal length |  | Telephoto end |
|---|---|---|---|---|---|
| f = | 82.4 | ~ | 200.0 | ~ | 388.0 |
| F. NO = | 4.6 | ~ | 5.1 | ~ | 5.8 |
| Overall length = | 230.00 | ~ | 271.43 | ~ | 290.00 |

[Lens Data]

| Surface number | Radius of curvature | Surface Separation | Refractive index | Abbe number |
|---|---|---|---|---|
| 1 | 139.2879 | 3.6 | 1.80518 | 25.4 |
| 2 | 90.2175 | 12.0 | 1.49782 | 82.6 |
| 3 | −296.6901 | 0.2 | 1.00000 | |
| 4 | 81.6176 | 6.0 | 1.49782 | 82.6 |
| 5 | 165.5421 | d5 | 1.00000 | |
| 6 | 230.8502 | 3.8 | 1.80518 | 25.4 |
| 7 | −82.0365 | 1.8 | 1.80610 | 40.9 |
| 8 | 37.0535 | 4.0 | 1.00000 | |
| 9 | 47.2032 | 1.7 | 1.64000 | 60.1 |
| 10 | 26.2689 | 6.5 | 1.80384 | 33.9 |
| 11 | 63.7326 | 5.2 | 1.00000 | |
| 12 | −51.1445 | 2.0 | 1.79500 | 45.3 |
| 13 | 6222.1046 | d13 | 1.00000 | |
| 14 | 76.1841 | 5.5 | 1.64000 | 60.1 |
| 15 | −71.2186 | 0.2 | 1.00000 | |
| 16 | 45.0270 | 5.2 | 1.49782 | 82.6 |
| 17 | 448.2923 | 2.0 | 1.77250 | 49.6 |
| 18 | 54.0505 | 2.5 | 1.00000 | |
| 19 | 0.0000 | d19 | 1.00000 | |
| 20 | −31.6329 | 2.5 | 1.62041 | 60.3 |
| 21 | −43.3968 | d21 | 1.00000 | |
| 22 | 191.6004 | 5.1 | 1.48749 | 70.5 |
| 23 | −29.8123 | 1.5 | 1.80518 | 25.4 |
| 24 | −49.5451 | 0.2 | 1.00000 | |
| 25 | 65.3831 | 2.9 | 1.48749 | 70.5 |
| 26 | −481.2660 | d26 | 1.00000 | |
| 27 | −309.2184 | 1.4 | 1.79500 | 45.3 |
| 28 | 25.5516 | 4.0 | 1.80518 | 25.4 |

TABLE 22-continued

| 29 | 66.9205 | Bf | 1.00000 |
|----|---------|-----|---------|

[Focal Length Data of Lens Units]

| f1 | 139.80 |
|----|--------|
| f2 | −36.13 |
| f3 | 61.08 |
| f4 | −204.75 |
| f5 | 60.22 |
| f6 | −70.00 |

In this eighth example, the axial aerial distance d0 between the object and the first lens unit G1, the axial aerial distance d5 between the first lens unit G1 and the second lens unit G2, the axial aerial distance d13 between the second lens unit G2 and the third lens unit G3, the axial aerial distance d19 between the third lens unit G3 and the fourth lens unit G4, the axial aerial distance d21 between the fourth lens unit G4 and the fifth lens unit G5, the axial aerial distance d26 between the fifth lens unit G5 and the sixth lens unit G6, and the back focus Bf vary during zooming. Table 23 below shows the variable distance data at each of focal lengths in the wide-angle end state, in an intermediate focal length state, and in the telephoto end state with focus on infinity, with focus on a short-distance object by the fifth lens unit, and with focus on a short-distance object by the fourth lens unit in the eighth example.

TABLE 23

| | Wide-angle end | Intermediate focal length | Telephoto end |
|---|---|---|---|
| [Focus on infinity] | | | |
| f | 82.4 | 200.0 | 388.0 |
| d0 | ∞ | ∞ | ∞ |
| d5 | 2.00 | 43.43 | 62.00 |
| d13 | 22.31 | 12.32 | 1.40 |
| d19 | 4.73 | 14.71 | 25.64 |
| d21 | 45.97 | 35.82 | 37.09 |
| d26 | 34.19 | 20.88 | 3.50 |
| Bf | 41.00 | 64.46 | 80.57 |
| [Focus by fifth unit] | | | |
| β | −0.0611 | −0.0372 | −0.0228 |
| d0 | 1290.70 | 5193.10 | 16537.72 |
| d5 | 2.00 | 43.43 | 62.00 |
| d13 | 22.31 | 12.32 | 1.40 |
| d19 | 4.73 | 14.71 | 25.64 |
| d21 | 43.97 | 33.82 | 35.09 |
| d26 | 36.19 | 22.88 | 5.50 |
| Bf | 41.00 | 64.46 | 80.57 |
| [Focus by fourth units] | | | |
| β | −0.0026 | −0.0036 | −0.0051 |
| d0 | 31695.29 | 56132.43 | 76431.28 |
| d5 | 2.00 | 43.43 | 62.00 |
| d13 | 22.31 | 12.32 | 1.40 |
| d19 | 6.73 | 16.71 | 27.64 |
| d21 | 43.97 | 33.82 | 35.09 |
| d26 | 34.19 | 20.88 | 3.50 |
| Bf | 41.00 | 64.46 | 80.57 |

Table 24 below shows values corresponding to the respective conditions in the eighth example.

TABLE 24

(1) |f4|/f5 = 3.400
(2) β5w = 0.076
(3) (−f2)/f5 = 0.600

FIGS. 30 to 32 are various aberration diagrams of the variable magnification optical system ZL8 according to the eighth example. FIG. 30 shows various aberration diagrams in the infinity in-focus state, wherein FIG. 30 (a) is various aberration diagrams in the infinity in-focus state in the wide-angle end state, FIG. 30 (b) various aberrations in the infinity in-focus state in the intermediate focal length state, and FIG. 30 (c) various aberrations in the infinity in-focus state in the telephoto end state. FIG. 31 shows various aberration diagrams in the short-distance fifth-unit in-focus state, wherein FIG. 31 (a) is various aberration diagrams with focus on a short-distance object by the fifth unit in the wide-angle end state, FIG. 31 (b) various aberrations with focus on a short-distance object by the fifth unit in the intermediate focal length state, and FIG. 31 (c) various aberrations with focus on a short-distance object by the fifth unit in the telephoto end state. FIG. 32 shows various aberration diagrams in the short-distance fourth-unit in-focus state, wherein FIG. 32 (a) is various aberration diagrams with focus on a short-distance object by the fourth unit in the wide-angle end state, FIG. 32 (b) various aberrations with focus on a short-distance object by the fourth unit in the intermediate focal length state, and FIG. 32 (c) various aberrations with focus on a short-distance object by the fourth unit in the telephoto end state. As apparent from the aberration diagrams, it is seen that the variable magnification optical system ZL8 according to the eighth example is well corrected for the various aberrations in each of the focal length states ranging from the wide-angle end state to the telephoto end state and has excellent imaging performance.

The below will describe a method for manufacturing a variable magnification optical system having a first lens unit, a second lens unit, a third lens unit, a fourth lens unit, and a fifth lens unit in order from the object side, with reference to FIG. 35.

First, lenses are arranged as follows in a cylindrical lens barrel: each lens in the first lens unit G1 is arranged so that the first lens unit G1 has a positive refractive power; each lens in the second lens unit G2 is arranged so that the second lens unit G2 has a negative refractive power; the third lens unit G3 is arranged so that the third lens unit G3 has a positive refractive power; each lens in the fourth lens unit G4 and the fifth lens unit G5 is arranged so as to satisfy the conditions below and so that the fifth lens unit G5 has a positive refractive power:

$$2.49 < |f4|/f5 < 4.69; \text{ and}$$

$$-0.10 < \beta 5w < 0.085,$$

where f4 is the focal length of the fourth lens unit, f5 the focal length of the fifth lens unit, and β5w the lateral magnification of the fifth lens unit in the wide-angle end state.

INDUSTRIAL APPLICABILITY

The present invention is applicable to the variable magnification optical systems having excellent optical performance, being suitably applicable to a photographic camera, an electronic still camera, a video camera, or the like, and being capable of performing focusing at high speed by adopting the inner focus system.

The invention claimed is:

1. A variable magnification optical system comprising, in order from the object side:
    a first lens unit with a positive refractive power;
    a second lens unit with a negative refractive power;
    a third lens unit with a positive refractive power;
    a fourth lens unit; and
    a fifth lens unit with a positive refractive power,
    the variable magnification optical system satisfying conditions of the following expressions:

$2.49 < |f4|/f5 < 4.69$; and $-0.05 \leq \beta 5w < 0.085$, where f4 is a focal length of the fourth lens unit, f5 is a focal length of the fifth lens unit, and $\beta 5w$ is a lateral magnification of the fifth lens unit in a wide-angle end state.

2. The variable magnification optical system according to claim 1, wherein the fourth lens unit has a negative refractive index.

3. The variable magnification optical system according to claim 1, which satisfies a condition of the following expression:

$(-f2)/f5 < 0.605$, where f2 is a focal length of the second lens unit and F5 the focal length of the fifth lens unit.

4. The variable magnification optical system according to claim 1, wherein during change in a lens position state from the wide-angle end state to a telephoto end state, a space between the first lens unit and the second lens unit varies, a space between the second lens unit and the third lens unit varies, a space between the third lens unit and the fourth lens unit varies, and a space between the fourth lens unit and the fifth lens unit varies.

5. The variable magnification optical system according to claim 1, which is configured to perform focusing onto a short-distance object by moving at least one lens unit out of the fifth lens unit and the fourth lens unit along the optical axis.

6. The variable magnification optical system according to claim 1, which is configured to perform focusing onto a short-distance object by moving both of the fifth lens unit and the fourth lens unit along the optical axis.

7. The variable magnification optical system according to claim 1, which is configured to perform correction for an image plane upon occurrence of image blurring by moving the whole of the second lens unit or a part of the second lens unit along a direction perpendicular to the optical axis.

8. The variable magnification optical system according to claim 1, which is configured to have an aperture stop on the image side of the third lens unit.

9. The variable magnification optical system according to claim 8, wherein during change in a lens position state from the wide-angle end state to a telephoto end state, the aperture stop is configured to move along the optical axis integrally with the third lens unit.

10. The variable magnification optical system according to claim 1, comprising a sixth lens unit with a negative refractive power disposed on the image side of the fifth lens unit.

11. The variable magnification optical system according to any claim 1, wherein during change in a lens position state from the wide-angle end state to a telephoto end state, a space between the first lens unit and the second lens unit increases, a space between the second lens unit and the third lens unit decreases, a space between the third lens unit and the fourth lens unit increases, and a space between the fourth lens unit and the fifth lens unit decreases.

12. The variable magnification optical system according to claim 1, wherein during change in a lens position state from the wide-angle end state to a telephoto end state, the second lens unit is stationary relative to an image plane.

13. The variable magnification optical system according to claim 1, wherein during change in a lens position state from the wide-angle end state to a telephoto end state, the fourth lens unit is stationary relative to an image plane.

14. The variable magnification optical system according to claim 1, wherein the fourth lens unit is composed of a single lens.

15. The variable magnification optical system according to claim 1, which is composed of spherical lenses only.

16. An optical apparatus comprising the optical system as set forth in claim 1, which focuses an image of an object on a predetermined image plane.

17. A method for manufacturing a variable magnification optical system comprising a first lens unit, a second lens unit, a third lens unit, a fourth lens unit, and a fifth lens unit in order from the object side, said method comprising the following steps of:
    arranging each lens in the first lens unit so that the first lens unit has a positive refractive power;
    arranging each lens in the second lens unit so that the second lens unit has a negative refractive power;
    arranging each lens in the third lens unit so as to have a positive refractive power; and
    arranging each lens in the fourth lens unit and the fifth lens unit so as to satisfy the conditions below and so that the fifth lens unit has a positive refractive power, $2.49 < |f4|/f5 < 4.69$; and $-0.05 \leq \beta 5w < 0.085$, where f4 is a focal length of the fourth lens unit, f5 a focal length of the fifth lens unit, and $\beta 5w$ a lateral magnification of the fifth lens unit in a wide-angle end state.

18. The method for manufacturing the variable magnification optical system according to claim 17, which satisfies a condition of the following expression:

$(-f2)/f5 < 0.605$, where f2 is a focal length of the second lens unit and F5 the focal length of the fifth lens unit.

19. The method for manufacturing the variable magnification optical system according to claim 17, which is configured to perform focusing onto a short-distance object by moving at least one lens unit out of the fifth lens unit and the fourth lens unit along the optical axis.

* * * * *